US008822109B2

(12) United States Patent
Shimada

(10) Patent No.: US 8,822,109 B2
(45) Date of Patent: Sep. 2, 2014

(54) COLORED CURABLE COMPOSITION, COLOR FILTER, AND SOLID IMAGE PICKUP ELEMENT

(75) Inventor: Kazuto Shimada, Haibara-gun (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 837 days.

(21) Appl. No.: 12/237,531

(22) Filed: Sep. 25, 2008

(65) Prior Publication Data

US 2009/0085018 A1 Apr. 2, 2009

(30) Foreign Application Priority Data

Sep. 28, 2007 (JP) ................................. 2007-256894

(51) Int. Cl.
*G02B 5/20* (2006.01)
*G03F 7/031* (2006.01)

(52) U.S. Cl.
USPC ........................................... 430/7; 430/270.1

(58) Field of Classification Search
None
See application file for complete search history.

(56) References Cited

U.S. PATENT DOCUMENTS

| 2003/0082464 A1* | 5/2003 | Takashima et al. ............... 430/7 |
| 2006/0051685 A1 | 3/2006 | Fujimori et al. |
| 2007/0049650 A1 | 3/2007 | Araki |
| 2007/0203255 A1* | 8/2007 | Sasaki ............................. 522/49 |
| 2009/0085018 A1 | 4/2009 | Shimada |

FOREIGN PATENT DOCUMENTS

| JP | 2-127602 A | 5/1990 |
| JP | 2003-043680 A | 2/2003 |
| JP | 2003-294935 A | * 10/2003 |
| JP | 2005-099488 A | 4/2005 |
| JP | 2005-202252 A | 7/2005 |
| JP | 2006-016545 A | 1/2006 |
| JP | 2006-30541 A | 2/2006 |
| JP | 2006-072135 A | 3/2006 |
| JP | 2006-201730 A | 8/2006 |
| JP | 2006-215452 A | 8/2006 |
| JP | 2007-139959 A | 6/2007 |
| JP | 2007-226193 A | 9/2007 |
| JP | 2007-233230 A | 9/2007 |
| TW | 200302254 A | 8/2003 |
| TW | 200615694 A | 5/2006 |
| TW | 200639582 A | 11/2006 |
| TW | 200720840 A | 6/2007 |
| WO | WO-2007-147782 | * 12/2007 |

OTHER PUBLICATIONS

Computer-generated translation of JP 2003-294935 (Oct. 2003).*
Computer-generated translation of JP 2007-226193 (Sep. 2007).*
Non-Final Office Action dated Mar. 15, 2011 in U.S. Appl. No. 12/921,648.
Office Action (Notice of Reasons for Rejection) from Japanese Patent Office issued in corresponding Japanese Patent Application No. 2007-256894 dated Nov. 8, 2011, with an English translation.
Office Action issued in correspondence Taiwanese Patent Application No. 10221087930 dated Aug. 15, 2013.
Office Action issued in corresponding Korean Patent Application No. 10-2008-0093547 dated Mar. 7, 2014 with partial English translation.
Office Action issuedi n. corresponding Taiwanese Patent Application No. 097136946 dated Mar. 12, 2014 with partial English translation.

* cited by examiner

*Primary Examiner* — John A. McPherson
(74) *Attorney, Agent, or Firm* — Buchanan Ingersoll & Rooney PC

(57) ABSTRACT

A colored curable composition including: (A) a pigment dispersion containing (a-1) a pigment, (a-2) a compound having a pigment skeletal structure and an amino group in its molecule, and (a-3) a dispersion resin; (B) an oxime-based initiator; and (C) a polymerizable compound. A colored curable composition that is useful for forming a colored region of a color filter, which even with a high content of a pigment, is capable of curing with high sensitivity, is excellent in developability and is capable of highly finely forming a thin-layer colored region excellent in hue is also provided. A color filter provided with a high fine thin-layer colored region excellent in color properties formed by the colored curable composition of the invention, and a solid image pickup device provided with the color filter, which is excellent in color properties are further provided.

14 Claims, No Drawings

COLORED CURABLE COMPOSITION, COLOR FILTER, AND SOLID IMAGE PICKUP ELEMENT

CROSS REFERENCE TO RELATED APPLICATION

This application claims priority under 35 USC 119 from Japanese Patent Application No. 2007-256894, the disclosure of which is incorporated by reference herein.

BACKGROUND OF THE INVENTION

Field of the Invention

The present invention relates to a colored curable composition preferable for preparing a color filter to be used for a liquid crystal display (LCD), a solid image pickup element (CCD or CMOS) or the like, a color filter having a colored region prepared from the colored curable composition, and a solid image pickup element provided with the color filter.

The color filter is an essential constituent part for a liquid crystal display or a solid image pickup element.

Since the liquid crystal display is compact and having the equivalent or superior performance compared with the CRT commonly used as a display apparatus, it is replacing the CRT as the television screen, the personal computer screen, and the other display apparatus. Moreover, recently, as to the trend of the development of the liquid crystal display, it is changing from the conventional monitor application having a screen of a relatively small area to the television application having a large screen and a higher image quality.

In use of a color filter for a liquid crystal display (LCD), its substrate size is made larger for the production of the large scale television sets, and for improvement in productivity where a large substrate is used, curability with low energy is required. Liquid crystal displays for use in the television are required to have image quality at higher levels than LCDs for use in conventional monitors. That is, improvements in contrast and color purity are desired. For improvement in contrast, curable compositions used in preparation of color filters are desired to use coloring agents (organic pigments etc.) of finer particles (see, for example, Japanese Patent Application Laid-Open (JP-A) No. 2006-30541). As a consequence, the amount of a dispersant added for dispersing pigments tends to increase. For improvement in color purity, the content of a coloring agent (organic pigment) in a curable composition with respect to a total solid component of the curable composition is desired to be higher. Accordingly, the contents of a photopolymerization initiator and a photopolymerizable monomer in the curable composition with respect to a total solid component of the curable composition tend to decrease.

In use of a color filter for a solid image pickup element, curing with low energy is also desired. In addition, a pattern film is thinning, which is accompanied with increase in the concentration of a pigment in the composition. In a composition for pigment-based color filters, pigments are becoming finer, and as a consequence, the proportion of a pigment dispersant in the composition tends to increase. To cope with problems such as color unevenness caused by relatively coarse particles of the pigment, techniques wherein an organic solvent-soluble dye is used as a coloring agent in place of the pigment are disclosed (see, for example, JP-A No. 2-127602). In such dye-based color filters, however, a polymerization inhibiting effect originating from the dye is becoming prominent as the concentration of the dye in the composition is increased. Due to these factors, the contents of the photopolymerization initiator and photopolymerizable monomer that are components necessary for curing a curable composition for either a liquid crystal display or a solid image pickup element are limited, the concentration of the coloring agent therein is increased, and film thinning is made difficult. In addition, desired sensitivity is hardly achieved due to a low proportion of polymerizable components, and desired developability is hardly secured since there is no room for incorporation of a development regulating agent.

That is, thinning of a colored region, particularly of a colored pattern, is accompanied by an increase in the proportion of a pigment and a pigment dispersant in a curable composition so that the content of curable components (polymerizable materials) is made relatively lower to render maintenance of high sensitivity difficult, and simultaneously the amounts of other components not involved in curing such as a polymer of high acid value and a development accelerator added for the purpose of securing developability are inevitably reduced, resulting in a problem of insufficient development.

It has also been attempted at securing sensitivity without reducing color property by reducing the amount of a pigment dispersant added while maintaining the content of a pigment, but there arises a new problem that the stability of a pigment dispersion is deteriorated to increase viscosity with time thus making formation of a uniform coating film difficult.

When the colored curable composition is thus used in formation of colored regions in color filters, particularly in color filters for solid image pickup elements, it is necessary to satisfy both film thinning and color value, so a colored curable composition having a higher pigment concentration and being capable of achieving both sensitivity and developability has been ardently desired.

SUMMARY OF THE PRESENT INVENTION

The present invention has been made in view of the above circumstances and provides a colored curable composition, a color filter, and a solid image pickup element.

A first aspect of the invention provides a colored curable composition comprising: (A) a pigment dispersion containing (a-1) a pigment, (a-2) a compound having a pigment skeletal structure and an amino group in its molecule, and (a-3) a dispersion resin; (B) an oxime-based initiator; and (C) a polymerizable compound.

DETAILED DESCRIPTION OF THE INVENTION

The invention was made in view of the problems accompanying thinning of a colored region in a color filter. An object of the invention is to provide a colored curable composition which, even with a high content of a pigment, is capable of curing with high sensitivity, is excellent in developability and is capable of highly finely forming a thin-layer colored region excellent in hue, particularly a colored curable composition useful for formation of a colored region in a color filter.

Another object of the invention is to provide a color filter provided with a thin layer with a highly fine colored region excellent in color property formed from the colored curable composition and a solid image pickup element provided with the color filter excellent in color property.

The working mechanism of the invention is not evident, but is estimated as follows:

When the curable composition of the invention is prepared, (A) a pigment dispersion comprising (a-1) a pigment, (a-2) a compound having a pigment skeletal structure and an amino group in the molecule, and (a-3) a dispersion resin is first obtained, and (A) the pigment dispersion is mixed with (B) an oxime-based initiator and (C) a polymerizable compound to prepare the colored curable composition of the invention.

In (a-2) the compound having a pigment skeletal structure and an amino group in its molecule (hereinafter referred to sometimes as (a-2) specific pigment derivative) contained in the pigment dispersion, the pigment skeletal structure forms an interaction with (a-1) the pigment having a skeletal structure similar thereto so that (a-2) the specific pigment derivative is adsorbed onto the surface of (a-1) the pigment. The amino group in (a-2) the specific pigment derivative forms an interaction with (a-3) the coexisting dispersion resin so that in (A) the pigment dispersion, (a-3) the dispersion resin strongly bonds through (a-2) the specific pigment derivative to the surface of (a-1) the pigment and is thus made hardly eliminated from the surfaces of the pigments, thereby suppressing aggregation of the fine pigments for a long time.

In preparation of a generally used pigment dispersion, for exhibiting high dispersion stability, a large amount of a dispersant having an amino group is necessary for exhibiting interaction with a acid group of a dispersion resin and/or a pigment skeleton, and simultaneously a predetermined amount of an acid group-containing resin is necessary for securing alkali developability, and therefore, the concentration of a pigment that is a coloring component in the pigment dispersion is made hardly increased to make a thinner layer hardly realizable. In the invention, however, a pigment derivative having an amino group in the molecule is used to form an acid/base interaction with an acid group-containing resin used for securing alkali developability, to easily exhibit dispersion stability. It is therefore considered that the content of a compound contributing to dispersion can be lower and a resin of higher acid value can be used than when conventionally used acid group-containing pigment derivatives are used, and also that even when a highly sensitive and highly fine pattern is prepared, an oxime-based initiator not influencing the optical system can be simultaneously used to effectively suppress a usually concerned reduction in sensitivity even if the concentration of a pigment in a pigment dispersion is increased.

In the invention, the "pigment skeletal structure" refers to a main skeletal structure of an organic pigment constituted to contain a chromophoric atomic group that is a heterocyclic structure usually containing a nitrogen atom, an oxygen atom or a sulfur atom, an amido group structure, or an urea structure. In the invention, the "pigment skeletal structure" also includes "a structure similar to the pigment skeleton" and "a partial structure of the pigment skeleton" which are capable of forming an interaction with the pigment skeleton possessed by the organic pigment due to having a structure similar to such pigment main skeleton or having a partial structure of such pigment main skeleton.

Hereinafter, the invention is described in detail. The colored curable composition of the invention comprises (A) a pigment dispersion containing (a-1) a pigment, (a-2) a compound having a pigment skeletal structure and an amino group in the molecule, and (a-3) a dispersion resin, (B) an oxime-based initiator and (C) a polymerizable compound. That is, (A) the pigment dispersion excellent in pigment dispersion stability is prepared, and (B) the oxime-based initiator and (C) the polymerizable compound are added to it to prepare a colored curable composition, from which a colored region excellent in color property even in the form of a thin layer can be formed. Hereinafter, the respective components contained in the colored curable composition are described.

<(A) Pigment Dispersion>

The colored curable composition of the invention contains (a-1) a pigment, (a-2) a compound having a pigment skeletal structure and an amino group in the molecule, (a-3) a dispersion resin and may further contain (a-4) a solvent.

<(a-2) Compound Having a Pigment Skeletal Structure and an Amino Group in the Molecule (Specific Pigment Derivative)>

In the invention, (a-2) the specific pigment derivative is used to form an interaction between the pigment skeletal structure in the specific pigment derivative and (a-1) the pigment, thus securing adsorption therebetween and simultaneously exhibiting an interaction with (a-3) the dispersion resin by the amino group in the specific pigment derivative, thereby securing the dispersion stability of the pigment in the pigment dispersion.

(a-2) the specific pigment derivative used in the invention is preferably a compound represented by the following formula (A).

In formula (A), $R^1$ and $R^2$ each independently represent a hydrogen atom or a monovalent organic group and each are preferably a saturated or unsaturated alkyl group having 1 to 20 carbon atoms, a saturated or unsaturated cycloalkyl group having 3 to 20 carbon atoms, or an aryl group. These organic groups may further have a substituent, and the substituent that can be introduced into them is selected from the group consisting of a halogen atom, a hydroxy group, an alkyl group, an alkenyl group, an alkynyl group, a cycloalkyl group, a cycloalkenyl group, a cycloalkynyl group, an aryl group, a heterocyclic group, a cyano group, an alkoxy group, an aryloxy group, a thioalkoxy group, a thioaryloxy group, a carboxy group, an alkoxycarbonyl group, a sulfo group, a sulfonamido group, a urea group, a thiourea group, an amino group, an amido group, a carbonyl group, a nitro group, and substituents having these groups.

$R^1$ and $R^2$ may bond to each other to form a ring.

Particularly, the compound represented by formula (A) is preferably a compound having, in the molecule, at least one structure selected from an amide structure or a urea structure.

Also, the compound represented by formula (A) is preferably a compound having a heterocyclic structure.

X is a group having a valency of m and containing a pigment skeletal structure.

As used herein, the pigment skeletal structure is a chromophoric atomic group in an organic pigment, a structure similar thereto or a partial structure thereof. A specific example is a structure containing one or more partial structure selected from the group consisting of a skeleton having an azo group, a skeleton having a urea structure, a skeleton having an amide structure, a skeleton having a cyclic amide structure, an aromatic ring having a heteroatom-containing 5-membered ring, and an aromatic ring having a heteroatom-containing 6-membered ring, and X is a substituent containing such a pigment skeletal structure.

In the invention, X preferably has a pigment skeletal structure or both a pigment skeletal structure and an aromatic ring, a nitrogen-containing aromatic ring, an oxygen-containing aromatic ring or a sulfur-containing aromatic ring, and the amino group bonds directly or via a connecting group to a pigment skeletal structure, an aromatic ring, a nitrogen-containing aromatic ring, an oxygen-containing aromatic ring or a sulfur-containing aromatic ring.

Most preferably, X has a pigment skeletal structure and an aromatic ring or a nitrogen-containing aromatic ring and preferably bonds via a divalent connecting group to the amino group.

m is an integer of from 1 to 8, preferably from 1 to 6, and more preferably 1 or 2, from the viewpoints of dispersibility and storage stability of a dispersion.

Preferable examples of the specific pigment derivative (a-2) used in the invention are shown below, but the invention is not limited thereto.

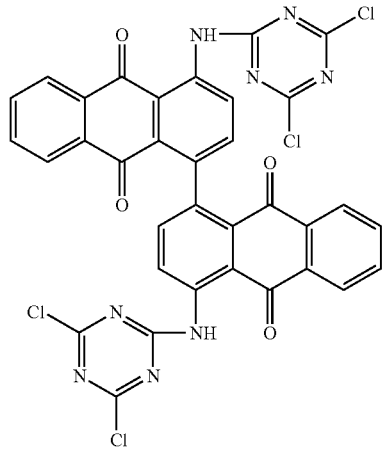

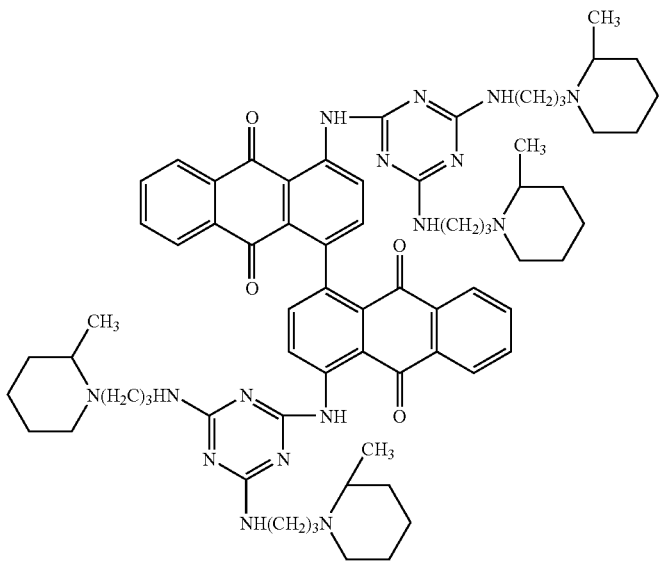

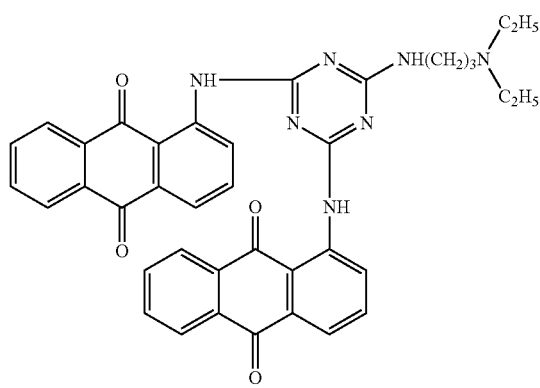

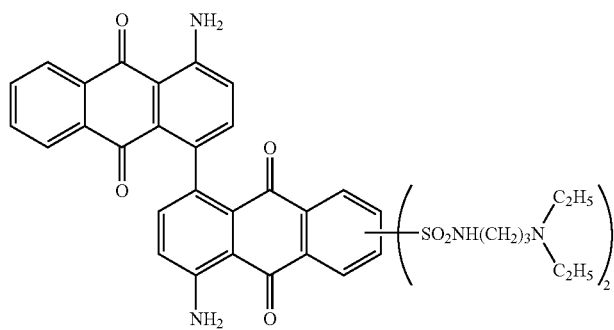

-continued
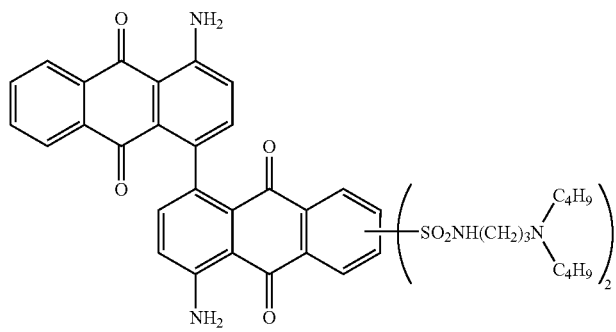
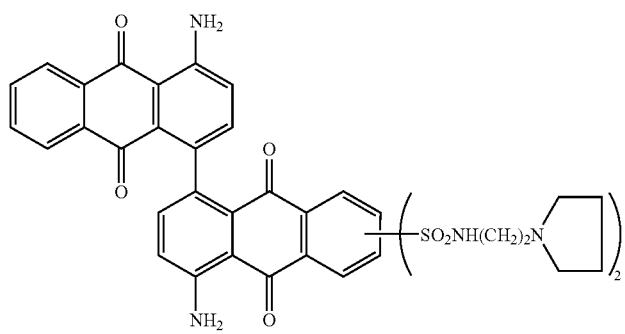
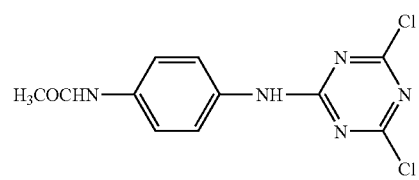
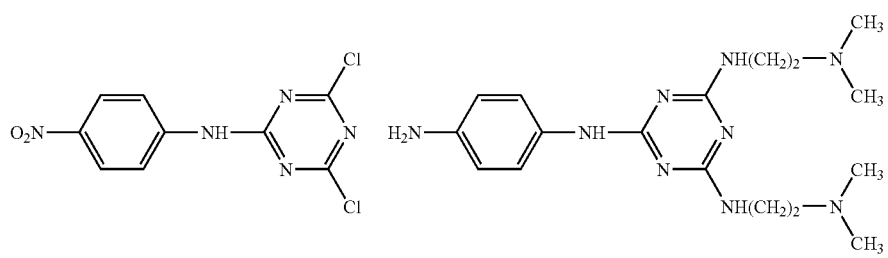
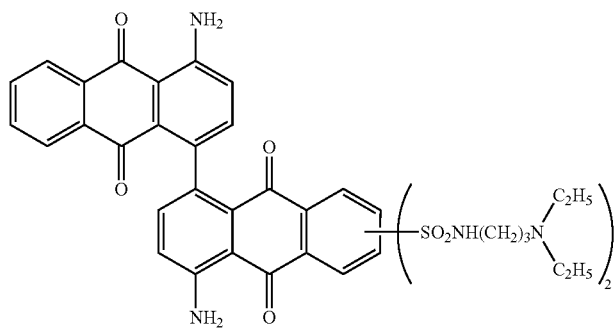
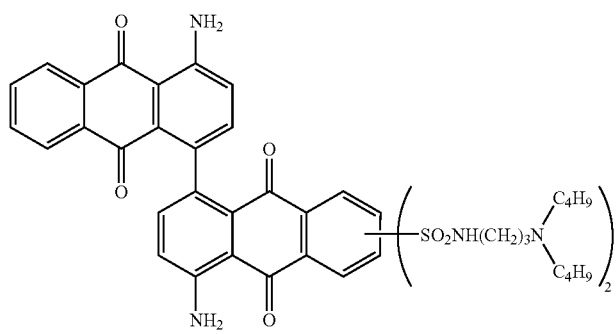

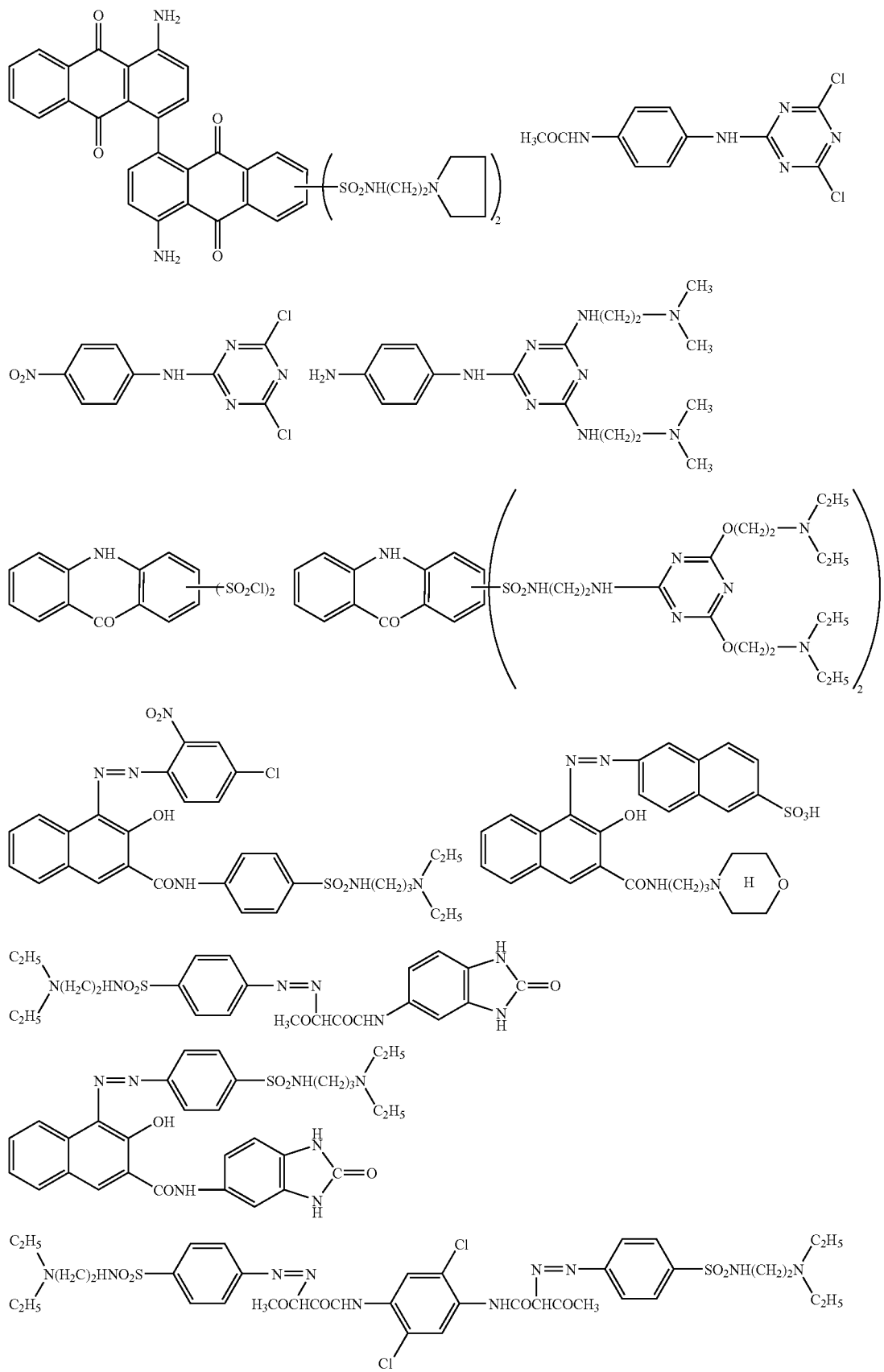

-continued
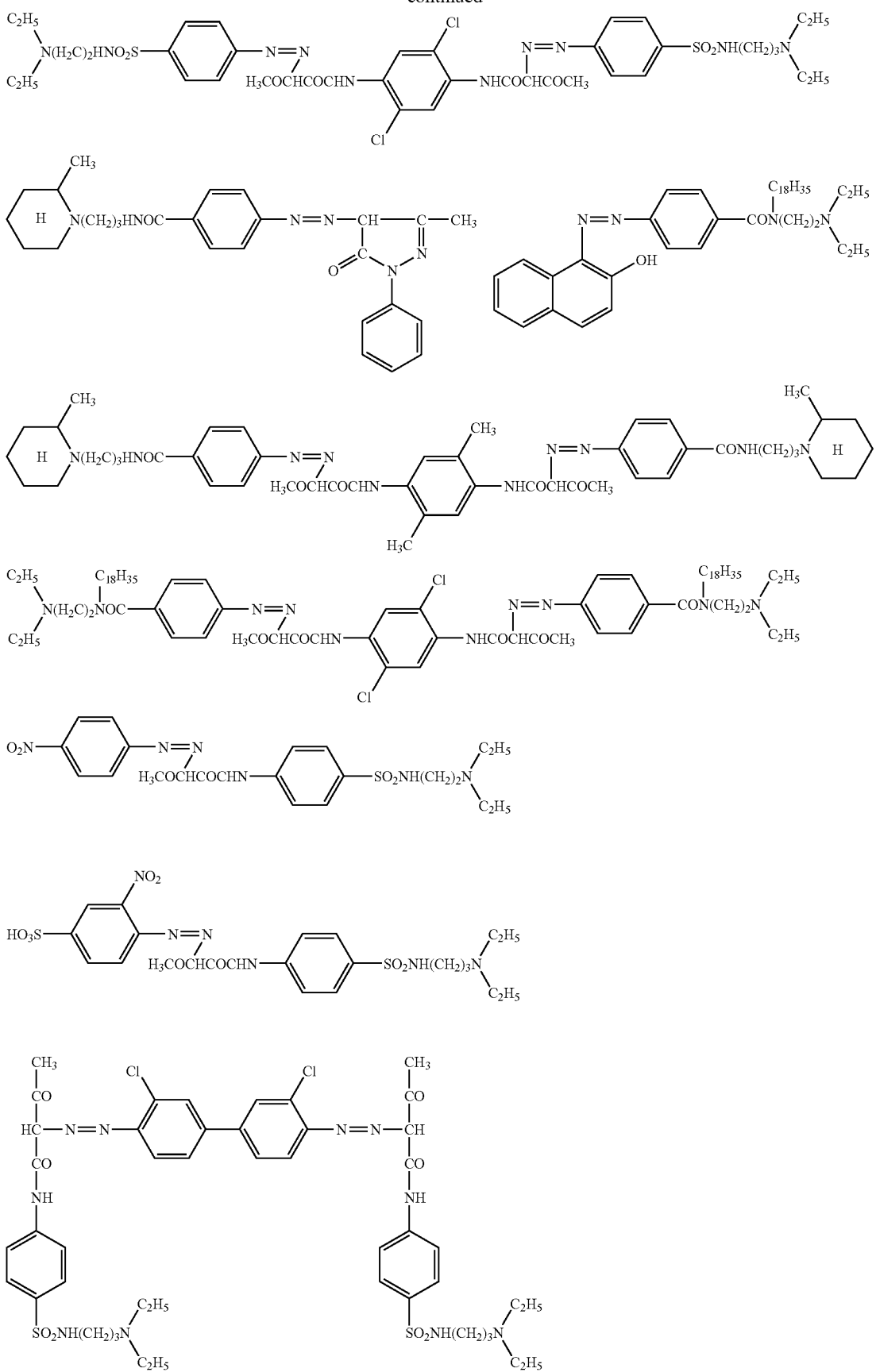

-continued
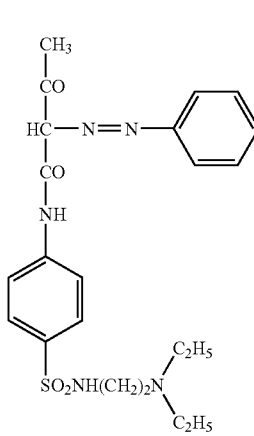
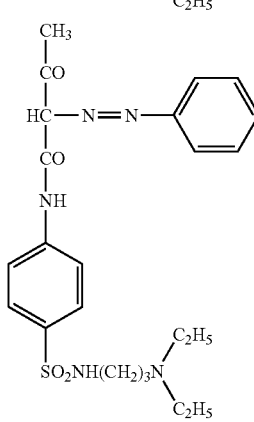
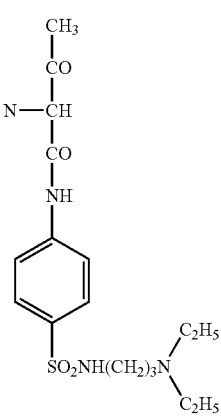
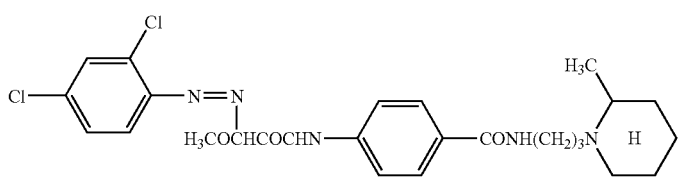
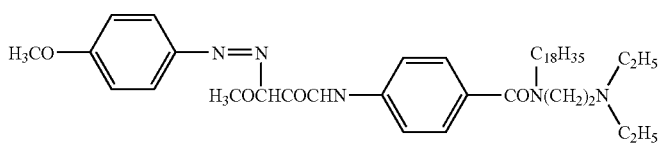
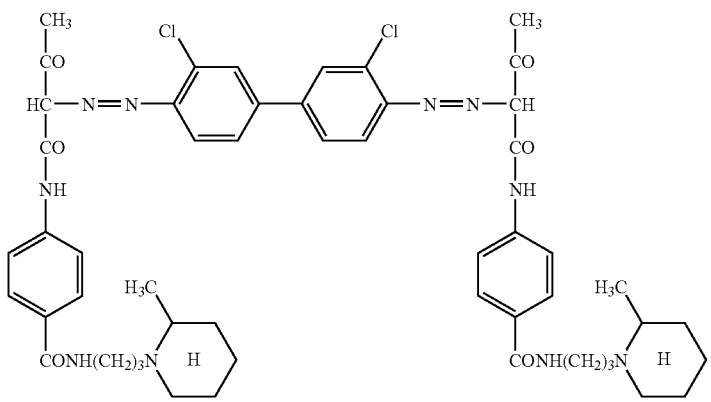

-continued
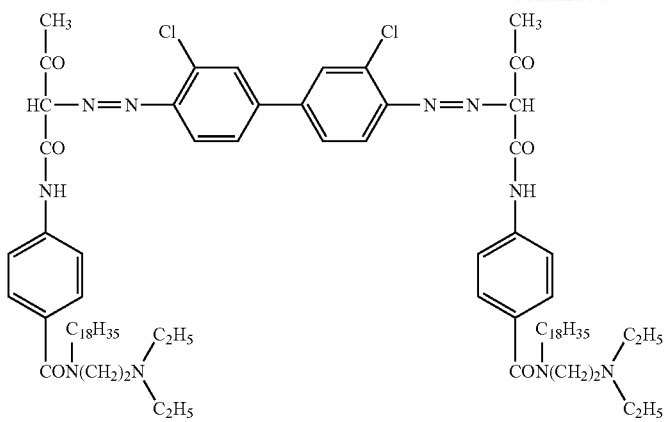
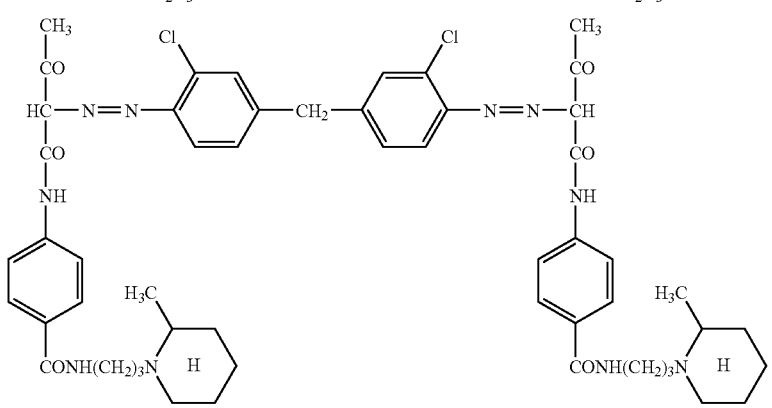
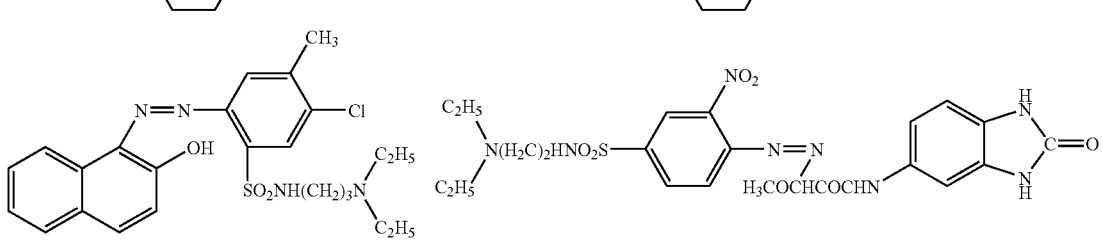
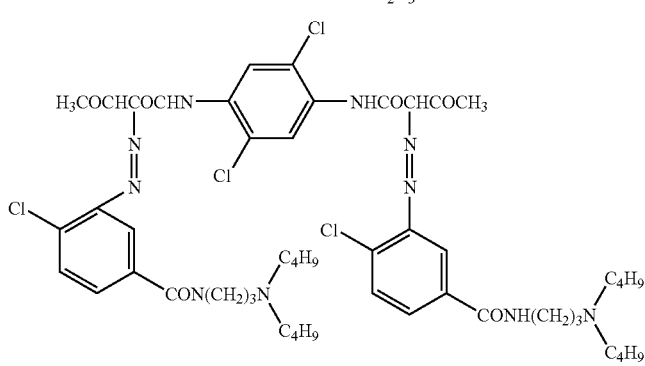
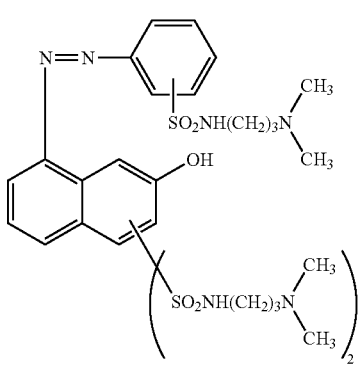
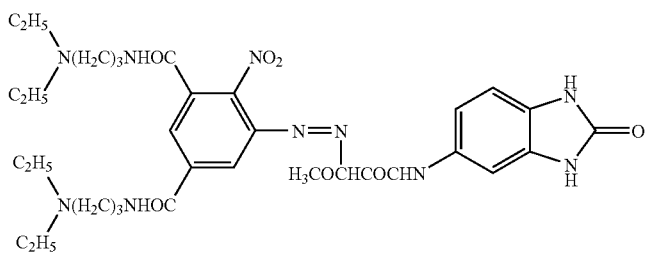

-continued
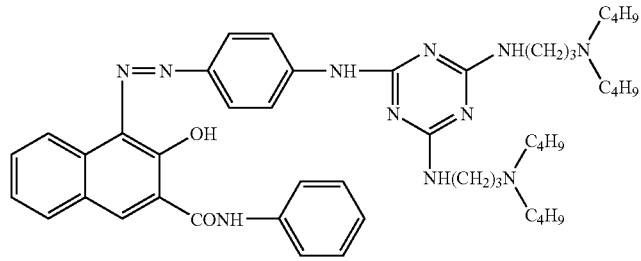
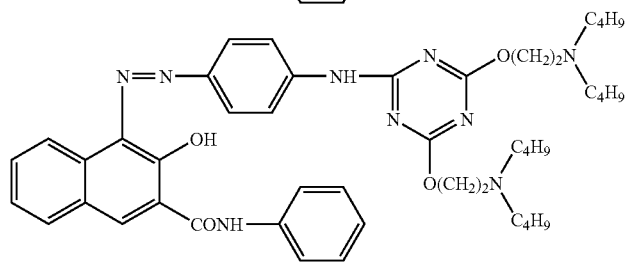
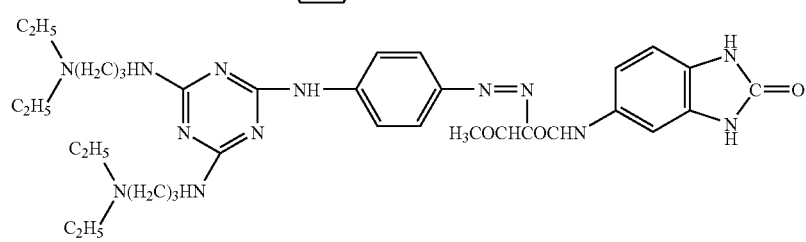
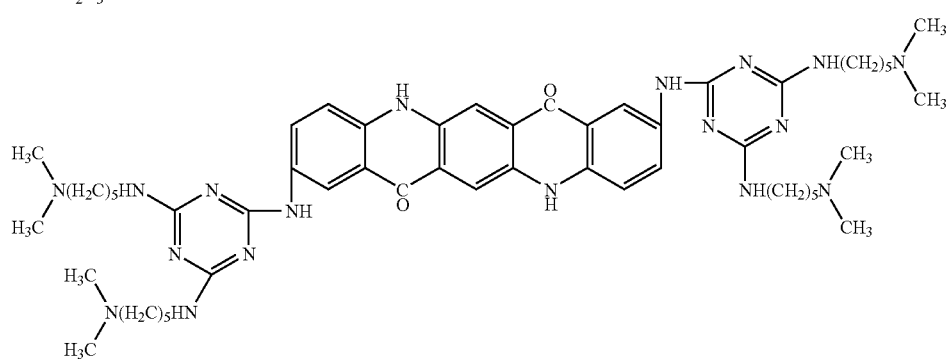
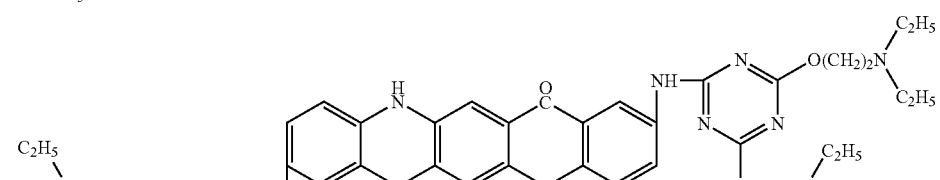
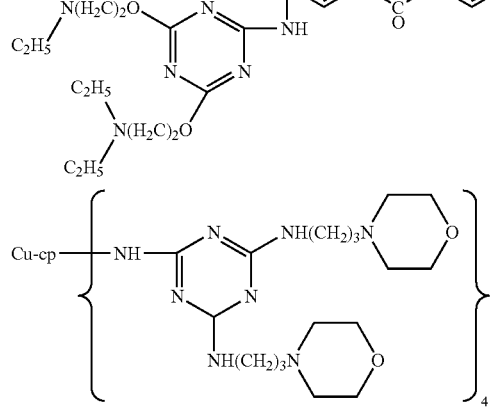
Cu-cp: copper phthalocyanine residue

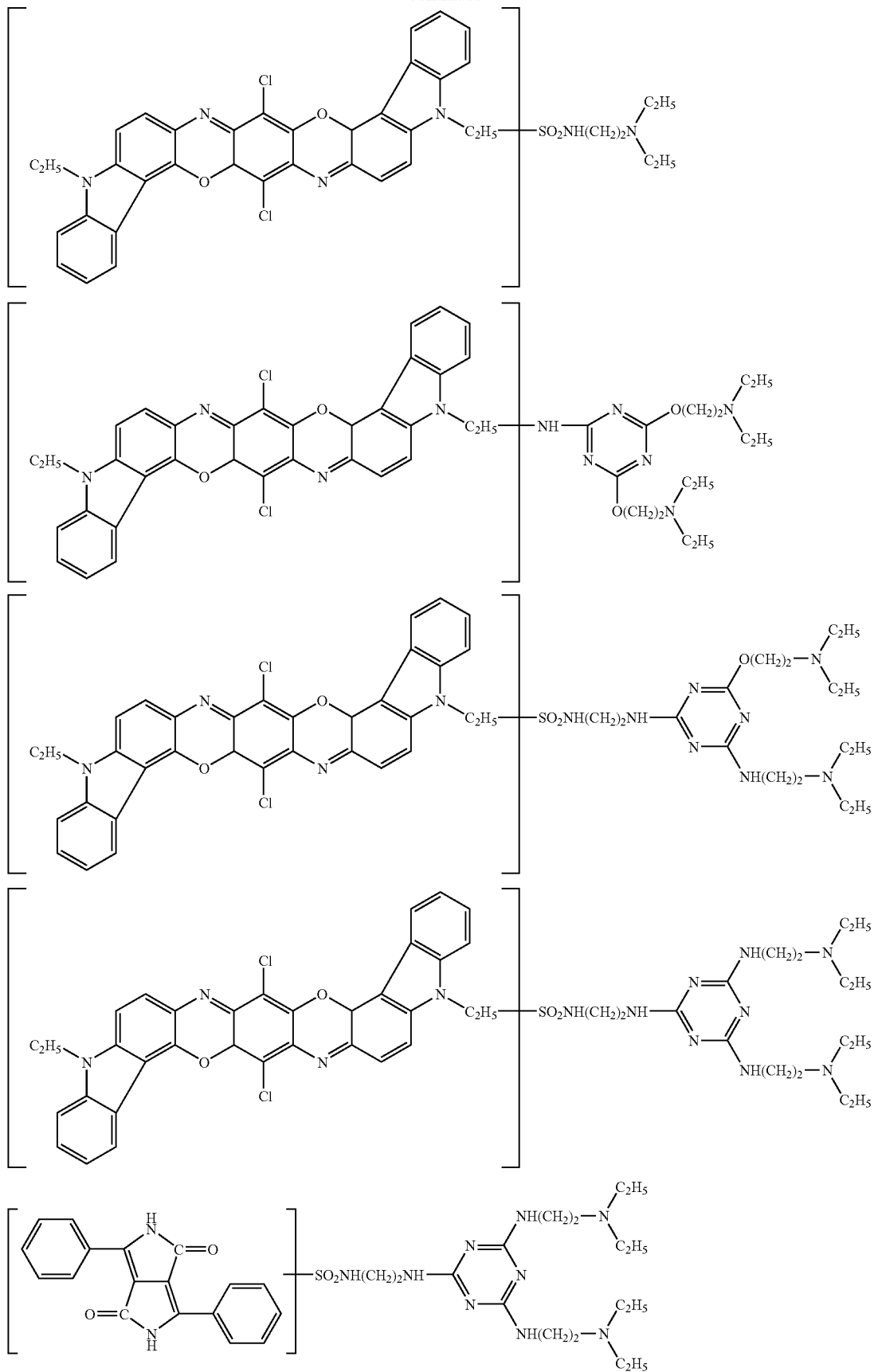

21
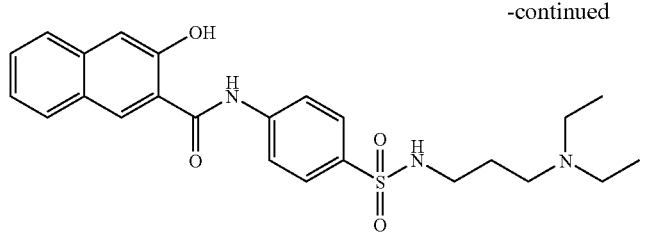
22
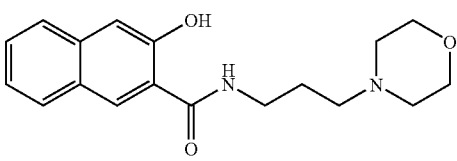
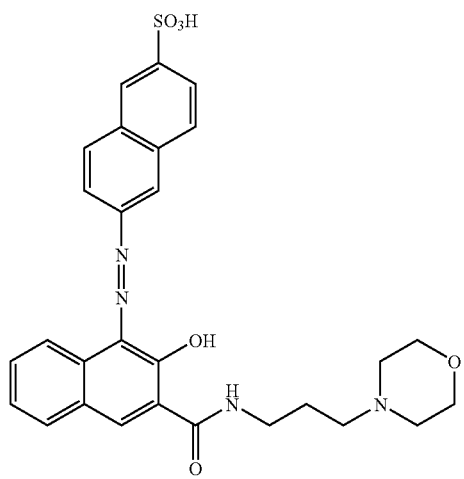
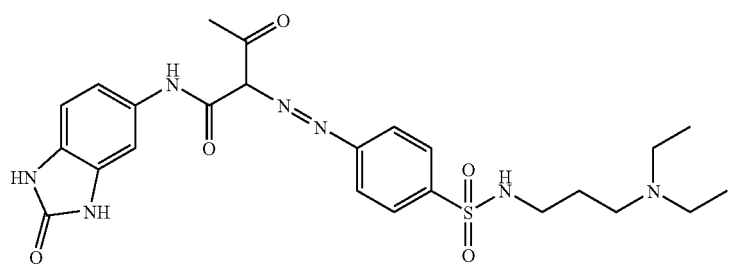
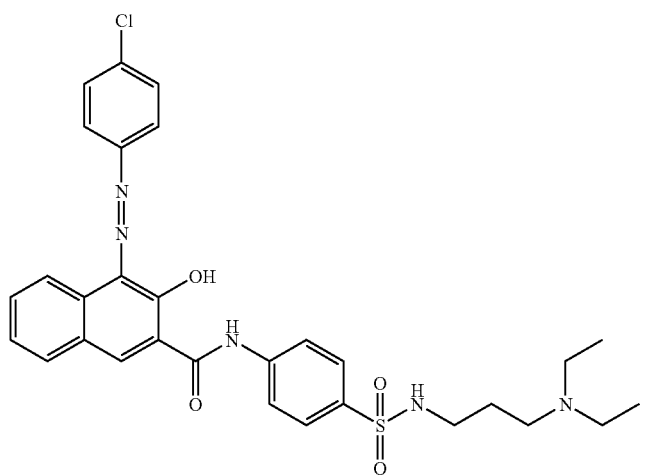

23 24
-continued
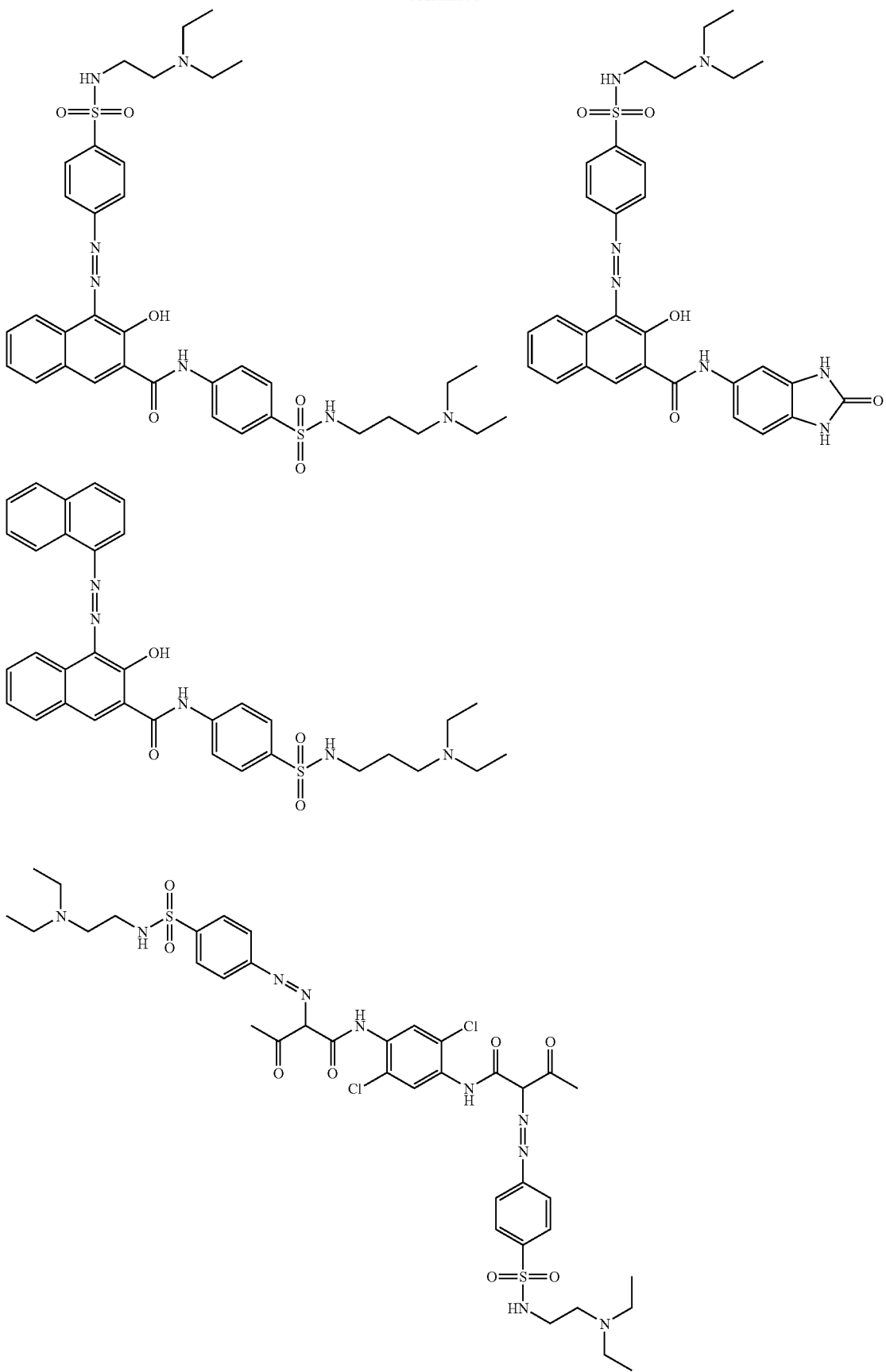

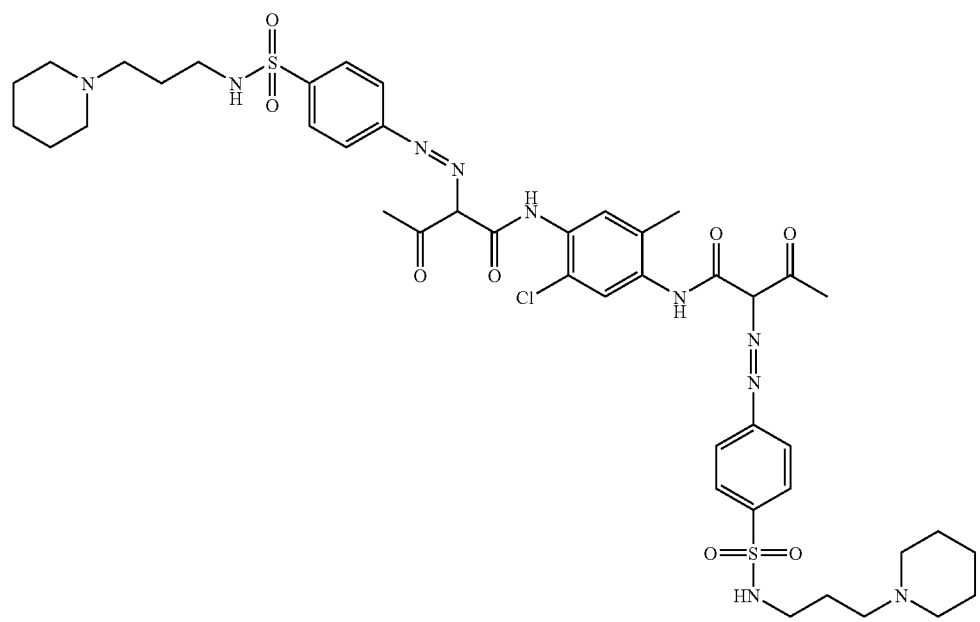
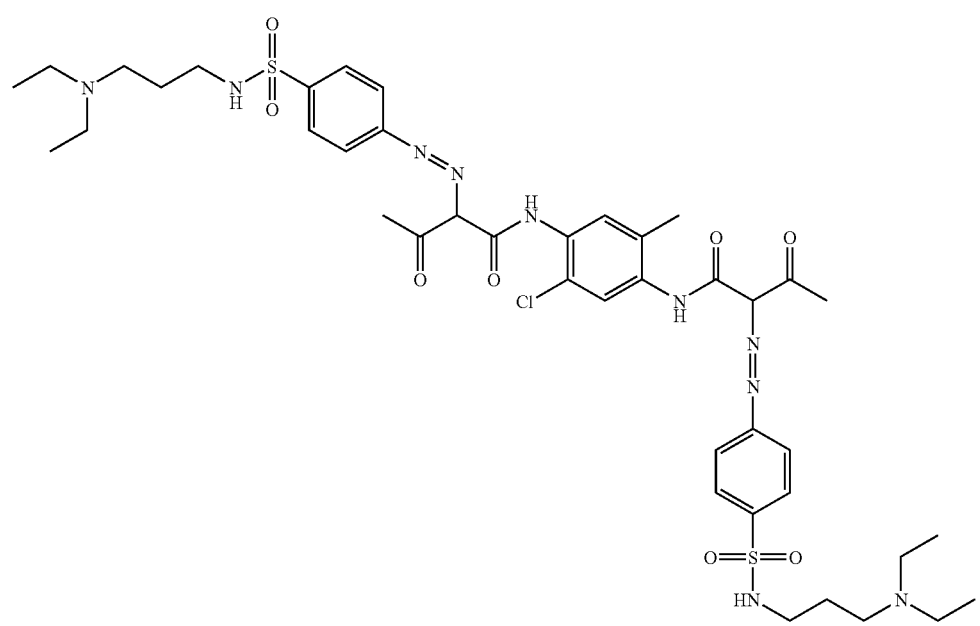

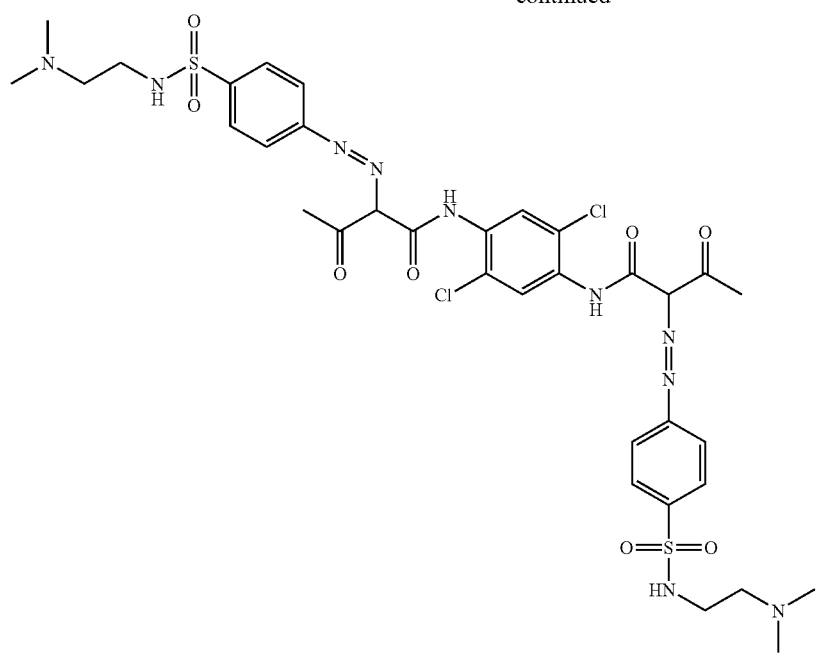
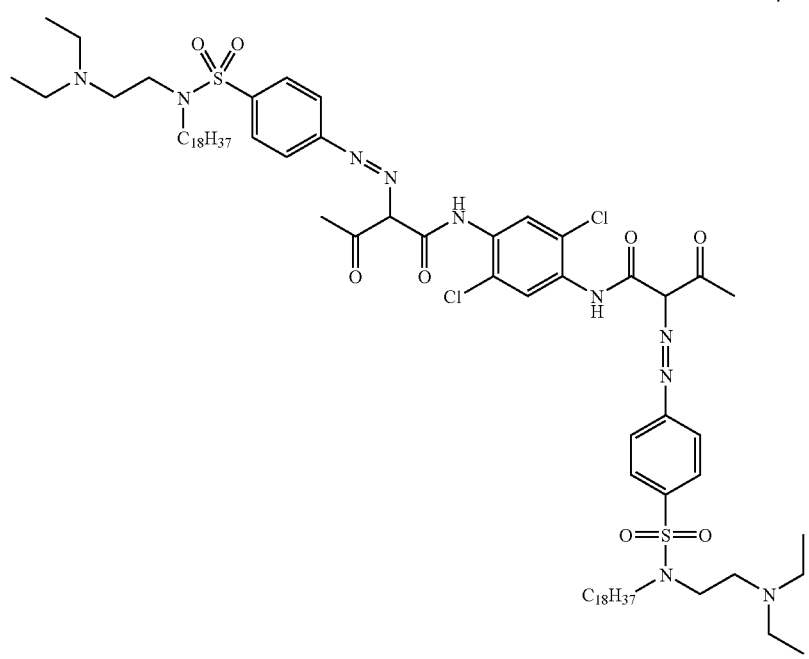
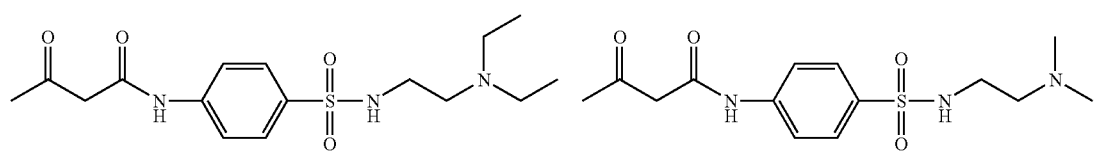
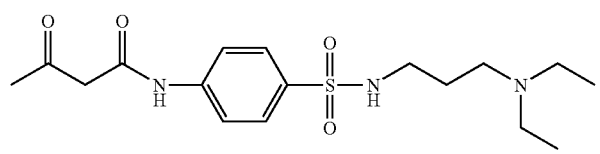

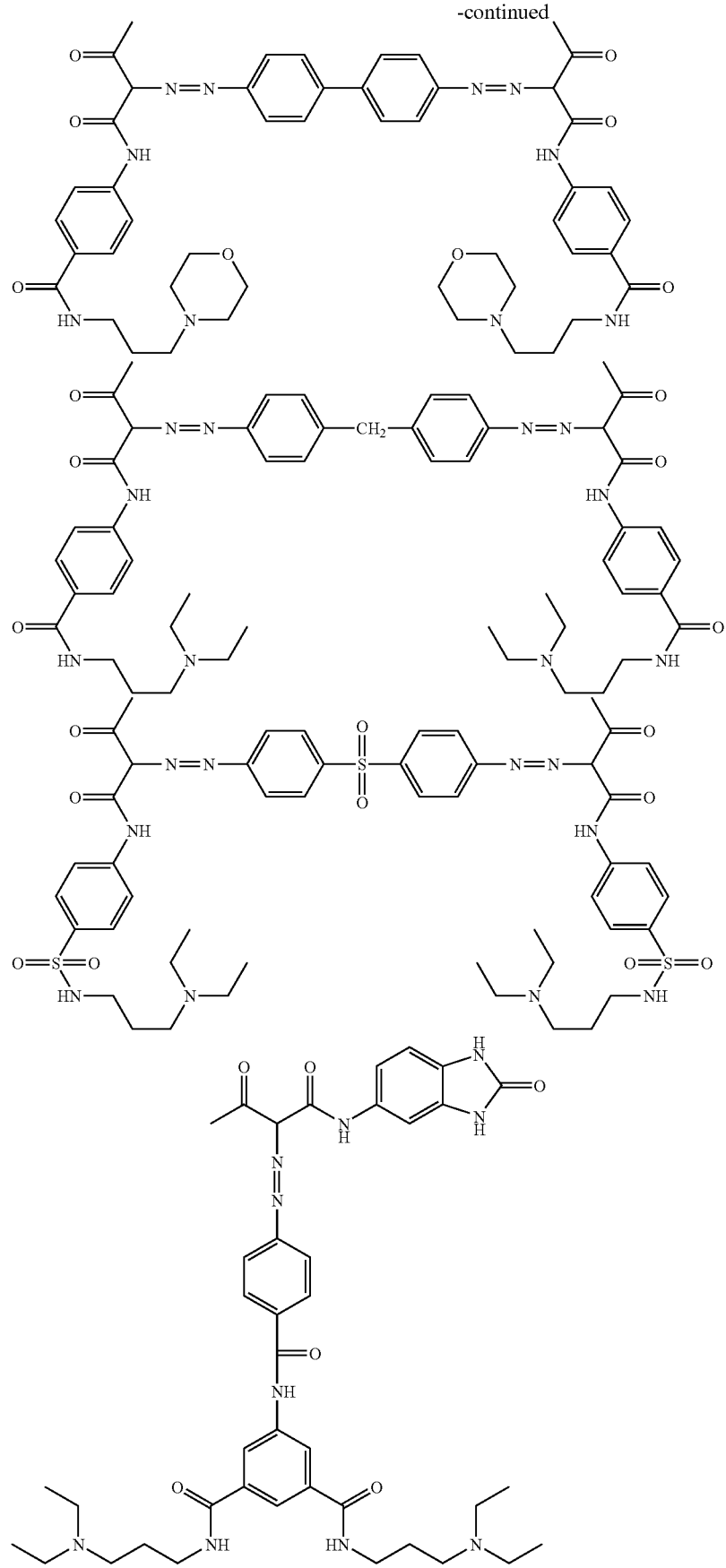

-continued
31
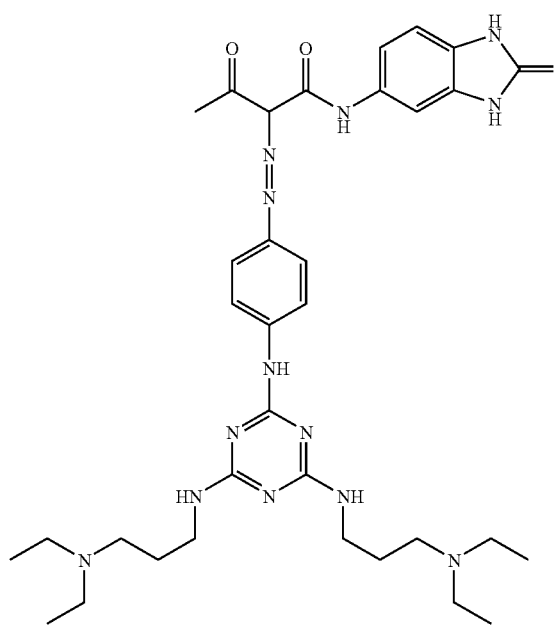
32
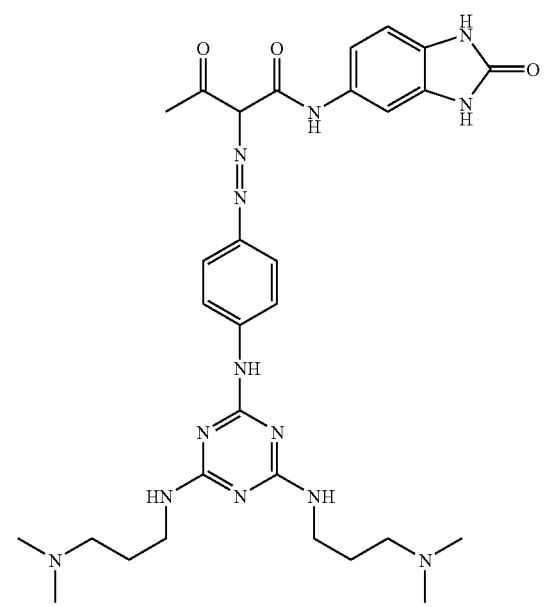
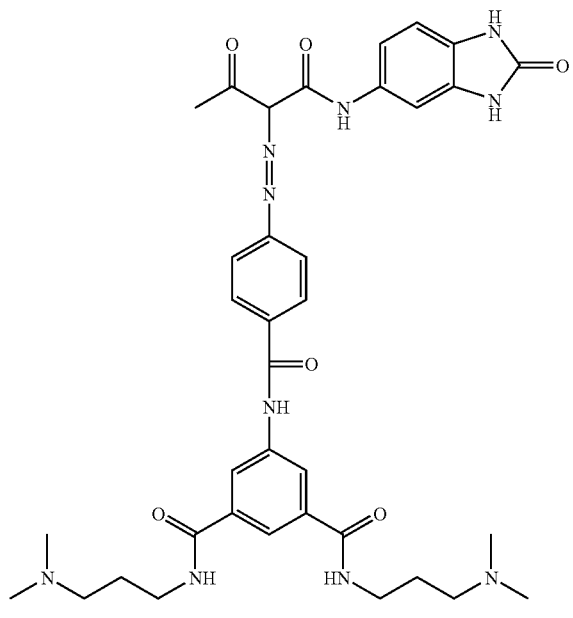
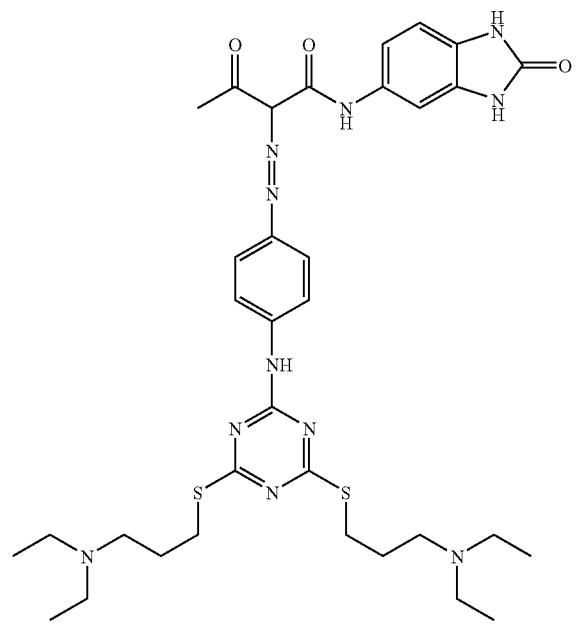

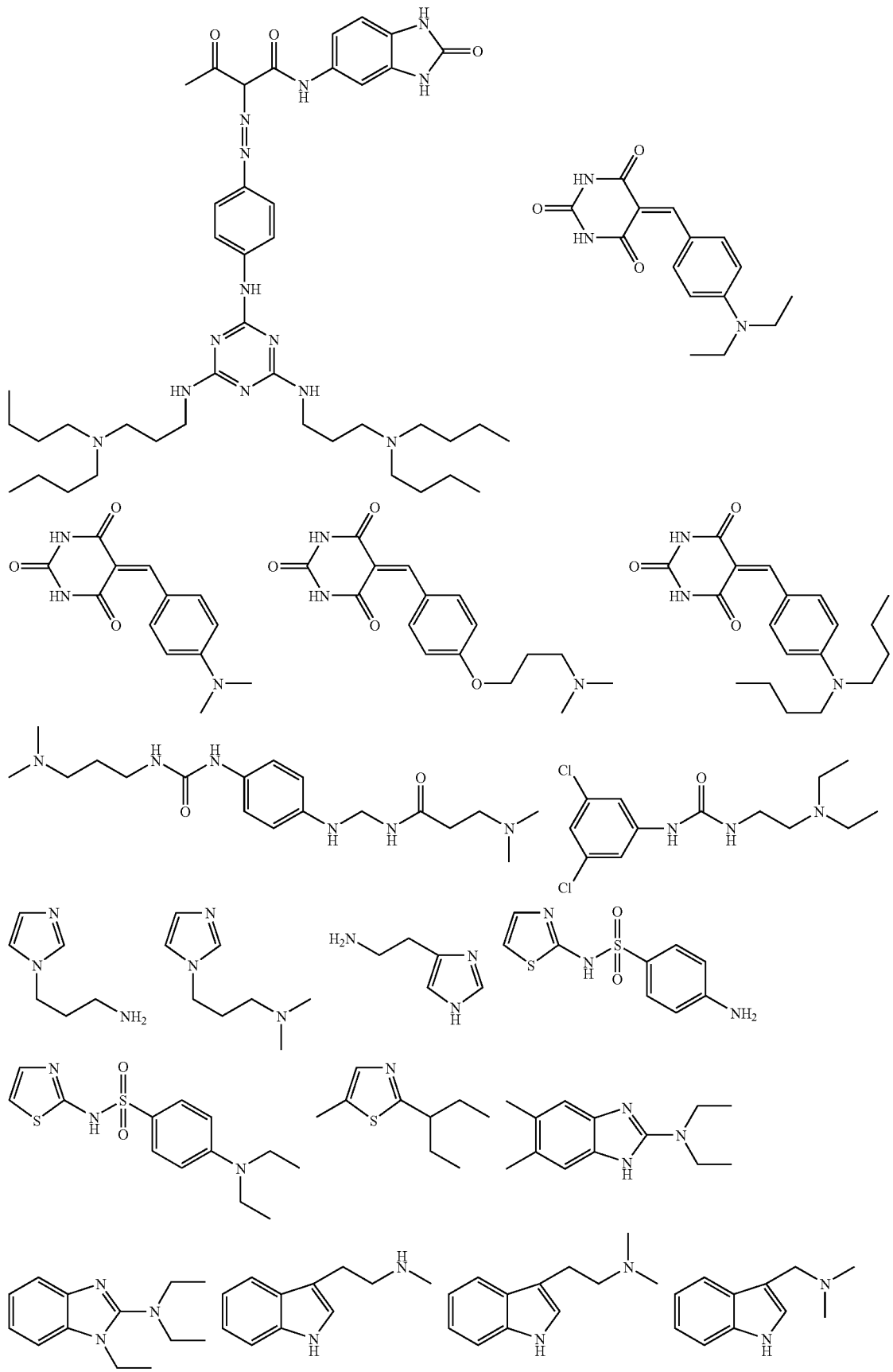

-continued

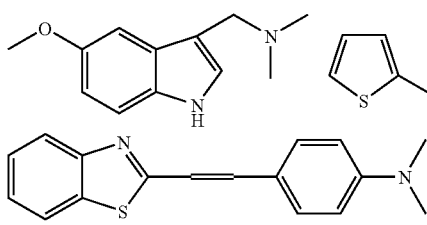 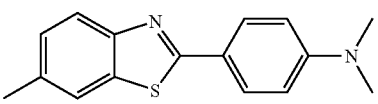

(a-2) these specific pigment derivatives are suitably selected in consideration of the type of a pigment used, and those having a structure identical with or similar to the pigment skeletal structure of an organic pigment required to be dispersed are preferably selected. The amino group which exists together with the pigment skeletal structure in the molecule preferably has a tertiary amino structure such as a dialkylamino group, from the viewpoint of the interaction property with a polymer.

When (A) the pigment dispersion is prepared in the invention, the content (solid content) of (a-2) the specific pigment derivative in the pigment dispersion is preferably from 0.5% by weight to 40% by weight, and more preferably from 1% by weight to 15% by weight with respect to the total solid component of the pigment dispersion.

The content of the specific pigment derivative is preferably from 0.5 part by weight to 50 parts by weight, and more preferably from 1 part by weight to 25 parts by weight, based on 100 parts by weight of (a-1) the pigment described later.

<(a-1) Pigment>

Examples of the pigment which can be used in (A) the pigment dispersion according to the invention may include various conventionally known inorganic pigments and organic pigments. Whether the pigment is an organic pigment or an organic pigment, the pigment preferably has a high transmittance. In consideration of high transmittance, it is preferred to use pigment with a particle size as small as possible. Also in consideration of handling property, a mean diameter of primary particles of the pigment is preferably from 0.01 μm to 0.3 μm, and more preferably 0.01 μm to 0.15 μm. When the particle diameter is within the above range, the pigment has a high transmittance, is excellent in color property as well as effective to form a color film with high contrast.

The mean diameter of primary particles is determined by observing the primary particles through a scanning electron microscope (SEM) or a transmission electron microscope (TEM), measuring particle sizes of 100 particles in the portion where no particle is aggregated, and therefore calculating an average value of the obtained particle sizes.

Examples of the inorganic pigment include metal compounds such as metal oxides and metal complex salts, and specific examples thereof include metal oxides of iron, cobalt, aluminum, cadmium, lead, copper, titanium, magnesium, chromium, zinc, and antimony, and metal complex oxides of these metals.

The following are examples of the organic pigment.

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279;

C.I. Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214;

C.I. Pigment Orange 2, 5, 13, 16, 17:1, 31, 34, 36, 38, 43, 46, 48, 49, 51, 52, 55, 59, 60, 61, 62, 64, 71, and 73;

C.I. Pigment Green 7, 10, 36, and 37;

C.I. Pigment Blue 1, 2, 15, 15:1, 15:2, 15:3, 15:4, 15:6, 16, 22, 60, 64, 66, 79, C.I. Pigment Blue in which the substituent C1 in 79 is replaced by OH, and C.I. Pigment Blue 80;

C.I. Pigment Violet 1, 19, 23, 27, 32, 37, and 42;

C.I. Pigment Brown 25, and 28;

C.I. Pigment Black 1, and 7

Among the above pigments, the following are preferable. However the invention is not restricted to them.

C.I. Pigment Yellow 11, 24, 108, 109, 110, 138, 139, 150, 151, 154, 167, 180, and 185;

C.I. Pigment Orange 36 and 71;

C.I. Pigment Red 122, 150, 171, 175, 177, 209, 224, 242, 254, 255, and 264;

C.I. Pigment Violet 19, 23, and 32;

C.I. Pigment Blue 15:1, 15:3, 15:6, 16, 22, 60, and 66;

C.I. Pigment Green 7, 36, and 37; and

C.I. Pigment Black 1 and 7.

—Pulverization of Pigment—

In the invention, a fine and granulated organic pigment may be used if necessary. Pulverization of the pigment can be achieved through a process that comprises preparing a viscous liquid composition of the pigment together with a water-soluble organic solvent and a water-soluble inorganic salt and then applying stress to the composition using a wet grinding apparatus or the like to pulverize the pigment.

Examples of the water-soluble organic solvent used in the step of pulverizing the pigment includes methanol, ethanol, isopropanol, n-propanol, isobutanol, n-butanol, ethylene glycol, diethylene glycol, diethylene glycol monomethyl ether, diethylene glycol monoethyl ether, diethylene glycol monobutyl ether, propylene glycol, and propylene glycol monomethyl ether acetate.

Another solvent having low solubility to water or water-insoluble solvent may be used as long as the solvent is used in such a small amount that it is adsorbed onto the pigment and not discharged into waste water, and examples of such solvent include benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane, dodecane, cyclohexane, methyl cyclohexane, halogenated hydrocarbons, acetone, methyl ethyl ketone, methyl isobutyl ketone, cyclohexanone, dimethylformamide, dimethylsulfoxide and N-methylpyrrolidone.

In the invention, the solvent used in the step of pulverizing the pigment may be a single solvent or a mixture of two or more of them if necessary.

In the invention, examples of the water-soluble inorganic salt used in the step of pulverizing the pigment includes sodium chloride, potassium chloride, calcium chloride, barium chloride and sodium sulfate.

The amount of the water-soluble inorganic salt is used in the pulverizing step is from 1 time by weight to 50 times by weight as much as the amount of the pigment and exhibits a higher pulverizing effect when used in a larger amount. From the viewpoint of productivity, the amount of the water-soluble inorganic salt is more preferably from 1 time by weight to 10 times by weight. The water content of the inorganic salt used is preferably 1% or less.

The amount of the water-soluble organic solvent used in the pulverizing step is in a range of from 50 parts by weight to 300 parts by weight, and more preferably in a range of from 100 parts by weight to 200 parts by weight, based on 100 parts by weight of the pigment.

The operation conditions of a wet grinding apparatus in the step of pulverizing the pigment are not particularly limited. When the apparatus is a kneader, the operation conditions are that the number of revolutions of a blade in the apparatus is preferably from 10 rpm to 200 rpm for efficient progress of grinding with grinding media, and the revolution ratio between two screws is preferably relatively higher for a higher grinding effect. The total operation time including the dry grinding time is preferably from 1 hour to 8 hours, and the temperature in the apparatus is preferably from 50° C. to 150° C. The water-soluble inorganic salt that is grinding media is preferably spherical with a grinding particle size of from 5 μm to 50 μm having a sharp particle-size distribution.

—Blending of Pigments (Color Matching)—

These organic pigments may be used singly or in a combination thereof for increasing color purity. Specific examples of such combination are as follows. Mixtures of at least one red pigment such as an anthraquinone pigment, a perylene pigment or a diketopyrropyrrole pigment and a diazo yellow pigment, an isoindoline yellow pigment, a quinophthalone yellow pigment or a perylene red pigment, and an anthraquinone red pigment or a diketopyrrolopyrrole red pigment. Examples of the anthraquinone pigment include C. I. Pigment Red 177; examples of the perylene pigment include C. I. Pigment Red 155 and C. I. Pigment Red 224; and examples of the diketopyrrolopyrrole pigment include C. I. Pigment Red 254. In respect of color reproducibility, a mixture with C. I. Pigment Yellow 83, C. I. Pigment Yellow 139 or C. I. Pigment Red 177 is preferable. The weight ratio of the red pigment to another pigment is preferably from 100:5 to 100:80. In this range, light transmission in a wavelength region of from 400 nm to 500 nm is suppressed, color purity is improved, and sufficient coloring power is achieved. Particularly, the optimum weight ratio is in a range of from 100:10 to 100:65. A combination of red pigments can be prepared in accordance with chromaticity.

As the green pigment, a halogenated phthalocyanine pigment may be used singly or as a mixture with a diazo yellow pigment, a quinophthalone yellow pigment, an azomethine yellow pigment or an isoindoline yellow pigment. Preferable examples of such mixtures include mixtures of C. I. Pigment Green 7, 36 or 37 and C. I. Pigment Yellow 83, C. I. Pigment Yellow 138, C. I. Pigment Yellow 139, C. I. Pigment Yellow 150, C. I. Pigment Yellow 180 or C. I. Pigment Yellow 185. The weight ratio of the green pigment to the yellow pigment is preferably from 100:5 to 100:200. In this weight ratio range, light transmission in a wavelength region of from 400 nm to 450 nm can be suppressed, color purity can be improved, and hues in the vicinity of target NTSC hues can be obtained as designed without shifting the main wavelength toward longer wavelengths. The weight ratio is particularly preferably in a range of from 100:20 to 100:150.

As the blue pigment, a phthalocyanine pigment may be used alone or as a mixture with a dioxazine violet pigment. Particularly preferable examples include a mixture of C. I. Pigment Blue 15:6 and C. I. Pigment Violet 23.

The weight ratio of the blue pigment to the violet pigment is preferably from 100:0 to 100:100, and more preferably 100:70 or less.

As a pigment preferable for use in black matrix, carbon black, graphite, titan black, iron oxide or titanium oxide may be used alone or as a mixture thereof, and a combination of carbon black and titan black is preferable.

The weight ratio of carbon black to titan black is preferably in a range of from 100:0 to 100:60. When the ratio is 100:61 or more, dispersion stability may be deteriorated.

—Dye—

To adjust color tone, a dye may be used as a coloring agent together with the pigment in the invention.

The dye usable as a coloring agent is not particularly limited, and known dyes used conventionally in color filters may be used. Examples of such dyes includes those described in JP-A No. 64-90403, JP-A No. 64-91102, JP-A No. 1-94301, JP-A No. 6-11614, Japanese Patent No. 2592207, U.S. Pat. No. 4,808,501, U.S. Pat. No. 5,667,920, U.S. Pat. No. 5,059,500, JP-A No. 5-333207, JP-A No. 6-35183, JP-A No. 6-51115, JP-A No. 6-194828, JP-A No. 8-211599, JP-A No. 4-249549, JP-A No. 10-123316, JP-A No. 11-302283, JP-A No. 7-286107, JP-A No. 2001-4823, JP-A No. 8-15522, JP-A No. 8-29771, JP-A No. 8-146215, JP-A No. 11-343437, JP-A No. 8-62416, JP-A No. 2002-14220, JP-A No. 2002-14221, JP-A No. 2002-14222, JP-A No. 2002-14223, JP-A No. 8-302224, JP-A No. 8-73758, JP-A No. 8-179120, and JP-A No. 8-151531.

Dyes that can be used in the invention have chemical structures based on pyrazole azo, anilinoazo, triphenylmethane, anthraquinone, anthrapyridone, benzylidene, oxonol, pyrazolotriazol azo, pyridone azo, cyanine, phenothiazine, pyrrolopyrazole azomethine, xanthene, phthalocyanine, benzopyran and indigo.

In the invention, the content of (a-1) the pigment in (A) the pigment dispersion is preferably from 10% by weight to 60% by weight, and more preferably from 15% by weight to 50% by weight, based on the total solid component (weight) of (A) the pigment dispersion. A content of the pigment in this range is effective in securing excellent color property with sufficient color density.

<(a-3) Dispersant>

(A) the pigment dispersion in the invention contains at least one dispersant (a-3). By incorporation of the dispersant, dispersibility of the pigment can be improved.

The dispersant may be selected suitably from pigment dispersants and surfactants known in the art.

Specifically, various compounds may be used, and examples of such dispersants include cationic surfactants such as Organosiloxane Polymer KP341 (manufactured by Shin-Etsu Chemical Co.), (meth)acrylate (co)polymer Polyflow No. 75, No. 90 and No. 95 (all manufactured by Kyoeisha Chemical Co., Ltd.), and W001 (manufactured by Yusho Co., Ltd.); nonionic surfactants such as polyoxyethylene lauryl ether, polyoxyethylene stearyl ether, polyoxyethylene oleyl ether, polyoxyethylene octylphenyl ether, polyoxyethylene nonylacid phenyl ether, polyethylene glycol dilaurate, polyethylene glycol distearate, and sorbitan fatty esters;

anionic surfactants such as W004, W005, and W017 (all manufactured by Yusho Co., Ltd.); polymer dispersants such as EFKA-46, EFKA-47, EFKA-47EA, EFKA Polymer 100, EFKA Polymer 400, EFKA Polymer 401 and EFKA Polymer 450 (all manufactured by Ciba Specialty Chemicals) and Disperse Aid 6, Disperse Aid 8, Disperse Aid 15 and Disperse Aid 9100 (all manufactured by SAN NOPCO LTD.); various Solsperse dispersants such as Solsparse 3000, 5000, 9000, 12000, 13240, 13940, 17000, 24000, 26000, and 28000 (all manufactured by The Lubrizol Corporation); and Adeka Pluronic L31, F38, L42, L44, L61, L64, F68, L72, P95, F77, P84, F87, P94, L101, P103, F108, L121, and P-123 (all manufactured by Asahi Denka Kogyo K.K.), Isonet S-20 (Sanyo Chemical Industries, Ltd.), and Disperbyk 101, 103, 106, 108, 109, 111, 112, 116, 130, 140, 142, 162, 163, 164, 166, 167, 170, 171, 174, 176, 180, 182, 2000, 2001, 2050, and 2150 (all manufactured by BYK Chemie Japan). Other examples include oligomers or polymers having a polar group in the molecular terminal or in the side chain, such as acrylic copolymers.

The content of the dispersant in the pigment dispersion is preferably from 1 part to 100 parts by weight, and more preferably from 3 parts by weight to 70 parts by weight, based on 100 parts by weight of (a-1) the pigment described above.

In addition to the essential components (a-1) to (a-3) described above, various compounds may be added to prepare (A) the pigment dispersion in the invention. Hereinafter, optional components useful in preparing (A) the pigment dispersion are described.

—Pigment Derivative—

Pigment derivatives other than (a-2) the specific pigment derivative in the invention may be added if necessary to (A) the pigment dispersion in the invention.

Use of other pigment derivatives is effective in constituting a color filter excellent in transparency with high contrast because their portion having affinity with the dispersant or the pigment derivatives having polar groups introduced into them can be adsorbed onto the surface of the pigment and used as adsorption sites of the dispersant so that the pigment can be dispersed as fine particles in the colored curable composition and prevented from being re-aggregated.

As other pigment derivatives, known pigment derivatives having an organic pigment as a basic skeleton can be used. Specific examples of the organic pigment include a quinacridone pigment, a phthalocyanine pigment, an azo pigment, a quinophthalone pigment, an isoindoline pigment, an isoindolinone pigment, a quinoline pigment, a diketopyrropyrrole pigment and a benzoimidazolone pigment. Other pigment derivatives also include pale yellow aromatic polycyclic compounds such as compounds based on naphthalene, anthraquinone, triazine and quinoline, which are generally not called pigments. The pigment derivatives that can be used herein include those described in JP-A No. 11-49974, JP-A No. 11-189732, JP-A No. 10-245501, JP-A No. 2006-265528, JP-A No. 8-295810, JP-A No. 11-199796, JP-A No. 2005-234478, JP-A No. 2003-240938, and JP-A No. 2001-356210.

In the invention, the content of other pigment derivatives in the pigment dispersion is preferably from 0 part by weight to 30 parts by weight, and more preferably from 3 parts by weight to 20 parts by weight, based on 100 parts by weight of the pigment. When the content is in this range, dispersion can be performed well with viscosity kept low and simultaneously dispersion stability after dispersion can be improved to achieve excellent color property with high transmission, and when a color filter is produced, the color filter can have high contrast and excellent color property.

<Preparation of (A) the Pigment Dispersion>

Preparation of the pigment dispersion containing the components (a-1) to (a-3) and optional components can be carried out, for example, by mixing and dispersing (a-1) the pigment and (a-3) the dispersant with homogenizer in advance and then finely dispersing the resulting dispersion with zirconia beads in a beads dispersing machine (for example, Disper Mat manufactured by GETZMANN). The dispersing time is preferably from about 3 hours to about 6 hours. (a-2) the specific pigment derivative may be added in any steps of forming the pigment dispersion, but is preferably added in the pulverizing step and/or at the time of finely dispersing the pigment.

(A) the pigment dispersion prepared in this manner is compounded with (B) the oxime-based initiator and (C) the polymerizable compound described later and with other components, whereby the colored curable composition of the invention is obtained.

The amount of (A) the pigment dispersion contained in the colored curable composition of the invention is preferably in a range of from 5% by weight to 90% by weight, and more preferably in a range of from 25% by weight to 85% by weight.

By incorporating (A) the pigment dispersion in this compounding amount, the amount of (a-1) the pigment contained in the colored curable composition of the invention comes to be in a range of from 25% by weight to 65% by weight with respect to the total solid component of the colored curable composition, to enable a colored region having a sufficient hue to be formed even in a thin layer.

<(B) Oxime-Based Initiator>

When the colored curable composition of the invention is used particularly in forming a thin film, the concentration of the pigment in a thin film should be increased as described above, and thus a radical-generating initiator cannot be added in a large amount. In addition, the concentration of the pigment is so high that the concentrations of a sensitizer and an initiator cannot be sufficiently increased, and thus the effect of the sensitizer on improvement of curing by a mechanism of initiation with electron transfer and energy transfer cannot be sufficiently obtained.

Particularly when the curable composition of the invention is used in forming highly fine, microscopic colored regions such as in solid image pickup elements, a triazine initiator that generates a halogen upon exposure may cause pollution of a light source such as a stepper exposure device and is thus not usable though the triazine initiator is highly sensitive. Accordingly, an oxime compound compatible with a light source which emits light of 300 nm or more and degradable directly by light is preferably used as the initiator. Particularly, the oxime-based initiator is used more effectively in the composition with a lower proportion of polymerizable components, wherein the pigment is contained in an amount 30% or more, particularly 40% or more, with respect to the total solid component of the curable component.

Any oxime compound can be used as the initiator in the invention as long as it is a compound having a (—C=N—O—) bond in the molecule. Preferable examples of the oxime compound include compounds represented by the following formulae (I) or (II):

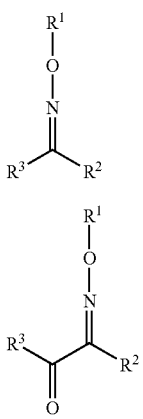

$$\text{(I)} \quad \underset{R^3}{\overset{R^1}{\underset{\|}{\overset{|}{O}}}}\underset{R^2}{\overset{N}{C}}$$

$$\text{(II)}$$

In the formulae (I) and (II), $R^1$ is a monovalent organic group, which is preferably an organic group having a carbonyl group or a sulfo group in the structure, and from the viewpoint of sensitivity and stability, $R^1$ is preferably a monovalent organic group represented by the following formula (III) or (IV):

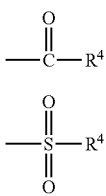

In formulae (III) and (IV), $R^4$ represents a monovalent organic group and is specifically preferably an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms. These organic groups may have a substituent, and examples of the introducible substituent include a halogen atom, a hydroxy group, an alkyl group, an alkenyl group, an alkynyl group, a cycloalkyl group, a cycloalkenyl group, a cycloalkynyl group, an aryl group, a heterocyclic group, a cyano group, an alkoxy group, an aryloxy group, a thioalkoxy group, a thioaryloxy group, a carboxy group, an alkoxycarbonyl group, a sulfo group, a sulfonamido group, a urea group, a thiourea group, an amino group, an amido group, a carbonyl group, a nitro group, and substituents having these groups.

From the viewpoints of stability over time, sensitivity and productivity, $R^1$ is most preferably a substituent represented by formula (III) wherein $R^4$ is an alkyl group or an aryl group.

In formulae (I) and (II), $R^2$ represents a hydrogen atom or a monovalent organic group, and when $R^2$ represents a monovalent organic group, examples of the organic group include an alkyl group, an alkenyl group, an alkynyl group, a cycloalkyl group, a cycloalkenyl group, a cycloalkynyl group, an aryl group, a heterocyclic group and an alkoxy group, each of which has 1 to 20 carbon atoms. These organic groups may have a substituent, and the examples of introducible substituent include a halogen atom, a hydroxy group, an alkyl group, an alkenyl group, an alkynyl group, a cycloalkyl group, a cycloalkenyl group, a cycloalkynyl group, a cyano group, an aryl group, a heterocyclic group, an alkoxy group, an aryloxy group, a thioalkoxy group, a thioaryloxy group, a carboxy group, an alkoxycarbonyl group, a sulfo group, a sulfonamido group, a urea group, a thiourea group, an amino group, an amido group, a carbonyl group, a nitro group, and substituents having these groups.

$R^3$ represents a monovalent organic group, and examples thereof include an alkyl group, an alkenyl group, an alkynyl group, a cycloalkyl group, a cycloalkenyl group, a cycloalkynyl group, an aryl group, a heterocyclic group and an alkoxy group, each of which has 1 to 20 carbon atoms. These organic groups may have a substituent, and examples of the introducible substituent include a halogen atom, a hydroxy group, an alkyl group, an alkenyl group, an alkynyl group, a cycloalkyl group, a cycloalkenyl group, a cycloalkynyl group, an aryl group, a cyano group, a heterocyclic group, an alkoxy group, an aryloxy group, a thioalkoxy group, a thioaryloxy group, a carboxy group, an alkoxycarbonyl group, a sulfo group, a sulfonamido group, a urea group, a thiourea group, an amino group, an amido group, a carbonyl group, a nitro group, and substituents having these groups.

From the viewpoint of sensitivity, $R^3$ is preferably an aryl group or a heterocyclic group out of those mentioned above. When $R^3$ is an aryl group, the aryl group is preferably substituted by a substituent having a nitrogen atom or a sulfur atom, and when $R^3$ is a heterocyclic group, the heterocyclic group preferably contains a nitrogen atom, an oxygen atom or a sulfur atom.

Specific examples of (B) the oxime-based initiator used preferably in the invention are shown below, but the invention is not limited thereto.

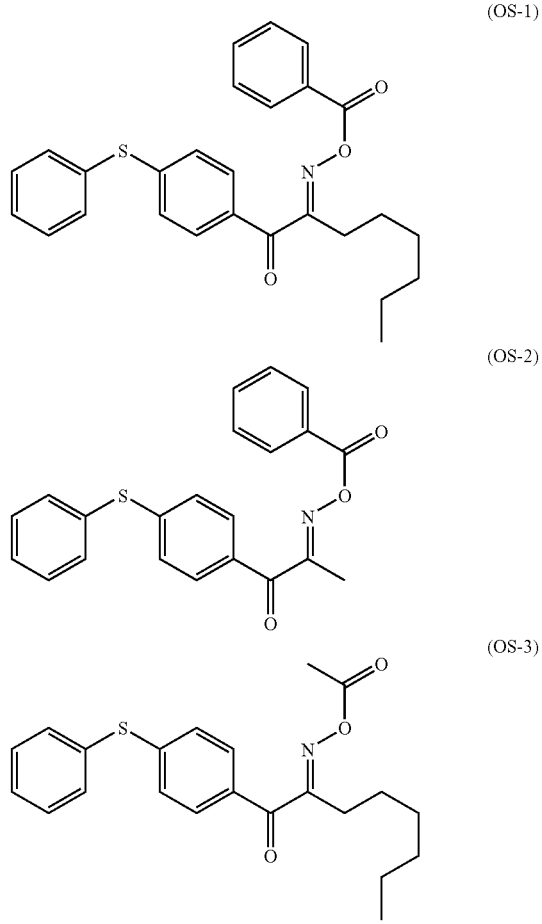

(OS-4)
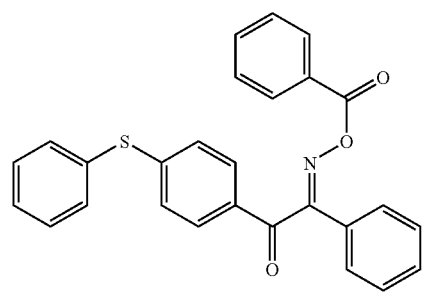
(OS-5)
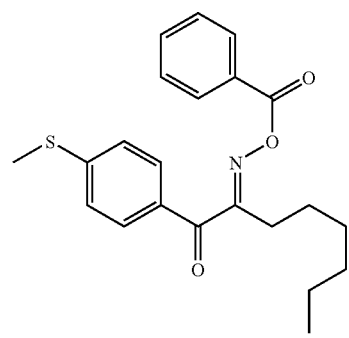
(OS-6)
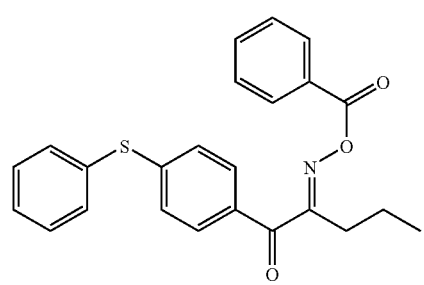
(OS-7)
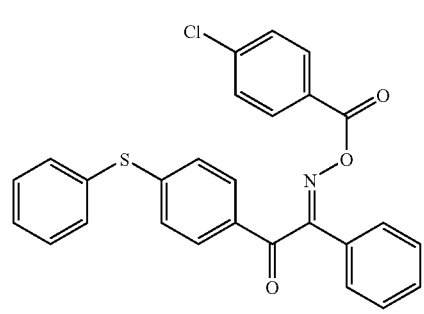
(OS-8)
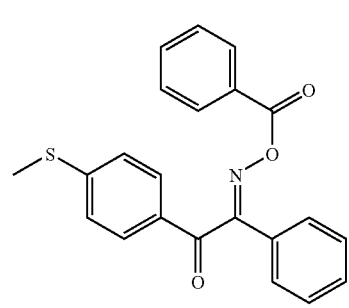
(OS-9)
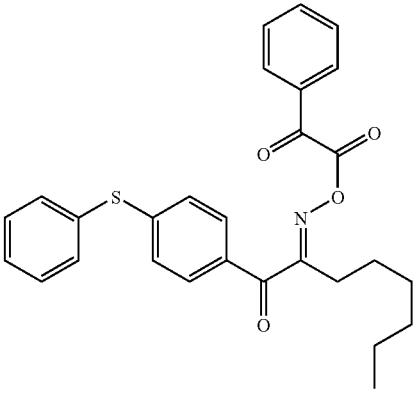
(OS-10)
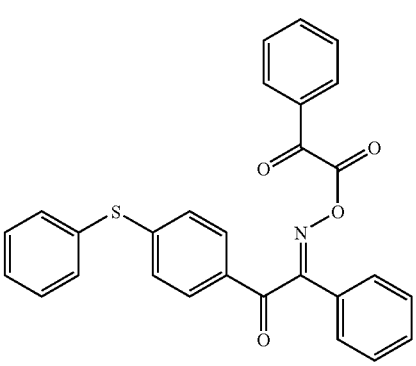
(OS-11)
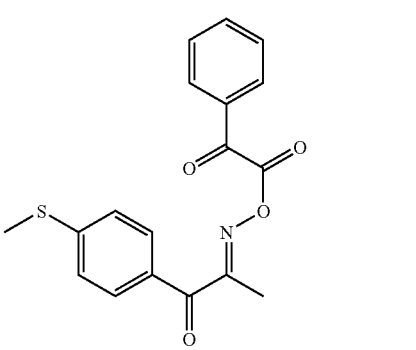
(OS-12)
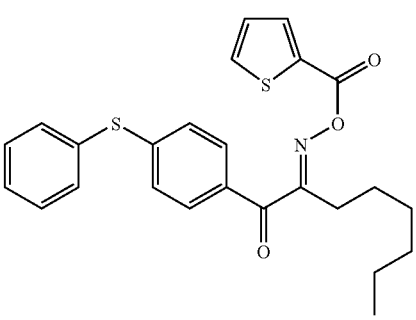
(OS-13)
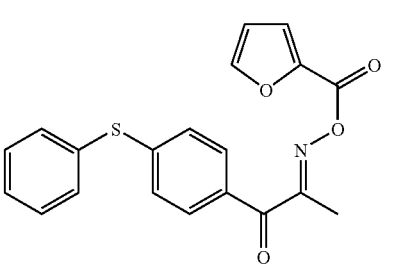

(OS-14)
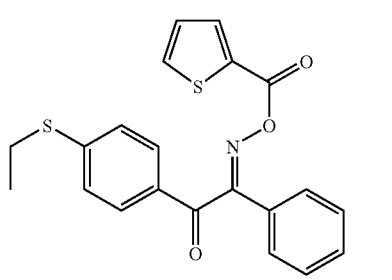
(OS-15)
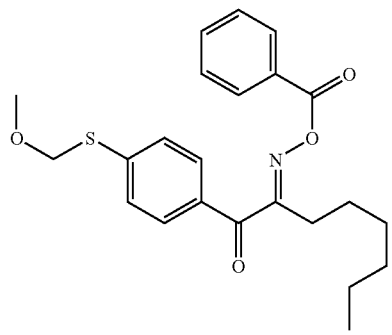
(OS-16)
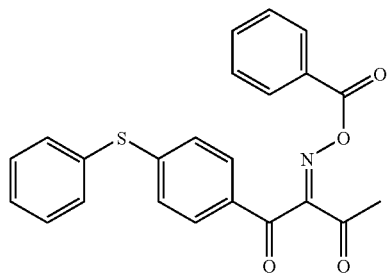
(OS-17)
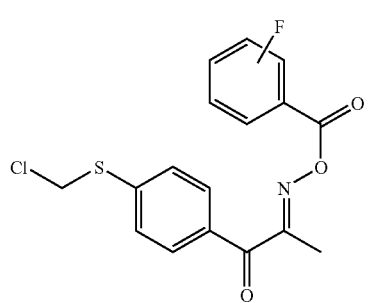
(OS-18)
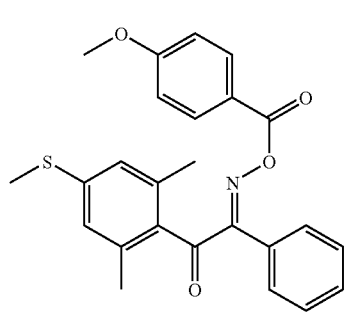
(OS-19)
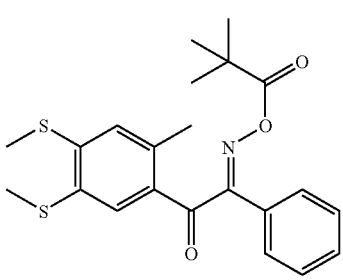
(OS-20)
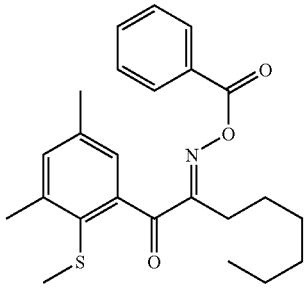
(OS-21)
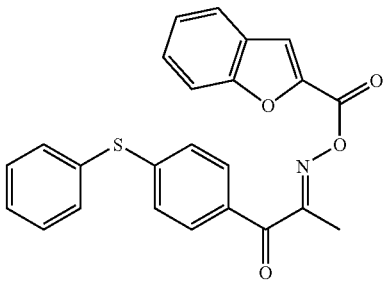
(OS-22)
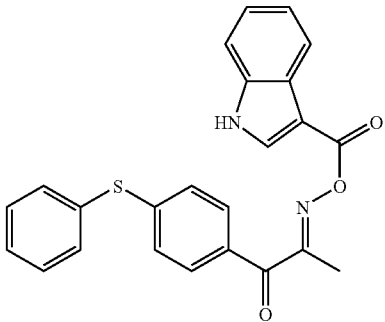
(OS-23)
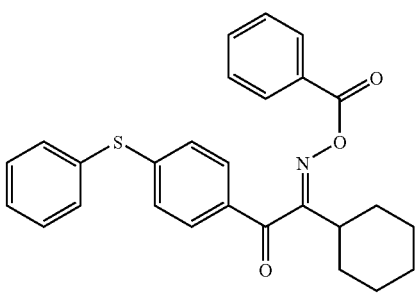

(OS-24) 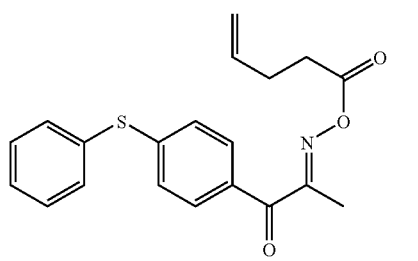
(OS-26) 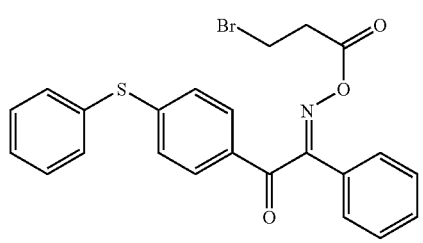
(OS-27) 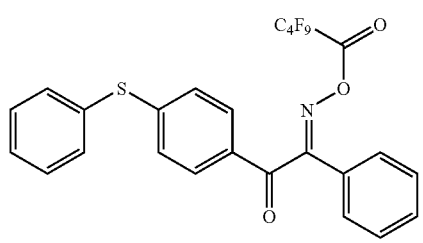
(OS-28) 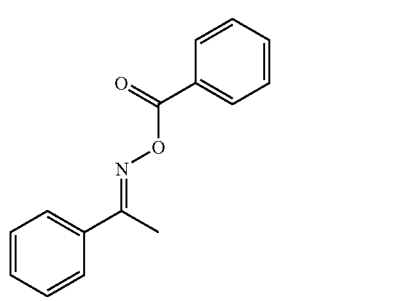
(OS-29) 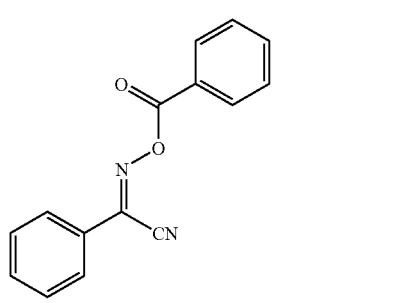
(OS-30) 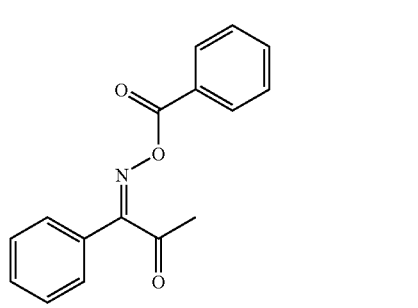
(OS-31) 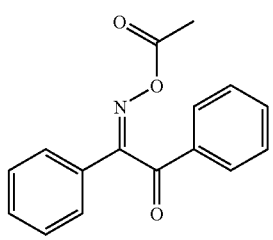
(OS-32) 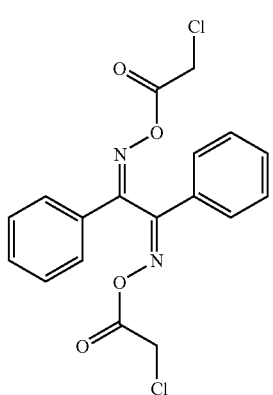
(OS-33) 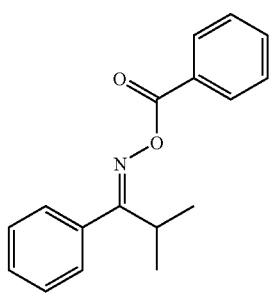
(OS-34) 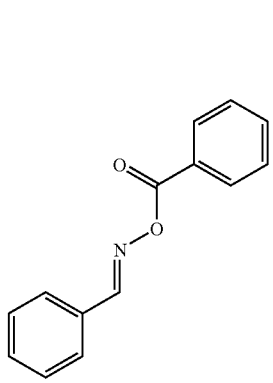
(OS-35) 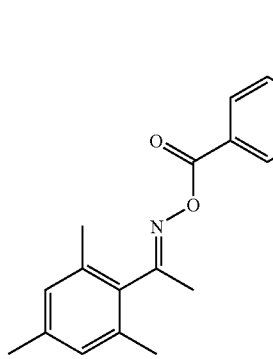

-continued
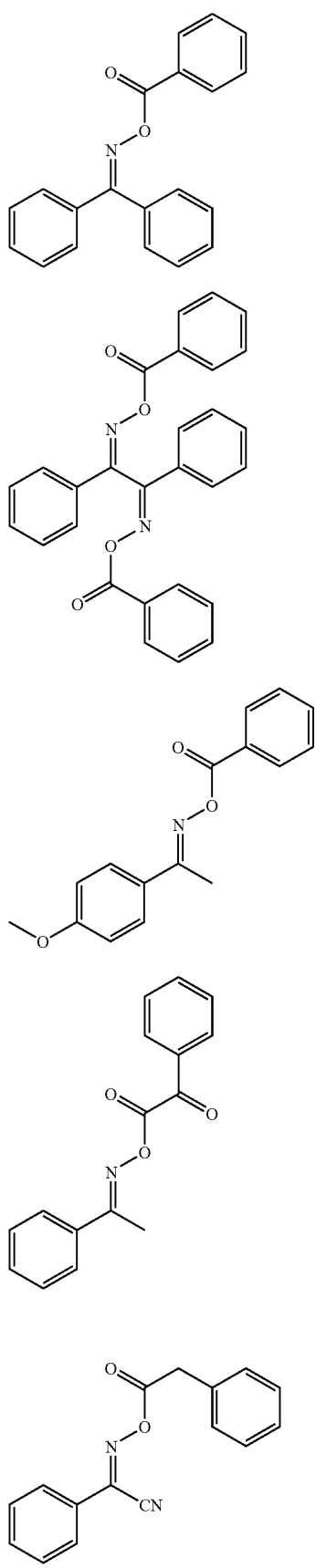
(OS-36)
(OS-37)
(OS-38)
(OS-39)
(OS-40)
-continued
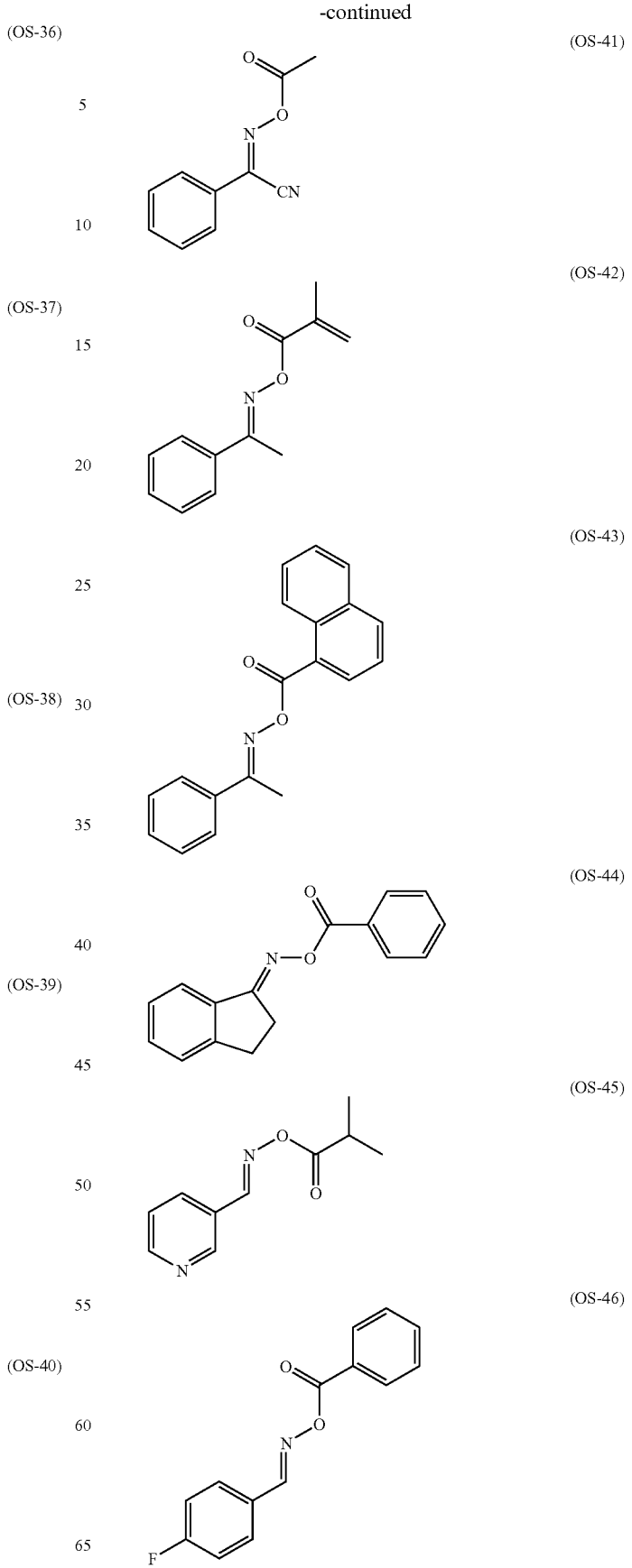
(OS-41)
(OS-42)
(OS-43)
(OS-44)
(OS-45)
(OS-46)

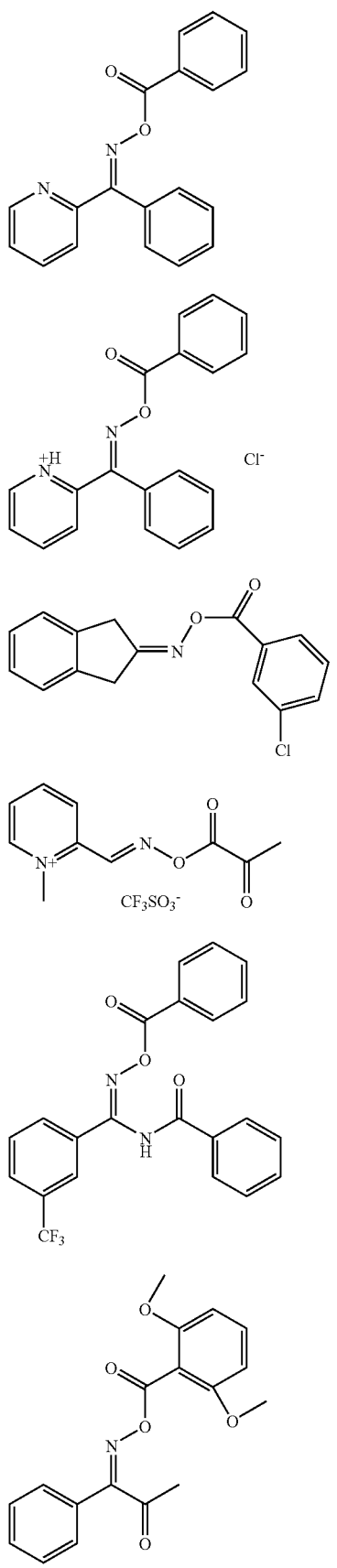
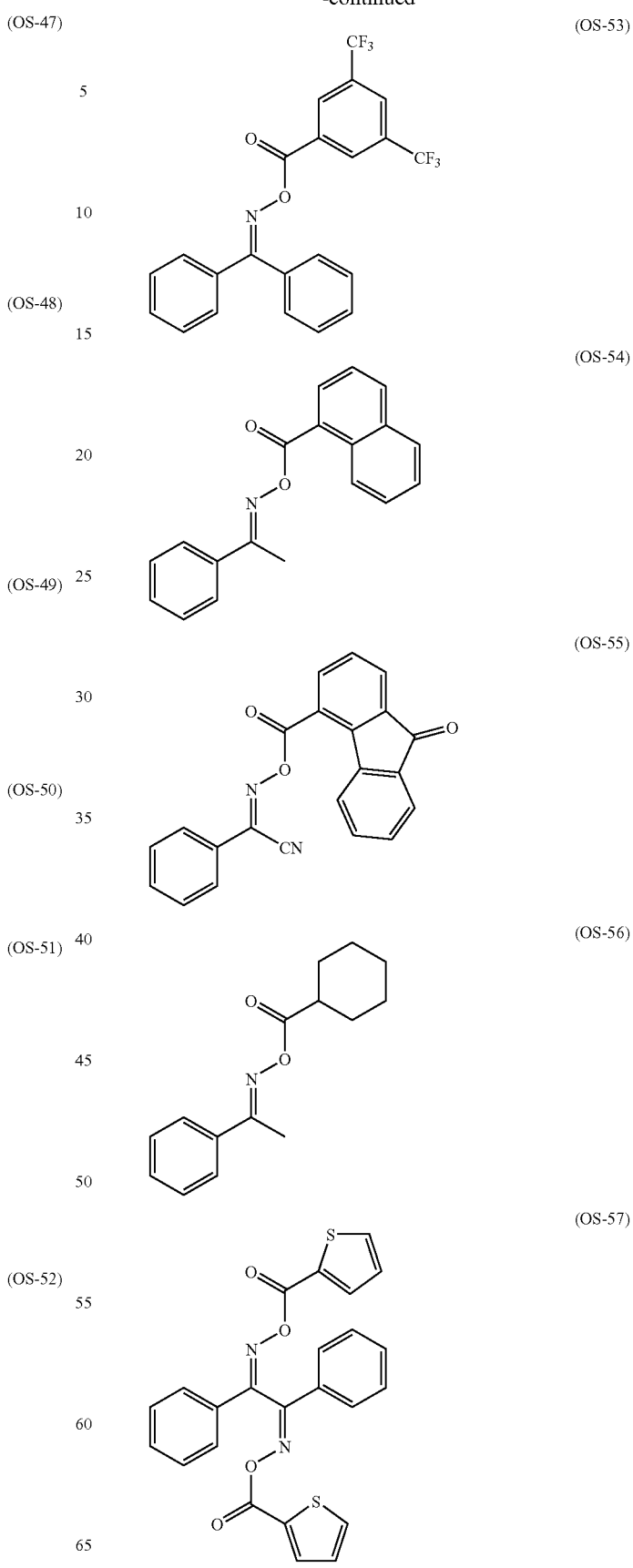

(OS-58)
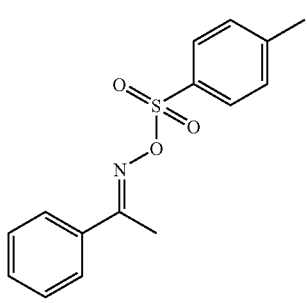
(OS-59)
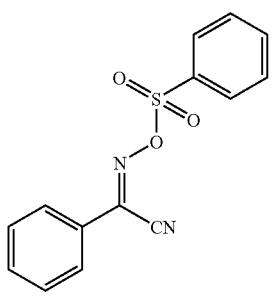
(OS-60)
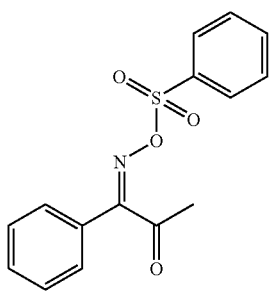
(OS-61)
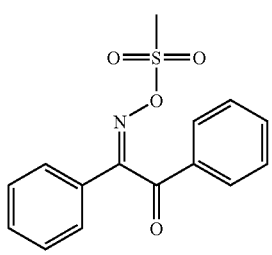
(OS-62)
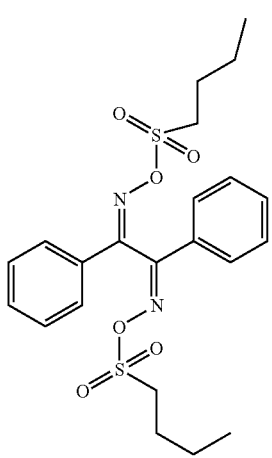
(OS-63)
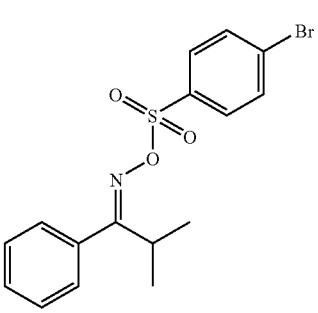
(OS-64)
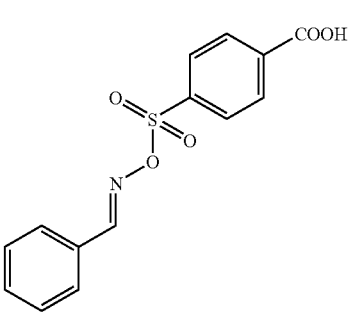
(OS-65)
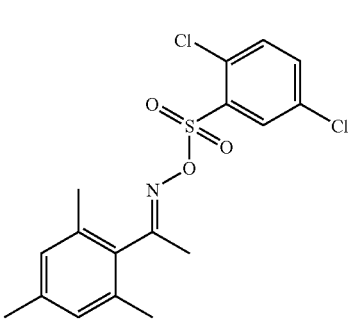
(OS-66)
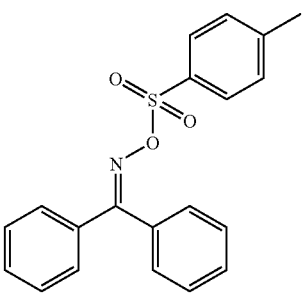
(OS-67)
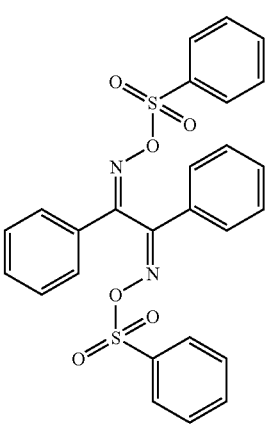

-continued
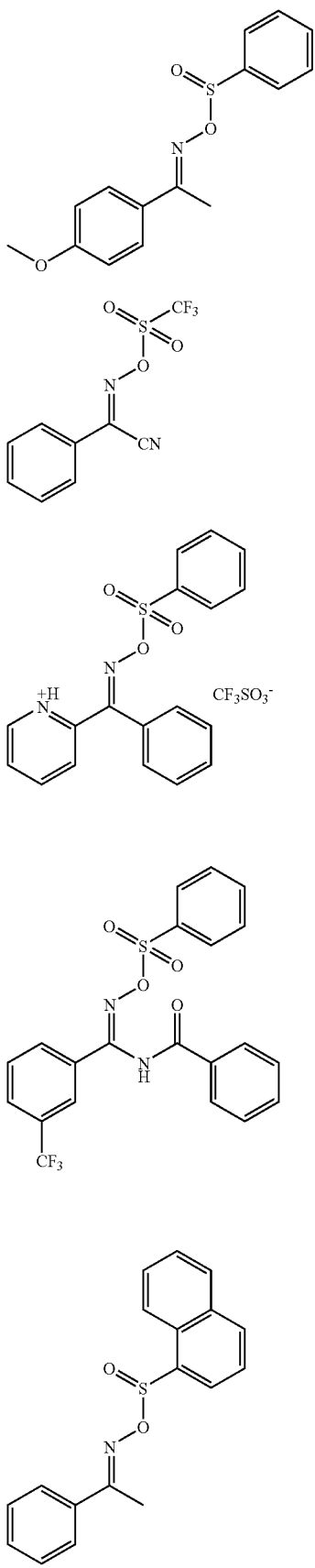
(OS-68)
(OS-69)
(OS-70)
(OS-71)
(OS-72)
-continued
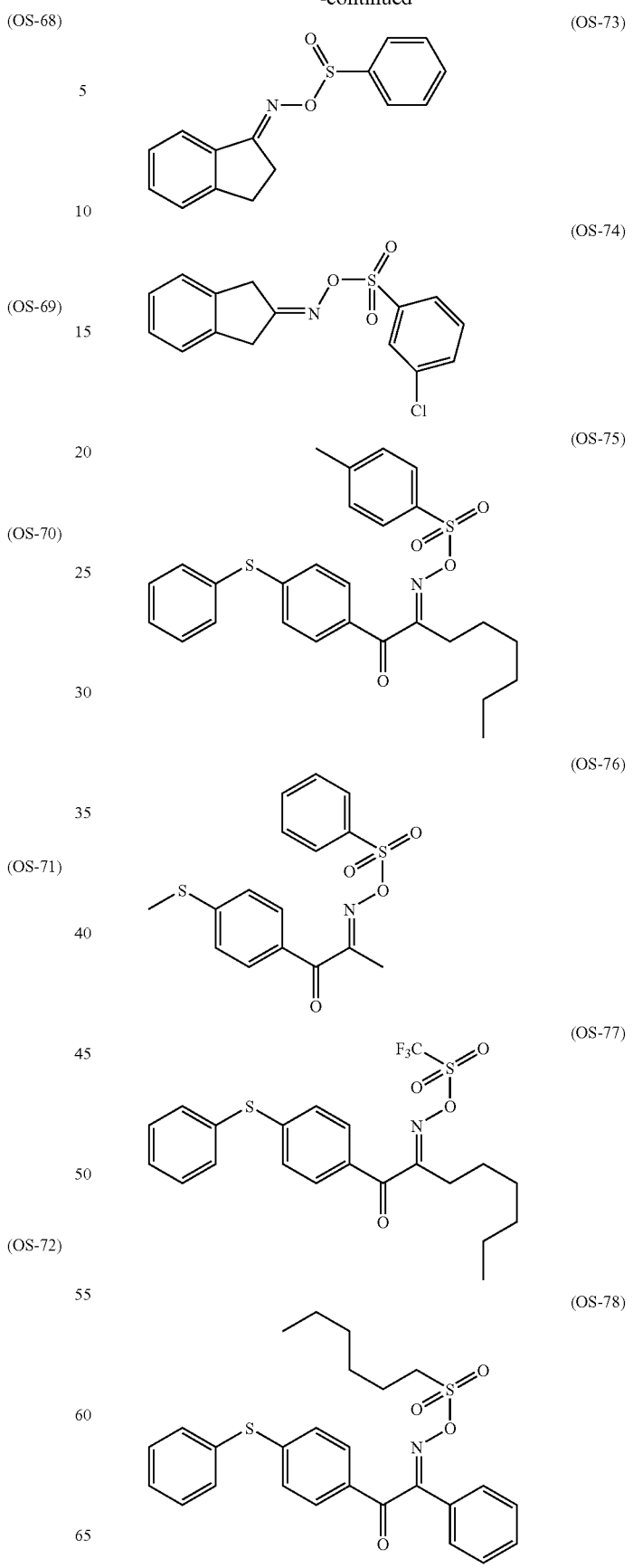
(OS-73)
(OS-74)
(OS-75)
(OS-76)
(OS-77)
(OS-78)

(OS-79) 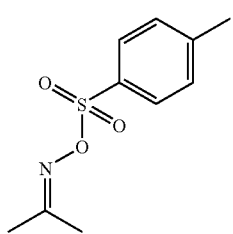
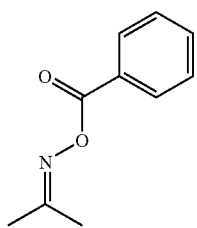
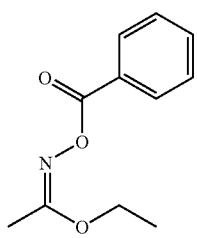
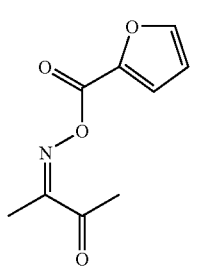
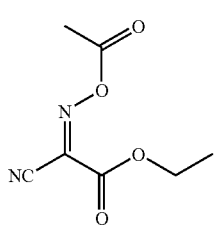
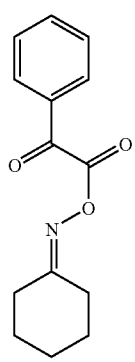
(OS-80)
(OS-81)
(OS-82)
(OS-83)
(OS-84)
(OS-85) 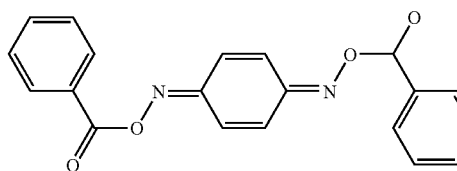
(OS-86) 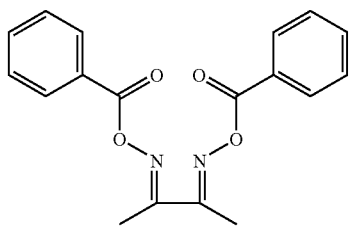
(OS-87) 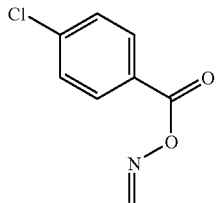
(OS-88) 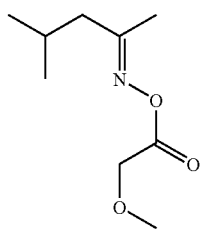
(OS-89) 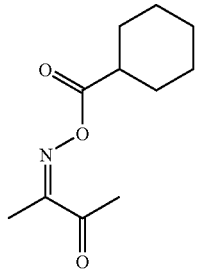
(OS-90) 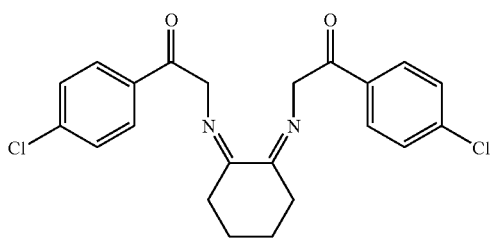
(OS-91) 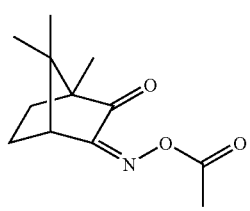

(OS-92) 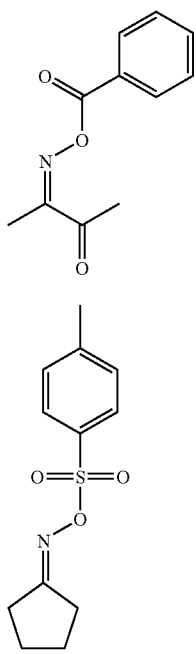
(OS-93)
(OS-94) 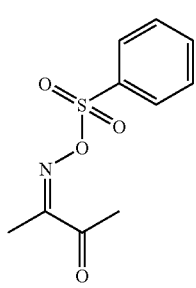
(OS-95) 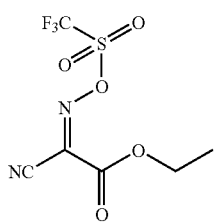
(OS-96) 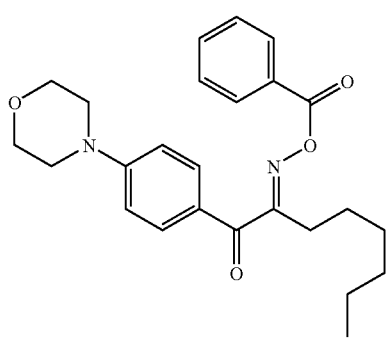
(OS-97) 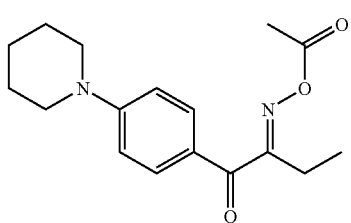
(OS-98) 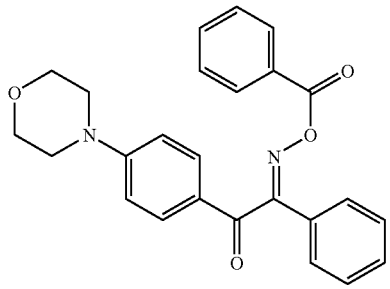
(OS-99) 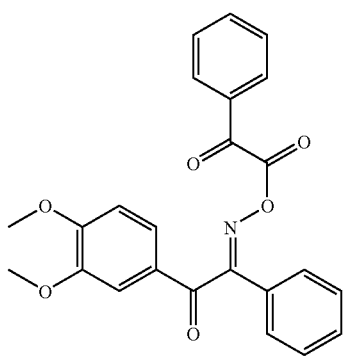
(OS-100) 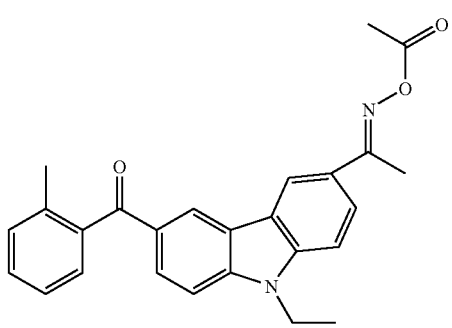
(OS-101) 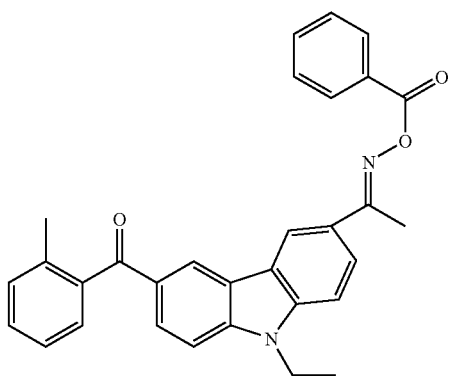

(OS-102)
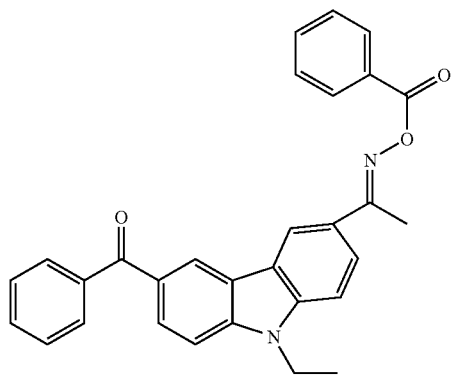
(OS-103)
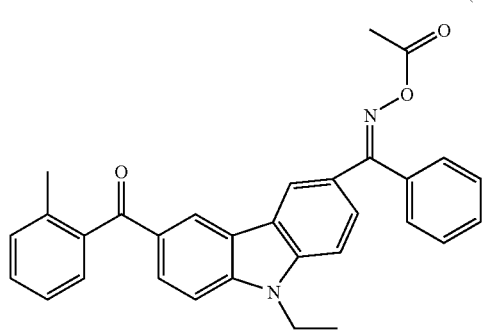
(OS-104)
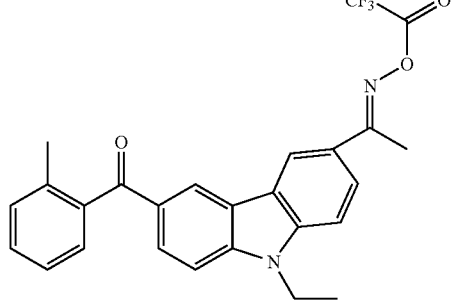
(OS-105)
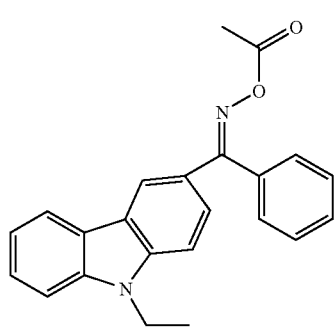
(OS-106)
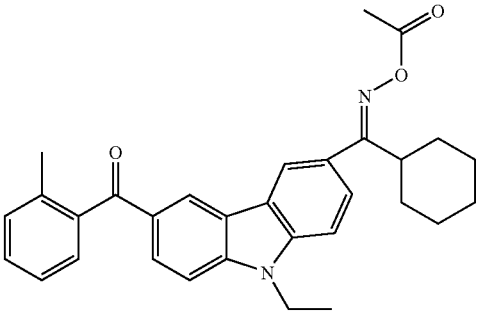
(OS-107)
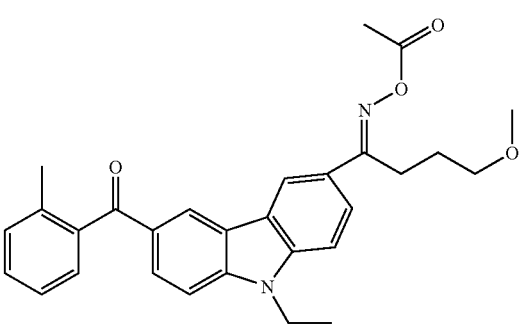
(OS-108)
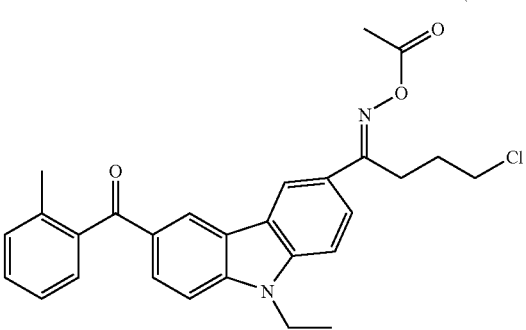
(OS-109)
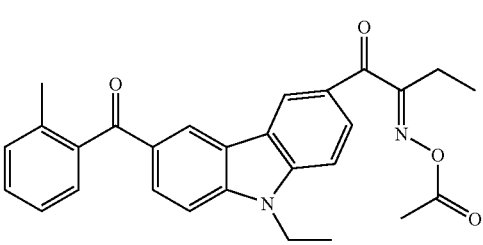
(OS-110)

(OS-111)

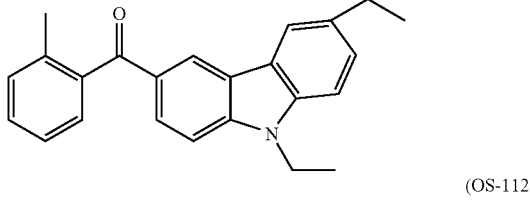

(OS-112)

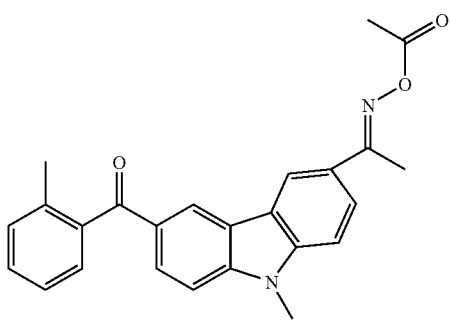

(OS-113)

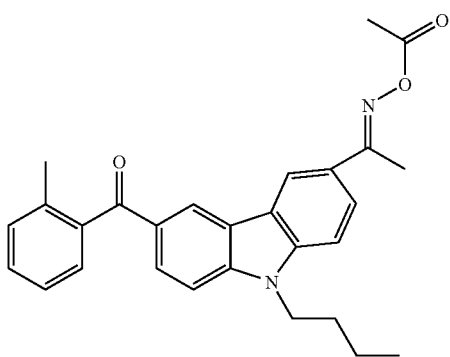

Preferable among these compounds are those compounds of formula (I) or (II) wherein $R^3$ is a sulfur atom-containing aryl group or a nitrogen-containing aromatic ring, and $R^1$ is an aryl group or an alkyl group. The most preferable compounds are those of the formula (II) wherein $R^3$ is a nitrogen-containing aromatic ring, and $R^1$ is an alkyl group having 1 to 3 carbon atoms.

The content of (B) the oxime-based initiator in the colored curable composition of the invention is preferably in a range of from 0.3% by weight to 30% by weight, and more preferably in a range of from 1% by weight to 20% by weight, with respect to the total solid component of the soloed colored composition.

(B) the oxime-based initiator is so highly sensitive that the initiator, even in the above compounding amount in the colored curable composition of the invention containing a large amount of the pigment, enables formation of an excellent cured film.

<(C) Copolymerizable Compound>

In the invention, (C) the polymerizable compound is used as an effective component together with (B) the oxime-based initiator. As the polymerizable compound that can be used in the invention, general radical-polymerizable compounds are described, and compounds known widely in the art as compounds having an ethylenically unsaturated double bond can be used without particular limitation. They have chemical embodiments of for example, a monomer, a prepolymer, that is, a dimer, a trimer or an oligomer; a mixture thereof; and a copolymer thereof.

Examples of the monomer and the copolymer thereof include unsaturated carboxylic acids (such as acrylic acid, methacrylic acid, itaconic acid, crotonic acid, isocrotonic acid, and maleic acid), esters thereof, and amides thereof. Preferably, esters of an unsaturated carboxylic acid and an aliphatic polyhydric alcohol compound, or amides of an unsaturated carboxylic acid and an aliphatic poly-amine compound may be used. Moreover, an addition reaction product of unsaturated carboxylic acid esters or amides having a nucleophilic substituent such as a hydroxy group, an amino group or a mercapto group, and monofunctional or polyfunctional isocyanates or epoxys, or dehydration condensation reaction products with a monofunctional or polyfunctional carboxylic acid, or the like may also be used preferably. Moreover, addition reaction products of unsaturated carboxylic acid esters or amides having a electrophilic substituent such as an isocyanate group or an epoxy group and monofunctional or polyfunctional alcohols, amines or thiols, and further, substitution reaction products of unsaturated carboxylic acid esters or amides having a leaving substituent such as a halogen group or a tosyloxy group and monofunctional or polyfunctional alcohols, amines, or thiols are also preferable. Further, as another example, it is possible to use a compound group in which the unsaturated carboxylic acid described above is displaced by unsaturated phosphonic acid, styrene, or vinyl ether.

Specific examples of the ester monomers of aliphatic polyhydric alcohols and unsaturated carboxylic acids include:

acrylic esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomers and EO-modified bodies and PO-modified bodies thereof;

methacrylic acid esters such as tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis [p-(3-methacryloxy-2-hydroxypropoxy)phenyl]dimethyl methane, bis[p-(methacryloxyethoxy)phenyl]dimethyl methane and EO-modified bodies and PO-modified bodies thereof;

itaconic acid esters such as ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate;

crotonic acid esters such as ethylene glycol dicrotonate, tetramethylene glycol dicrotonate, pentaerythritol dicrotonate, sorbitol tetradicrotonate;

isocrotonic acid esters such as ethylene glycol diisocrotonate, pentaerythritol diisocrotonate, and sorbitol tetraisocrotonate; and maleic esters such as ethylene glycol dimaleate, triethylene glycol dimaleate, pentaerythritol dimaleate, and sorbitol tetramaleate.

Other examples of preferable esters include aliphatic alcohol esters described in Japanese Patent Application Publication (JP-B) No. 51-47334 and JP-A No. 57-196231, those having an aromatic skeleton described in JP-A No. 59-5240, JP-A No. 59-5241 and JP-A No. 2-226149, and those having an amino group described in JP-A No. 1-165613.

In an embodiment, a mixture of such ester monomers is used.

Specific examples of monomers of the amides of aliphatic polyvalent amine compounds and unsaturated carboxylic acids include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, and xylylenebismethacrylamide preferable examples of other amide monomers include those having a cyclohexylene structure described in JP-B No. 54-21726.

In addition, urethane addition-polymerizable compounds produced by use of addition reaction between isocyanate and a hydroxy group are also preferable, and typical examples thereof include the vinylurethane compounds containing two or more polymerizable vinyl groups in the molecule which are prepared by addition-reacting a hydrogen group-containing vinyl monomer represented by the following formula (E) to a polyisocyanate compound having two or more isocyanate groups in the molecule, which are described in JP-B No. 48-41708.

$$CH_2\!=\!C(R^{51})COOCH_2CH(R^{52})OH \qquad (E)$$

wherein $R^{51}$ and $R^{52}$ each represent H or $CH_3$.

Further, urethane acrylates as described in JP-A No. 51-37193 and JP-B Nos. 2-32293 and 2-16765 and urethane compounds having an ethylene oxide skeleton as described in JP-B Nos. 58-49860, 56-17654, 62-39417 and 62-39418 are also suitably used, furthermore, when an addition-polymerizable compound having an amino structure or a sulfide structure in the molecule like those described in JP-A Nos. 63-277653, 63-260909 and 1-105238 is used, a curable composition that is considerably excellent in photosensitizing speed can be obtained.

As other examples, polyfunctional acrylates and methacrylates such as polyester acrylates and epoxy acrylates obtained by reacting epoxy resin with (meth)acrylic acid, as described in JP-A No. 48-64183, JP-B No. 49-43191 and JP-B 52-30490, can be mentioned. Specific unsaturated compounds described in JP-B No. 46-43946, JP-B No. 1-40337 and JP-B No. 1-40336 and vinyl phosphonic acid compounds described in JP-A No. 2-25493 can also be mentioned. In some cases, a structure containing a perfluoroalkyl group described in JP-A No. 61-22048 is preferably used. Photocurable monomers and oligomers described in the Journal of Japanese Adhesive Society, vol. 20, No. 7, pages 300-308 (1984) can also be used.

From the viewpoints of curing sensitivity, the polymerizable compound in the invention preferably contains two or more ethylenically unsaturated bonds, and more preferably three or more ethylenically unsaturated bonds. Particularly, the polymerizable compound preferably has two or more, more preferably three or more and most preferably four or more (meth)acrylate structures. From the viewpoints of curing sensitivity and developability in an unexposed portion, the polymerizable compound preferably contains an EO-modified body. From the viewpoints of curing sensitivity and strength of an exposed portion, the polymerizable compound preferably contains a urethane bond.

From these viewpoints, preferable examples of the polymerizable compounds include bisphenol A diacrylate, bisphenol A diacrylate modified with EO, trimethylolpropane triacrylate, trimethylolpropane tri(acryloyloxypropyl)ether, trimethylolethane triacrylate, tetraethylene glycol diacrylate, pentaerythritol diacrylate, pentaerythritol triacrylate, pentaerythritol tetraacrylate, dipentaerythritol tetraacrylate, dipentaerythritol pentaacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, pentaerythritol tetraacrylate modified with EO, and dipentaerythritol hexaacrylate modified with EO. Preferable commercially available products of the copolymerizable compounds include Urethane Oligomers UAS-10 and UAB-140 (all manufactured by Sanyo Kokusaku Pulp Co., Ltd.), DPHA-40H (manufactured by Nippon Kayaku Co., Ltd.), UA-306H, UA-306T, UA-3061, AH-600, T-600 and AI-600 (all manufactured by Kyoeisha Chemical Co., Ltd.).

More preferable among those mentioned above are bisphenol A diacrylate modified with EO, pentaerythritol triacrylate, pentaerythritol tetraacrylate, dipentaerythritol pentaacrylate, dipentaerythritol hexaacrylate, tri(acryloyloxyethyl)isocyanurate, pentaerythritol tetraacrylate modified with EO, and dipentaerythritol hexaacrylate modified with EO, and commercially available products such as DPHA-40H (manufactured by Nippon Kayaku Co., Ltd.), UA-306H, UA-306T, UA-3061, AH-600, T-600 and AI-600 (all manufactured by Kyoeisha Chemical Co., Ltd.).

Acid group-containing ethylenically unsaturated compounds are also preferable and include commercially available products such as TO-756 that is a carboxyl group-containing trifunctional acrylate and TO-1382 that is a carboxy group-containing pentafunctional acrylate, both of which are manufactured by Toagosei Co., Ltd.

(C) the polymerizable compounds may be used singly or in a combination of two or more of them.

The content (solid content) of (C) the polymerizable compound in the colored curable composition of the invention is preferably in a range of 4% by weight to 80% by weight, and more preferably in a range of 7% by weight to 50% by weight with respect to the total solid component of the colored curable composition.

Particularly, when a cured film of 0.8 µm or less in thickness is to be formed, the content of (C) the copolymerizable compound is preferably from 7% by weight to 40% by weight and particularly effective in a range of from 6% by weight to 25% by weight with respect to the total solid component of the colored curable composition.

Depending on the purpose, various additives may be used in addition to the components (A) to (C) in the colored curable composition of the invention unless the effect of the invention is impaired.

Hereinafter, optional components that may be contained in the colored curable composition of the invention are described.

<(D) Binder Polymer>

For the purpose of improving film coating property, regulating developability and the like, a binder polymer may further be used if necessary in the curable composition of the invention.

As the binder, a linear organic polymer is preferably used. The "linear organic polymer" used may be any known linear organic polymer. Preferably, a linear organic polymer soluble or swollen in water or weakly alkaline water enabling development in water or development in weakly alkaline water is selected. The linear organic polymer is selected not only as a coating film-forming agent but also depending on use as water, weakly alkaline water, or an organic solvent developing agent. For example, water development is feasible when a water-soluble organic polymer is used. Examples of such linear organic polymers include radical polymers having a carboxylic acid group in the side chain, such as those described in, for example, JP-A No. 59-44615, JP-B No. 54-34327, JP-B No. 58-12577, JP-B No. 54-25957, JP-A No. 54-92723, JP-A No. 59-53836, and JP-A No. 59-71048, that is, a resin obtained by homopolymerization or copolymerization of a monomer having a carboxy group, a resin obtained by homopolymerization or copolymerization a monomer having an acid anhydride and then hydrolyzing, half-esterifying or half-amidating the acid anhydride unit, and epoxy acrylate obtained by modifying epoxy resin with unsaturated monocarboxylic acid and acid anhydride. Examples of the monomer having a carboxy group include acrylic acid, methacrylic acid, itaconic acid, crotonic acid, maleic acid, fumaric acid, 4-carboxystyrene, and examples of the monomer having an acid anhydride include maleic anhydride etc.

Further, there are acidic cellulose derivatives having a carboxylic acid group in the side chain. Besides, the one obtained by adding a cyclic acid anhydride to polymer having a hydroxy group is useful.

In the case where a copolymer of an alkali soluble resin is used, the compound to be copolymerized with the resin may be a monomer other than the above-described monomers. Examples of the other monomers include the following compounds listed in (1) to (13)

(1) acrylic esters and methacrylic acid esters having an aliphatic hydroxy group such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate;

(2) alkyl acrylates such as methyl acrylate, ethyl acrylate, propyl acrylate, butyl acrylate, isobutyl acrylate, amyl acrylate, hexyl acrylate, 2-ethylhexyl acrylate, octyl acrylate, benzyl acrylate, 2-chloroethyl acrylate, glycidyl acrylate, 3,4-epoxycyclohexylmethyl acrylate, vinyl acrylate, 2-phenylvinyl acrylate, 1-propenyl acrylate, allyl acrylate, 2-allyloxyethyl acrylate, and propargyl acrylate;

(3) alkyl methacrylates such as methyl methacrylate, ethyl methacrylate, propyl methacrylate, butyl methacrylate, isobutyl methacrylate, amyl methacrylate, hexyl methacrylate, 2-ethylhexyl methacrylate, cyclohexyl methacrylate, benzyl methacrylate, 2-chloroethyl methacrylate, glycidyl methacrylate, 3,4-epoxycyclohexylmethyl methacrylate, vinyl methacrylate, 2-phenylvinyl methacrylate, 1-propenyl methacrylate, allyl methacrylate, 2-allyloxyethyl methacrylate, and propargyl methacrylate;

(4) acrylamides and methacrylamides such as acrylamide, methacrylamide, N-methylolacrylamide, N-ethylacrylamide, N-hexylmethacrylamide, N-cyclohexylacrylamide, N-hydroxyethylacrylamide, N-phenylacrylamide, N-nitrophenylacrylamide, N-ethyl-N-phenylacrylamide, vinylacrylamide, vinylmethacrylamide, N,N-diallylacrylamide, N,N-diallylmethacrylamide, allylacrylamide, and allylmethacrylamide;

(5) vinyl ethers such as ethyl vinyl ether, 2-chloroethyl vinyl ether, hydroxyethyl vinyl ether, propyl vinyl ether, butyl vinyl ether, octyl vinyl ether, and phenyl vinyl ether;

(6) vinyl esters such as vinyl acetate, vinyl chloroacetate, vinyl butylate, and vinyl benzoate;

(7) styrenes such as styrene, α-methylstyrene, methylstyrene, chloromethylstyrene, and p-acetoxystyrene;

(8) vinyl ketones such as methyl vinyl ketone, ethyl vinyl ketone, propyl vinyl ketone, and phenyl vinyl ketone;

(9) olefins such as ethylene, propylene, isobutylene, butadiene, and isoprene;

(10) N-vinylpyrrolidone, acrylonitrile, methacrylonitrile, and the like;

(11) unsaturated imides such as maleimide, N-acryloylacrylamide, N-acetylmethacrylamide, N-propionylmethacrylamide, and N-(p-chlorobenzoyl)methacrylamide; and

(12) methacrylate monomers having a heteroatom in the α position, examples thereof include compounds described in Japanese Patent Application No. 2001-115595 and Japanese Patent Application No. 2001-115598.

Among them, preferable are (meth)acrylic resins having in the side chain thereof an allyl group or a vinyl ester group and a carboxy group, alkali soluble resins having in the side chain thereof a double bond described in JP-A No. 2000-187322 and JP-A No. 2002-62698, and alkali soluble resins having in the side chain thereof an amido group described in JP-A No. 2001-242612, from the viewpoints of excellent balance between the film strength, sensitivity, and developability.

Urethane based binder polymers containing an acid group as described in JP-B No. 7-12004, JP-B No. 7-120041, JP-B No. 7-120042, JP-B No. 8-12424, JP-A No. 63-287944, JP-A No. 63-287947, JP-A No. 1-271741 and Japanese Patent Application No. 10-116232 and urethane based binder polymers containing an acid group and a double bond in the side chain as described in JP-A No. 2002-107918 are very excellent in strength and thus advantageous in respect of printing durability and low-exposure suitability.

Acetal-modified polyvinyl alcohol based binder polymers having an acid group as described in European Patent (EP) No. 993966, EP No. 1204000, and JP-A No. 2001-318463 are preferable because they are excellent in the balance between film strength and developability.

As other water-soluble linear organic compounds, polyvinyl pyrrolidone and polyethylene oxide are useful. To increase the strength of the cured film, alcohol-soluble nylon, polyethers of 2,2-bis-(4-hydroxyphenyl)-propane and epichlorohydrin, etc. are also useful.

The weight-average molecular weight of the binder polymer used in the invention is preferably 3000 or more, and more preferably in a range of from 5,000 to 300,000; and the number-average molecular weight thereof is preferably 1,000 or more, and more preferably in a range of from 2,000 to 250,000. Polydispersity (weight-average molecular weight/number-average molecular weight) is preferably 1 or more, and more preferably in a range of from 1.1 to 10.

The binder polymer may be a random polymer, a block polymer or a graft polymer.

The binder polymer used in the invention can be synthesized in a method known in the art. Examples of the solvent used in synthesis include tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethylene glycol dimethyl ether, 1-methoxy-2-propanol, 1-methoxy-2-propyl acetate, N,N-dimethylformamide, N,N-dimethylacetamide, toluene, ethyl acetate, methyl lactate, ethyl lactate, dimethyl sulfoxide, and water. Only one solvent may be used, or a mixture of two or more solvents may be used.

Examples of a radical polymerization initiator used in the synthesis of the binder polymer used in the invention include known compounds such as azo initiator and peroxide initiator.

The binder polymer may be added when the pigment is dispersed, or a dispersion of the binder polymer may be added when the curable composition is prepared. The amount of the binder polymer added is preferably from 0% by weight to 50% by weight, and more preferably from 2% by weight to 30% by weight, with respect to the total solid component of the curable composition.

When the colored curable composition of the invention is used to form an image by alkali development using a color filter for a liquid crystal display or a solid image pickup element, a binder polymer having an acid group and/or a hydrophilic group is preferably used, and preferable examples of the acid group possessed by the binder polymer used in this purpose include a carboxy group, a sulfonamido group, a sulfonic acid group, a phosphonic acid group, and a phenol group. From the viewpoints of developability and sensitivity, the acid value is preferably from 0.1 mmol/g to 10 mmol/g, more preferably from 0.2 mmol/g to 5 mmol/g, and most preferably from 0.3 mmol/g to 3 mmol/g.

<Other Photopolymerization Initiator>

The colored curable composition of the invention may, if necessary, contain (B-2) other photopolymerization initiator other than (B) the oxime-based initiator described above.

(B-2) the other photopolymerization initiator in the invention is a compound that is degraded by light to initiate and promote the polymerization of (C) the polymerizable compound described above, and preferably has absorption in a wavelength region of from 300 nm to 500 nm. The photopolymerization initiators may be used singly or in a combination of two or more of them.

As the photopolymerization initiator, for example, an organic halide compound, an oxydiazol compound, a carbonyl compound, a ketal compound, a benzoin compound, an acridine compound, an organic peroxide compound, an azo compound, a coumarin compound, an azide compound, a metallocene compound, a hexaaryl biimidazol compound, an organic boric acid compound, disulfonic acid compound, an onium salt compound, and an acyl phosphine (oxide) compound are presented.

As the organic halide compound, specifically, compounds disclosed in "Bull Chem. Soc Japan" 42, 2924 (1969) by Wakabayashi et al., the specification of U.S. Pat. No. 3,905,815, JP-B No. 46-4605, JP-A Nos. 48-36281, 55-32070, 60-239736, 61-169835, 61-169837, 62-58241, 62-212401, 63-70243, 63-298339, "Journal of Heterocyclic Chemistry" 1 (No 3), (1970)" by M. P. Hutt, and the like are presented. In particular, an oxazol compound with a trihalomethyl group substituent and s-triazine compound are presented.

As the s-triazine compound, more preferably, an s-triazine derivative with at least one mono-, di- or trihalogen substituted methyl group bonded with an s-triazine ring, more specifically, for example, 2,4,6-tris(monochloromethyl)-s-triazine, 2,4,6-tris(dichloromethyl)-s-triazine, 2,4,6-tris (trichloromethyl)-s-triazine, 2-methyl-4,6-bis(trichloro methyl)-s-triazine, 2-n-propyl-4,6-bis(trichloromethyl)-s-triazine, 2-(α,α,β-trichloro ethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s-triazine, 2-(3,4-epoxy phenyl)-4,6-bis(trichloro methyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(p-i-propyloxystyryl)-4,6-bis(trichloromethyl)-s-triazine, 2-(p-tolyl)-4,6-bis(trichloromethyl)-s-triazine, 2-(4-nathoxynaphtyl)-4,6-bis(trichloromethyl)-s-triazine, 2-phenylthio-4,6-bis(trichloromethyl)-s-triazine, 2-benzyl thio-4,6-bis(trichloromethyl)-s-triazine, 2,4,6-tris(dibromo methyl)-s-triazine, 2,4,6-tris(tribromo methyl)-s-triazine, 2-methyl-4,6-bis(tribromomethyl)-s-triazine, 2-methoxy-4,6-bis(tribromomethyl)-s-triazie, or the like is presented.

As the oxydiazol compound, 2-trichloromethyl-5-styryl-1,3,4-oxodiazol, 2-trichloromethyl-5-cyanostyryl-1,3,4-oxodiazol, 2-trichloromethyl-5-(naphto-1-yl)-1,3,4-oxodiazol, 2-trichloromethyl-5-(4-styryl)styryl-1,3,4-oxodiazol, or the like is presented.

As the carbonyl compound, benzophenone derivatives such as benzophenone, Michler's ketone, 2-methylbenzophenone, 3-methylbenzophenone, 4-methylbenzophenone, 2-chlorobenzophenone, 4-bromobenzophenone and 2-carboxy benzophenone, acetophenone derivatives such as 2,2-dimethoxy-2-phenylacetophenone, 2,2-diethoxyacetophenone, 1-hydroxycyclohexyl phenyl ketone, α-hydroxy-2-methylphenyl propanone, 1-hydroxy-1-methyl ethyl-(p-isopropylphenyl)ketone, 1-hydroxy-1-(p-dodecyl phenyl)ketone, 2-methyl-(4'-(methyl thio)phenyl)-2-morpholino-1-propanone, 1,1,1-trichyloromethyl-(p-butylphenyl)ketone and 2-benzyl-2-dimethylamino-4-morpholino butylophenone, thioxantone derivatives such as thioxanthone, 2-ethylthioxantone, 2-isopropylthioxantone, 2-chlorothioxantone, 2,4-dimethyl thioxantone, 2,4-diethylthioxantone and 2,4-diisopropylthioxantone, benzoate derivatives such as p-dimethylaminoethyl benzoate and p-diethylaminoethyl benzoate, and the like are presented.

As the ketal compound, benzyl methyl ketal, benzyl-p-methoxyethyl ethyl acetal, or the like is presented.

As the benzoin compound, m-benzoin isopropyl ether, benzoin isobutyl ether, benzoin methyl ether, methyl o-benzoylbenzoate, or the like is presented.

As the acridine compound, 9-phenylacridine, 1,7-bis(9-acridinyl)heptane, or the like is presented.

As the organic peroxide compound, for example, trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butyl hydroperoxide, cumene hydroperoxide, diisopropylbenzene hydroperoxide, 2,5-dimethyl hexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)hexane, 2,5-oxanoyl peroxide, succinic peroxide, benzoyl peroxide, 2,4-dichlorobenzoyl peroxide, diisopropyl peroxy dicarbonate, di-2-ethylhexyl peroxy dicarbonate, di-2-ethoxyethyl peroxy dicarbonate, dimethoxy isopropyl peroxy carbonate, di(3-methyl-3-methoxy butyl)peroxy dicarbonate, tert-butyl peroxyacetate, tert-butyl peroxypivalate, tert-butyl peroxyneodecanoate, tert-butyl peroxyoctanoate, tert-butyl peroxylaurate, tercyl carbonate, 3,3',4,4'-tetra-(t-butyl peroxy carbonyl)benzophenone, 3,3',4,4'-tetra-(t-hexyl peroxy carbonyl)benzophenone, 3,3',4,4'-tetra-(p-isopropylcumyl peroxy carbonyl)benzophenone, carbonyl di(t-butyl peroxy diphthalate dihydrogen), carbonyl di(t-hexyl peroxy diphthalate dihydrogen), or the like is presented.

As the azo compound, for example, the azo compounds described in JP-A No. 8-108621, or the like are presented.

As the coumarin compound, for example, 3-methyl-5-amino-((s-triazine-2-yl)amino)-3-phenylcoumarin, 3-chloro-5-diethylamino-((s-triazine-2-yl)amino)-3-phenyl coumarin, 3-butyl-5-dimethylamino-((s-triazine-2-yl) amino)-3-phenylcoumarin, or the like is presented.

As the azide compound, the organic azide compounds described in U.S. Pat. Nos. 2,848,328, 2,852,379 and 2,940,853, 2,6-bis(4-azidobenzylidene)-4-ethylcyclohexanone (BAC-E), and the like are presented.

As the metallocene compound, various titanocene compounds described in JP-A Nos. 59-152396, 61-151197, 63-41484, 2-249, 2-4705 and 5-83588, such as di-cyclopentadienyl-Ti-bis-phenyl, di-cyclopentadienyl-Ti-bis-2,6-difluorophenyl-1-yl, di-cyclopentadienyl-Ti-bis-2,4-difluorophen-1-yl, di-cyclopentadienyl-Ti-bis-2,4,6-trifluorophen-1-yl, di-cyclopentadienyl-Ti-bis-2,3,5,6-tetrafluorophen-1-yl, di-cyclopentadienyl-Ti-bis-2,3,4,5,6-pentafluorophen-1-yl, di-methylcyclopentadienyl-Ti-bis-2,6-difluorophen-1-yl, di-methylcyclopentadienyl-Ti-bis-2,4,6-trifluorophen-1-yl, di-methylcyclopentadienyl-Ti-bis-2,3,5,6-tetrafluorophen-1-yl, di-methylcyclopentadienyl-Ti-bis-2,3,4,5,6-pentafluorophen-1-yl, iron-arene complexes described in JP-A Nos. 1-304453 and 1-152109, and the like are presented.

As the hexaaryl biimidazol compound, for example, various compounds described in JP-B No. 6-29285, U.S. Pat. Nos. 3,479,185, 4,311,783, 4,622,286, and the like, specifically, 2,2'-bis(o-chlorophenyl)-4,4',5,5'-tetraphenyl biimidazol, 2,2'-bis(o-bromophenyl)-4,4',5,5'-tetraphenyl biimidazol, 2,2'-bis(o,p-dichlorophenyl)-4,4',5,5'-tetraphenyl biimidazol, 2,2'-bis(o-chlorophenyl)-4,4',5,5'-tetra(m-methoxy phenyl)biimidazol, 2,2'-bis(o,o'-dichlorophenyl)-4,4',5,5'-tetraphenyl biimidazol, 2,2'-bis(o-nitrophenyl)-4,4',5,5'-tetraphenyl biimidazol, 2,2'-bis(o-methylphenyl)-4,4'-5,5'-tetraphenyl biimidazol, 2,2'-bis(o-trifluorophenyl)-4,4',5,5'-tetraphenyl biimidazol, and the like are presented.

As the organic boric compound, for example, the organic borates described in Japanese Patent Application (JP-A) Nos. 62-143044, 62-150242, 9-188685, 9-188686, 9-188710, 2000-131837 and 2002-107916, JP-A No. 2,764,769, Japanese Patent Application No. 2002-116539, and the like, and "Rad Tech '98. Proceeding Apr. 19-22, 1998, Chicago" by Kunz, Martin, and the like, the organic sulfonium boron complexes or the organic oxosulfonium boron complexes described in JP-A Nos. 6-157623, 6-175564 and 6-175561, the organic iodonium boron complexes disclosed in JP-A Nos. 6-175554 and 6-175553, the organic phosphonium borate complexes disclosed in JP-A No. 9-188710, the organic boron transition metal coordinate complexes of JP-A Nos. 6-348011, 7-128785, 7-140589, 7-306527 and 7-292014, and the like are presented as the specific examples.

As the disulfonic acid compound, the compounds described in JP-A No. 61-166544, the specification of JP-A No. 2002-328465, or the like may be presented.

As the onium salt compound, for example, the diazonium salts described in S. I. Schlesinger, Photogr. Sci. Eng., 18, 387 (1974), and T. S. Bal et al, Polymer, 21, 423 (1980), the ammonium salts described in the specification of U.S. Pat. No. 4,069,055 and JP-A No. 4-365049, the phosphonium salts disclosed in U.S. Pat. Nos. 4,069,055 and 4,069,056, the iodonium salts described in European Patent No. 104,143, U.S. Pat. Nos. 339,049 and 410,201, and JP-A Nos. 2-150848 and 2-296514, and the like are presented.

The iodonium salt that can be used preferably in the invention is a diaryl iodonium salt which is preferably substituted by two or more electron-donating groups such as an alkyl group, an alkoxy group and an aryloxy group, from the viewpoint of stability.

As the sulfonium salt to be used preferably in the invention, the sulfonium salts described in European Patent Nos. 370, 693, 390,214, 233,567, 297,443 and 297,442, U.S. Pat. Nos. 4,933,377, 161,811, 410,201, 339,049, 4,760,013, 4,734,444 and 2,833,827, and the German Patent Nos. 2,904,626, 3,604, 580 and 3,604,581 are presented. From the viewpoint of the stability, it is preferably substituted by an electron attracting group. It is preferable that the electron attracting group has a Hammett value of more than 0. As the preferable electron attracting group, a halogen atom, a carboxylic acid, or the like is presented.

Moreover, as another preferable sulfonium salts, a sulfonium salt having absorption at 300 nm or more, with one of the substituents of the triaryl sulfonium salt having a coumarin, or anthraquinone structure may be presented. As another preferable sulfonium salt, a sulfonium salt having absorption at 300 nm or more, with the triaryl sulfonium salt having an allyloxy group, or an arylthio group as a substituent is presented.

Moreover, as the onium salt compound, the onium salts such as the selenonium salts described in J. V. Crivello et al, Macromolecules, 10 (6), 1307 (1977, J. V. Crivello et al, J. Polymer Sci., Polymer Chem. Ed., 17, 1047 (1979), and the arsonium salts described in C. S. Wen et al, Tech, Proc. Conf. Rad. Curing ASIA, page 478 Tokyo, October (1988), and the like are presented.

As the acyl phosphine (oxide) compound, IRUGACURE 819, DAROCURE 4265, DAROCURE TPO manufactured by Chiba Specialty Chemicals Corp., and the like are presented.

As (B-2) the other photopolymerizable initiator used in the invention, it is enough that one or two or more suitable photopolymerizable initiators are selected in relationship to the intended object of the colored curable composition of the invention and in relationship to (a-1) the pigment and (C) the polymerizable compound that are simultaneously used. Preferable from the viewpoint of exposure sensitivity is a compound selected from the group consisting of a trihalomethyl triazine compound, a benzyl dimethyl ketal compound, an α-hydroxyketone compound, an α-aminoketone compound, an acyl phosphine compound, a phosphine oxide compound, a metallocene compound, a triallyl imidazole dimer, an onium compound, a benzothiazole compound, a benzophenone compound, an acetophenone compound and derivatives thereof, a cyclopentadiene-benzene-iron complex and salts thereof, a halomethyl oxadiazole compound, and a 3-aryl-substituent coumarin compound.

The content of (B-2) the other photopolymerizable initiator that may be contained in the colored curable composition of the invention is preferably from 0% by weight to 20% by weight, more preferably from 0% by weight to 15% by weight, and even more preferably 0% by weight to 10% by weight, with respect to the total solid component of the curable composition.

<Compound Having an Adhesive Group>

For the purpose of improving the adhesiveness between a cured coating film and a support or a substrate, a compound having an adhesive group may be used in the colored curable composition of the invention. This compound is preferably used particularly from the viewpoint of improving the adhesiveness between a colored region of a color filter and a substrate.

The adhesive group possessed by the compound may be any substituent having adhesiveness to a substrate used in a color filter, and the compound is particularly preferably a compound having adhesiveness to a glass substrate or a silicon substrate.

The adhesive group is preferably a group selected from acid groups such as a sulfonic acid group, a phosphonic acid group or a carboxy group; ester groups of these acids; metal salts of these acids, onium salts of these metals; onium groups such as an ammonium group and a pyridinium group; substituents that form a silanol group by hydrolysis, such as an alkoxysilyl group; amphoteric ionic groups such as a phenolic hydroxy group or an N-oxide group; and chelating groups such as iminodiacetic acid.

From the viewpoint of adhesiveness, the adhesive group is preferably an alkoxysilyl group and/or its hydrolyzed group.

The compound having an adhesive group that can be used in the invention may be a compound further having, in the molecule, a group for improving developability or a group for improving sensitivity, such as a group having a carbon-carbon double bond or a cyclic alkoxy group.

The group for improving developability is preferably a functional group having a heteroatom and examples thereof include an alkoxy group, an alkoxycarbonyl group, a carboxy group, a hydroxy group, an amino group, a urethane group, an amido group, a thiol group, a sulfo group and an urea group, and the compounds further having such functional group are preferably simultaneously used.

Preferable examples of the group for improving sensitivity include a methacryl group, an acryl group, a styryl group, a vinyl ether group, an allyl group, a cyclic alkenyl group, a furyl group, an oxetane group, an epoxy group and a tetrahydrofuran group. From the viewpoint of sensitivity, the compounds further having a methacryl group, an acryl group and a styryl group are preferably simultaneously used.

<Sensitizing Agent>

The curable composition of the invention may contain a sensitizing agent for the purpose of improvement in radical generating efficiency of the radical initiator and achievement of a long wavelength of the sensitizing wavelength. As the sensitizing agent to be used in the invention, those capable of sensitizing the above-mentioned photopolymerization initiators by the electron transfer mechanism or the energy transfer mechanism are preferable.

As the sensitizing agent to be used in the invention, those belonging to the compounds listed below, and having the absorption wavelength in the wavelength region of from 300 nm to 450 nm are presented.

As the preferable sensitizing agent, those belonging to the following compound group, and having the absorption wavelength in the wavelength region of from 330 nm to 450 nm are presented.

For example, polynucleic aromatic groups (such as phenanthrene, anthracene, pyrene, perylene, triphenylene, and 9,10-dialkoxyanthracene), xantenes (such as fluorescein, eosin, erythrosine, rhodamine B, and rose bengal), thioxantones (isopropylthioxantone, diethylthioxanthone, chlorothioxantone), cyanines (such as thiacarbocyanine and oxacarbocyanine), merocyanines (such as merocyanine and carbomerocyanine), phthalocyanines, thiazines (such as thionine, methylene blue, and toluidine blue), acrydines (such as acrydine orange, chloroflavin, and acryflavin), anthraquinones (such as anthraquinone), squariums (such as squarium), acrydine orange, coumarines (such as 7-diethylamino-4-methylcoumarin), ketocoumarin, phenothiadines, phenadines, styrylbenzenes, azo compounds, diphenyl methane, triphenylmethane, distyrylbenzenes, carbazols, porphilin, spiro compounds, quinacridones, indigo, styryl, pyrylium compounds, pyromethene compounds, pyrazolotriazol compounds, benzothiazol compounds, barbituric acid derivative, thiobarbituric acid derivative, acetophenone, benzophenone, thioxantone, aromatic ketone compounds such as Michler's ketone, heterocyclic compounds such as N-aryl oxazolidinone, and the like are presented. Furthermore, the compounds described in European Patent No. 568,993, U.S. Pat. Nos. 4,508,811 and 5,227,227, JP-A Nos. 2001-125255 and 11-271969, or the like may be presented.

As examples of more preferable sensitizing agents, the following compounds represented by the formulae (i) to (v) are presented.

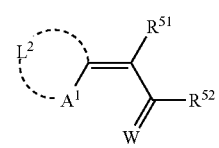

(i)

In formula (I), $A^1$ is a sulfur atom or $NR^{50}$, $R^{50}$ is an alkyl group or an aryl group, $L^2$ is a nonmetallic atomic group which forms a basic nucleus of the pigment in association with adjacent $A^1$ and an adjacent carbon atom, and $R^{51}$, $R^{52}$ are each independently a hydrogen atom or a monovalent nonmetallic group, which may bond to each other to form an acidic nucleus of the pigment. W is an oxygen atom or a sulfur atom.

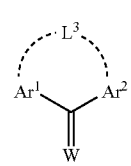

(ii)

In formula (ii), $Ar^1$ and $Ar^2$ are each independently an aryl group, which are linked via a bond by $-L^3-$. Here, $L^3$ is $-O-$ or $-S-$. W has the same meaning as in formula (1).

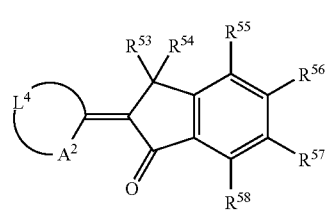

(iii)

In formula (iii), $A^2$ is a sulfur atom or $NR^{59}$, $L^4$ is a nonmetallic atomic group which forms a basic nucleus of the dye in association with adjacent $A^2$ and an adjacent carbon atom, $R^{53}$, $R^{54}$, $R^{55}$, $R^{56}$, $R^{57}$ and $R^{58}$ are each independently a monovalent nonmetallic atomic group, and $R^{59}$ is an alkyl group or an aryl group.

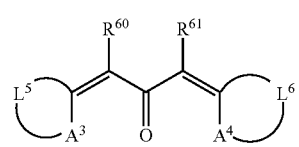

(iv)

In formula (iv), $A^3$ and $A^4$ are each independently $-S-$ or $-NR^{62}$. $R^{62}$ is a substituted or unsubstituted alkyl group, or a substituted or unsubstituted aryl group, $L^5$, and $L^6$ are each independently a nonmetallic atomic group which forms a basic nucleus of the pigment in association with adjacent $A^3$, or $A^4$ and an adjacent carbon atom, $R^{60}$ and $R^{61}$ are each independently a monovalent nonmetallic atomic group, and may bond to each other to form an aliphatic or aromatic ring.

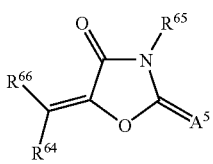

In the formula (v), $R^{66}$ represents an aromatic or heterocyclic ring which may have a substituent, $A^5$ represents an oxygen atom, a sulfur atom or —$NR^{67}$; $R^{64}$, $R^{65}$ and $R^{67}$ each independently represent a hydrogen atom or a monovalent nonmetallic atomic group, and $R^{67}$ and $R^{64}$, or $R^{65}$ and $R^{67}$, may bond to each other to form an aliphatic or aromatic ring.

Preferable examples of the compounds represented by formulae (i) to (v) are shown below:

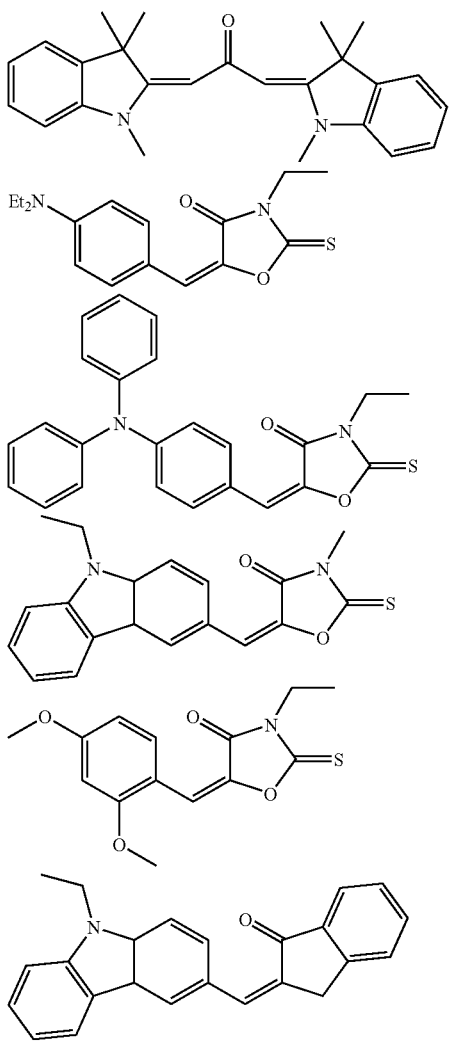

The sensitizing agent may be used singly or in a combination of two or more of them.

The content of the sensitizing agent in the curable composition of the invention with respect to the total solid component of the curable composition is preferably from 0.1% by weight to 20% by weight, and more preferably from 0.5% by weight to 15% by weight in view of the light absorption efficiency at the deeper portion and the initial decomposition efficiency.

<Cosensitizing Agent>

The curable composition of the invention preferably contains a cosensitizing agent. In the invention, the cosensitizing agent has the effects of further improving the sensitivity with respect to the actinic radiation of the sensitizing dye or the photopolymerization initiator, or restraining the polymerization inhibition of the polymerizable compound by the oxygen, or the like.

Examples of such a cosensitizing agent include the amines such as the compounds described in for example "Journal of Polymer Society" vol. 10, page 3, 173 (1972) written by M. R. Sander et al., JP-B No. 44-20189, JP-A Nos. 51-82102, 52-134692, 59-138205, 60-84305, 62-18537 and 64-33104, Research Disclosure No. 33825. Specifically, triethanolamine, p-(dimethylaminoethyl)benzoate, p-formyl dimethylaniline, p-methylthio dimethylaniline, and the like are presented.

Other examples of the cosensitizing agent include thiols and sulfides, for example, thiol compounds described in JP-A No. 53-702, JP-B No. 55-500806, and JP-A No. 5-142772, and disulfide compounds described in JP-A No. 56-75643, specifically, 2-mercaptobenzothiazole, 2-mercaptobenzoxazole, 2-mercaptobenzimidazole, 2-mercapto-4(3H)-quinazoline, and β-mercaptonaphthalene.

In addition, other examples of the cosensitizing agent include amino acid compounds (e.g. N-phenylglycine, etc.), organic metal compounds (e.g. tributyltin acetate, etc.) described in JP-B No. 48-42965, hydrogen donating compounds described in JP-B No. 55-34414, and sulfur compounds (e.g. trithiane, etc.) described in JP-A No. 6-308727.

From the viewpoint of the improvement of the curing speed according to the balance of the polymerization growth speed and the chain transfer, the content of the cosensitizing agent with respect to the weight of the total solid component of the curable composition is preferably in a range of from 0.1% by weight to 30% by weight, more preferably in a range of from 0.5% by weight to 25% by weight, and even more preferably in a range of from 1% by weight to 20% by weight.

<Polymerization Inhibitor>

In the invention, it is desirable to add a small amount of a thermal polymerization inhibitor for inhibiting the unnecessary thermal polymerization of the compound having a polymerizable ethylenically unsaturated double bond during the production or the storage of the curable composition.

As the thermal polymerization inhibitor to be used in the invention, hydroquinone, p-methoxyphenol, di-t-butyl-p-cresol, pyrogallol, t-butylcatecol, benzoquinone, 4,4'-thiobis(3-methyl-6-t-butylphenol), 2,2'-methylenebis(4-methyl-6-t-butyl phenol), N-nitrosophenylhydroxyamine cerium salt, and the like are presented.

An addition amount of the thermal polymerization inhibitor is preferably from about 0.01% by weight to about 5% by weight with respect to a weight of the total composition. If desired, in order to prevent polymerization inhibition with oxygen, a higher fatty acid derivative such as behenic acid and behenic amide may be added, to be unevenly distributed on a surface of a photosensitive layer during a drying process after coating. An addition amount of the higher fatty acid derivative is preferably about from 0.5% by weight to about 10% by weight of a total composition.

<Thermal Polymerizable Component>

It is effective to add a thermal polymerizable component in the colored curable composition of the invention. If necessary, an epoxy compound may be added to increase the strength of a coating film. The epoxy compound is a compound having two or more epoxy rings in the molecule, such as a bisphenol A epoxy compound, a cresol novolac epoxy compound, a biphenyl epoxy compound or an alicyclic epoxy compound. Examples of the bisphenol A epoxy compound include Epotohte YD-115, YD-118T, YD-127, YD-128, YD-134, YD-8125, YD-7011R, ZX-1059, YDF-8170 and YDF-170 (all manufactured by Tohto Kasei Co., Ltd.), Denacoal EX-1101, EX-1102 and EX-1103 (all manufactured by Nagase Chemicals Ltd.), Plaquecell GL-61, GL-62, G101 and G102 (all manufactured by Daicel Chemical Industries, Ltd.), as well as bisphenol F epoxy compounds and bisphenol S epoxy compounds similar thereto. Epoxy acrylates such as Ebecryl 3700, 3701 and 600 (all manufactured by Daicel UCB) may also be used. Examples of the cresol novolac epoxy compound include Epotohte YDPN-638, YDPN-701, YDPN-702, YDPN-703 and YDPN-704 (all manufactured by Tohto Kasei Co., Ltd.) and Denacoal EM-125 (manufactured by Nagase Chemicals Ltd.). Examples of the biphenyl epoxy compound include 3,5,3,5'-tetramethyl-4,4'-diglycidyl biphenyl, and examples of the aliphatic epoxy compound include Ceroxide 2021, 2081, 2083 and 2085, Epolead GT-301, GT-302, GT-401, GT-403 and EHPE-3150 (all manufactured by Daicel Chemical Industries, Ltd.), and Sun Tohto ST-3000, ST-4000, ST-5080 and ST-5100 (all manufactured by Tohto Kasei Co., Ltd.). Further, 1,1,2,2-tetrakis (p-glycidyloxyphenyl)ethane, tris(p-glycidyloxyphenyl) methane, triglycidyl tris(hydroxyethyl)isocyanurate, diglycidyl o-phthalate, diglycidyl terephthalate, and glycidyl esters modified with dimer acid in the skeletons of an amine epoxy resin such as Epotohto YH-434 or YH-434L or bisphenol A epoxy resin may also be used.

<Surfactant>

From the viewpoint of improving coating property, the colored curable composition of the invention is constituted by using various surfactants, and various surfactants such as nonionic, cationic and anionic surfactants may be used besides fluorocarbon surfactants. Among them, the fluorocarbon surfactants and nonionic surfactants are preferable.

Particularly preferable examples of the nonionic surfactants include polyoxyethylene alkyl ethers, polyoxyethylene alkylaryl ethers, polyoxyethylene alkyl esters, sorbitan alkyl esters, and monoglyceride alkyl esters. Specific examples thereof include polyoxyethylene alkyl ethers such as polyoxyethylene lauryl ether, polyoxyethylene stearyl ether or polyoxyethylene oleyl ether; polyoxyethylene aryl ethers such as polyoxyethylene octylphenyl ether, polyoxyethylene polystyrylated ether, polyoxyethylene tribenzylphenyl ether, polyoxyethylene-propylene polystyryl ether or polyoxyethylene nonylphenyl ether; polyoxyethylene dialkyl esters such as polyoxyethylene dilaurate or polyoxyethylene distearate; sorbitan fatty acid esters, polyoxyethylene sorbitan fatty acid esters, and ethylene diamine polyoxyethylene-polyoxypropylene condensates. These nonionic surfactants may be those suitably selected from products commercially available from Kao Corporation, NOF Corporation, Takemoto Oil & Fat Co., Ltd., ADEKA Corporation, and Sanyo Chemical Industries, Ltd. Besides those mentioned above, the dispersant described above may also be used.

<Other Additives>

Besides those described above, various additives may be added to the colored curable composition. Specific examples of the additives include UV absorbing agents such as 2-(3-t-butyl-5-methyl-2-hydroxyphenyl)-5-chlorobenzotriazole or alkoxybenzophenone, aggregation inhibitors such as sodium polyacrylate, fillers such as glass or alumina; alkali-soluble resins such as an itaconic acid copolymer, a crotonic acid copolymer, a maleic acid copolymer, a partially esterified maleic acid copolymer, an acidic cellulose derivative, a hydroxy group-containing polymer having an acid anhydride added thereto, alcohol-soluble nylon, and a phenoxy resin formed from phenol A and epichlorohydrin.

For the purpose of further improving the developability of the colored curable composition by promoting alkali solubility in an uncured portion, an organic carboxylic acid, preferably a low molecular weight organic carboxylic acid having a molecular weight of 1,000 or less, may be added in preparing the pigment dispersion (A). Specific examples thereof include an aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxylic acids such as benzoic acid, toluic acid, cuminic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid and umbellic acid.

Known additives such as inorganic fillers for improving the physical properties of a cured film, plasticizers, and fat-sensitizing agent capable of improving the inking property of the surface of the photosensitive layer may be added.

Examples of the plasticizers include dioctyl phthalate, didodecyl phthalate, triethylene glycol dicaprylate, dimethyl glycol phthalate, tricresyl phosphate, dioctyl adipate, dibutyl sebacate, triacetyl glycerin. In the case where a binder is used, the plasticizer can be added in an amount of 10 by weight or less with respect to the total weight of the binder and the compound having an ethylenically unsaturated double bond.

The colored curable composition of the invention is cured with high sensitivity and is excellent in storage stability. The curable composition shows high adhesiveness to the surface of a rigid material such as a substrate to which it is applied. Accordingly, the curable composition of the invention can be used preferably in image-forming materials for a 3-dimensional optical shaping, holography and color filter and in fields such as ink, paint, adhesive and coating agent.

<Method for Manufacturing Color Filter Using Colored Curable Composition>

The colored curable composition of the invention can be prepared through a mixing and dispersing step in which the previously described (A) pigment dispersion is allowed to contain (B) the oxime-based initiator, (C) the polymerizable compound, and an alkali-soluble resin used if necessary (preferably together with a solvent) and mixed if necessary with additives such as a surfactant, and mixed and dispersed by using various mixers or dispersing machines.

The mixing and dispersing step preferably includes kneading dispersion and subsequent finely dispersing treatment, wherein kneading dispersion may be omitted.

One example of the method for manufacturing the colored curable composition of the invention is described below.

(1. Preparation of a Finely Pulverized Pigment)

A kneader such as a twin roll, a triple roll, a ball mill, a trommel, a disper mill, a kneader, a co-kneader, a homogenizer, a blender or a single- or twin-screw extruder is used to apply strong shear force to a mixture of a pigment, a water-soluble organic solvent and a water-soluble inorganic salt, thereby pulverizing the pigment, and then the mixture is introduced into water and formed into slurry by a stirrer or the like. Then, this slurry is filtered and washed with water, and the water-soluble organic solvent and the water-soluble inorganic salt are removed followed by drying, whereby a finely pulverized pigment is obtained.

(2. Preparation of (A) the Pigment Dispersion)

(a-1) the pigment, (a-3) the dispersant, (a-2) the specific pigment derivative and a solvent are mixed and dispersed by means of beads. By using mainly a vertical or horizontal sand grinder, a pin mill, a slit mill, an ultrasonic dispersing machine or the like, the mixture is finely dispersed by beads made of glass or zirconia having a particle size of from 0.01 mm to 1 mm, to obtain (A) a pigment dispersion. The treatment of finely pulverizing the pigment may be omitted.

Details of kneading dispersion are described in T. C. Patton, "Paint Flow and Pigment Dispersion", 1964, John Wiley and Sons.

To (A) the pigment dispersion obtained in the manner described above are added (C) the polymerizable compound, (B) the oxime-based initiator, and the optional (B-2) other polymerization initiator, alkali-soluble resin or the like used if necessary, whereby the colored curable composition of the invention is obtained.

Hereinafter, the color filter of the invention is described in detail by reference to its manufacturing method (that is, the method for manufacturing color filter of the invention).

The method for manufacturing the color filter of the invention comprises a step of applying, on a support, the thus obtained colored curable composition of the invention to form a curable composition layer (hereinafter referred to sometimes as "the curable composition layer-forming step"), a step of exposing the curable composition layer through a mask (hereinafter referred to sometimes as "the exposure step"), and a step of developing the curable composition layer after exposure to form colored regions (hereinafter referred to sometimes as "the development step").

Hereinafter, the respective steps in the manufacturing method of the invention are described.

<Curable Composition Layer-Forming Step>

Using the colored curable composition of the invention, the color filter of the invention is formed on a substrate such as glass and can be preferably prepared by applying the colored curable composition of the invention directly or via another layer on a substrate by slit coating for example, to form a coating film and then drying the coating film followed by pattern exposure and subsequent developing treatment with a developing solution. A color filter used in a liquid crystal display device or in a solid image pickup element can thereby be produced inexpensively with high quality with no difficulty in the process.

The colored curable composition of the invention can be applied directly or via another layer onto a substrate by a coating method such as spin coating, slit coating, casting coating, roll coating or bar coating.

Examples of the substrate include alkali-free glass, soda glass, PYREX™ glass and quartz glass, which are used in a liquid crystal display device or the like, or those having a transparent electrically conductive film adhering thereto, and a photoelectric conversion element substrate, such as a silicon substrate, which is used in a solid image pickup element or the like, as well as plastic substrates. These substrates are usually provided thereon with a black matrix for isolating each pixel or with a transparent resin layer for promoting adhesiveness.

The plastic substrate preferably has, on the surface thereof, a gas barrier layer and/or a solvent-resistant layer. A patterned coating film comprising the colored curable composition of the invention can be formed on a driving substrate on which a thin film transistor (TFT) of a thin film transistor (TFT) color liquid crystal display device is arranged (hereinafter referred to as "TFT liquid crystal driving substrate") to form a color filter. A photomask used in this case is provided not only with a pattern for forming pixels but also with a pattern for forming a through-hole or a U-shaped hollow. The substrate in the TFT liquid crystal driving substrate includes, for example, substrates made of glass, silicone, polycarbonate, polyester, aromatic polyamide, polyamide imide, and polyimide. These substrates may be subjected if desired to suitable pretreatment such as chemical treatment with a silane coupling agent, plasma treatment, ion plating, sputtering, a gaseous phase reaction method or vacuum deposition. Examples of such substrates include TFT liquid crystal driving substrates provided on the support thereof with a passivation film such as a silicon nitrile film.

The method of applying the colored curable composition of the invention onto a substrate is not particularly limited. A method of using a slit nozzle, such as a slit-and-spin method or a spin-less coating method (hereinafter referred to as "slit nozzle coating method") is preferable. In the slit nozzle coating method, the slit-and-spin coating method and the spin-less coating method are carried out under different conditions depending on the size of a substrate onto which the composition is applied. For example, when a fifth-generation glass substrate (1100 mm×1250 mm) is coated by the spin-less coating method, the amount of the colored curable composition discharged from a slit nozzle is usually from 500 μL/sec to 2000 μL/sec, preferably from 800 μL/sec to 1500 μL/sec, and the coating speed is usually from 50 mm/sec to 300 ml/sec., preferably from 100 mm/sec to 200 mm/sec. The solid content of the colored curable composition is usually from 10% to 20%, and preferably from 13% to 18%. When a coating film of the colored curable composition of the invention is formed on a substrate, the thickness of the coating film (after pre-baking treatment) is generally from 0.3 μm to 5.0 μm, desirably from 0.5 μm to 4.0 μm, most desirably from 0.8 μm to 3.0 μm.

When the colored curable composition of the invention is used in forming a color filter for a high-resolution solid image pickup element, a film of the composition most preferably has a thickness in a range of from 0.4 μm to 2.0 μm.

The invention is particularly effective in forming a colored region having a film thickness of from 0.4 μm to 1.0 μm, especially from 0.45 μm to 0.8 μm.

Usually, the composition after application onto a substrate is subjected to pre-baking treatment. If necessary, the composition on the substrate may be subjected to vacuum treatment. Vacuum drying is conducted under conditions where the degree of vacuum is usually about from 0.1 torr to 1.0 torr, and preferably about from 0.2 torr to 0.5 torr.

Pre-baking treatment can be carried out with a hot plate or an oven at a temperature in a range of from 50° C. to 140° C., preferably from about 70° C. to about 110° C., and for a period of from 10 seconds to 300 seconds. Treatment such as high-frequency treatment may also be simultaneously conducted. Alternatively, the high-frequency treatment may be conducted alone.

<Exposure Step>

In the exposure step, the curable composition layer formed in the curable composition layer-forming step is exposed through a mask having a predetermined mask pattern.

As exposure in this step, the pattern exposure of the coating film can be carried out by exposing the coating film through a predetermined mask pattern to cure the exposed portion only and then developing it with a developing solution to form a patterned coating film consisting of pixels of the respective colors (3 or 4 colors). Radiations that may be used in exposure are preferably ultraviolet rays such as g-line or i-line. The irradiation amount is preferably 5 mJ/cm$^2$ to 1500 mJ/cm$^2$, more preferably from 10 mJ/cm$^2$ to 1000 mJ/cm$^2$, and most preferably from 10 mJ/cm$^2$ to 500 mJ/cm$^2$.

When the color filter of the invention is used in a liquid crystal display device, the irradiation amount in the above-defined range is preferably from 5 mJ/cm$^2$ to 200 mJ/cm$^2$, more preferably from 10 mJ/cm$^2$ to 150 mJ/cm$^2$, and most preferably from 10 mJ/cm$^2$ to 100 mJ/cm$^2$. When the color filter of the invention is used in a solid image pickup element, the irradiation amount in the above-defined range is preferably from 30 mJ/cm$^2$ to 1500 mJ/cm$^2$, more preferably from 50 mJ/cm$^2$ to 1000 mJ/cm$^2$, and most preferably from 80 mJ/cm$^2$ to 500 mJ/cm$^2$. When a color filter for a solid image pickup element is prepared, i-line from a stepper exposure device is preferably mainly used because formation of a highly fine pattern is required.

<Development Step>

In developing treatment, the uncured portion of the coating film after exposure is dissolved in a developing solution so that the cured portion only remains. The development temperature is usually from 20° C. to 30° C., and the development time is from 20 seconds to 90 seconds.

As the developing solution, any developing solution may be used as long as the coating film in the uncured portion of the colored curable composition is dissolved in the developing solution while the cured portion is not dissolved therein. Specifically, a combination of various organic solvents or an alkaline aqueous solution may be used.

Examples of the organic solvents include the previously described solvents usable in preparing the pigment dispersion or the colored curable composition.

Examples of the alkaline aqueous solution include alkaline aqueous solutions wherein an alkaline compound such as sodium hydroxide, potassium hydroxide, sodium carbonate, sodium hydrogencarbonate, sodium silicate, sodium metasilicate, ammonia water, ethylamine, diethylamine, dimethylethanolamine, tetramethylammonium hydroxide, tetraethylammonium hydroxide, choline, pyrrole, piperidine or 1,8-diazabicyclo-[5,4,0]-7-undecene is dissolved at a concentration of from 0.001% by weight to 10% by weight, preferably from 0.01% by weight to 1% by weight. The alkaline aqueous solution may contain a suitable amount of a water-soluble organic solvent such as methanol or ethanol, or a surfactant.

The development system may be any of a dipping system, a shower system or a spray system, which may be combined with a swing system, a spinning system, or an ultrasonic system. Before contact with the developing solution, the surface of the coating film to be developed may previously be moistened with water or the like in order to prevent uneven development. The substrate may be inclined during development.

When a color filter for a solid image pickup element is prepared, paddle development may be used.

After developing treatment, the coating film on the substrate is subjected to rinsing treatment where an excess of the developing solution is removed with washing, followed by drying and subsequent heat treatment (post-baking) to ensure complete curing.

The rinsing step is usually carried out with pure water. For saving rinsing water (pure water), pure water is used in final washing only, and when washing is initiated, used purified water may be used, or the substrate may be inclined during washing, or ultrasonic irradiation may be used during washing.

After rinsing, water is drained off, and then the coating film on the substrate is dried and then subjected to heat treatment usually at about from 200° C. to 250° C. The heat treatment (post-baking) of the coating film after development may be carried out in a continuous or batch system under the above-mentioned conditions with a heating means such as a hot plate, a convection oven (hot air-circulating dryer) or a high-frequency heater.

The operation described above are repeated for each color by a number of desired color hues to prepare a color film having a cured film of a plurality of colors formed thereon.

Application of the colored curable composition of the invention containing the pigment dispersion (A) has been described mainly by reference to application to a color filter, but the colored curable composition can also be applied to formation of a black matrix for isolating the respective colored pixels constituting a color filter.

The black matrix can be formed by exposing and developing the colored curable composition of the invention using a black pigment such as carbon black or titan black, if necessary followed by post-baking to promote the curing of the film.

The colored curable composition of the invention is excellent in pigment dispersion stability, is curable with high sensitivity and is also excellent in developability and can thus form a high-resolution colored region excellent in color property in a thin layer even if a pigment is contained at high concentration, and the colored curable composition is particularly useful in forming a colored region in a color filter, and thus has a broad range of applications.

EXAMPLES

Hereinafter, the invention is described in more detail by reference to the Examples, but the invention is not limited to the following examples and may be modified without departure from the gist of the invention.

Unless otherwise noted, "%" and "parts" refer to % by weight and parts by weight, respectively.

Synthesis Example 1

Preparation of Acrylic Resin Solution 1

A reaction container, that is, a separable 4-neck flask equipped with a thermometer, a condenser, a nitrogen gas inlet tube and a stirrer, was charged with 70.0 parts of cyclohexanone and then heated to 80° C. Then, the atmosphere in the reaction container was replaced by nitrogen, and a mixture of 13.5 parts of n-butyl methacrylate, 4.6 parts of 2-hydroxyethyl methacrylate, 4.1 parts of methacrylic acid, 7.4 parts of p-cumylphenol ethylene oxide-modified acrylate (trade name: Aronix M110, manufactured by Toagosei Co., Ltd.) and 0.5 part of 2,2'-azobisisobutyronitrile was added dropwise over 2 hours from a dripping tube.

After dropwise addition, the reaction was continued for additional 3 hours to obtain a solution of an acrylic resin having a weight-average molecular weight of 24000.

After cooling to room temperature, about 2 g of the resin solution was taken, then dried under heating at 180° C. for 20 minutes, and measured for its nonvolatile matter. The previously synthesized resin solution was mixed with cyclohexanone such that its nonvolatile matter came to be 20% by weight, to prepare an acrylic resin solution 1.

Synthesis Example 2

Preparation of Acrylic Resin Solution 2

800 parts of cyclohexanone was introduced into a reaction container and then heated to 100° C. while a nitrogen gas was injected into the container, and at the same temperature, a mixture of 60.0 parts of styrene, 60.0 parts of methacrylic acid, 68.0 parts of methyl methacrylate, 62.0 parts of butyl methacrylate and 9.0 parts of azobisisobutyronitrile was added dropwise over 1 hour and subjected to polymerization reaction. After dropwise addition, the reaction was continued at 100° C. for additional 3 hours, and a solution obtained by dissolving 2.0 parts of azobisisobutyronitrile in 50 parts of cyclohexanone was added thereto and reacted at 100° C. for additional 1 hour to obtain a solution of an acrylic resin having a weight-average molecular weight of about 32000.

After cooling to room temperature, about 2 g of the resin solution was taken, then dried under heating at 180° C. for 20 minutes, and measured for its nonvolatile matter. The previously synthesized resin solution was mixed with cyclohexanone such that its nonvolatile matter came to be 20% by weight, to prepare an acrylic resin solution 2.

Examples 1 to 5 and Comparative Examples 1 and 2

1. Preparation of Pigment Dispersion

The components in Composition (1) below were mixed and then mixed at a revolution number of 3,000 rpm for 3 hours with a homogenizer to prepare pigment-containing mixed solutions (A to E).

Composition (1)

| | |
|---|---|
| C.I. Pigment Red 254 | 80 parts |
| C.I. Pigment Yellow 139 | 20 parts |
| Acrylic Resin Solution 1 (obtained in Synthesis Example 1) | 280 parts |
| 1-Methoxy-2-propyl acetate | 630 parts |
| Specific pigment derivative or comparative compound shown in Table 1 | 5 parts |

Subsequently, each of the mixed solutions (A to E) obtained above was dispersed for 6 hours with a beads-dispersing machine Disper Mat (manufactured by GETZMANN) using 0.3 mmϕ zirconia beads and then further dispersed with a high-pressure dispersing machine NANO-3000-10 with a depressurization mechanism (manufactured by Beryu Co., Ltd.) under a pressure of 2000 kg/cm³ and at a flow rate of 500 g/min. This dispersing treatment was repeated 10 times to obtain red pigment dispersions (A to E).

Structures of (a-2) specific pigment derivatives (Y-1) to (Y-4) according to the invention

Y-1

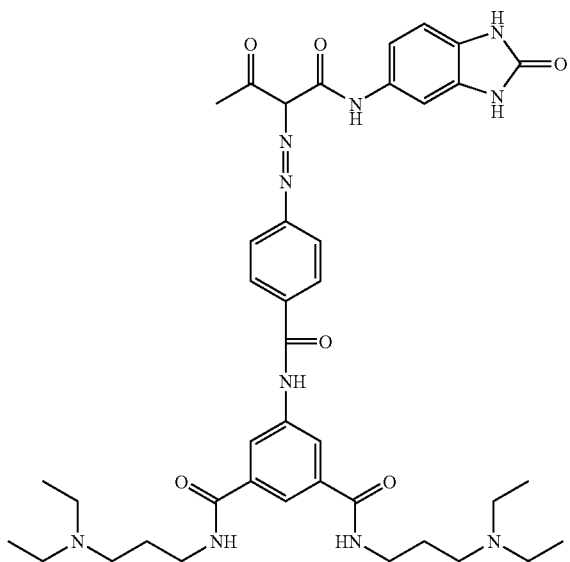

Y-2

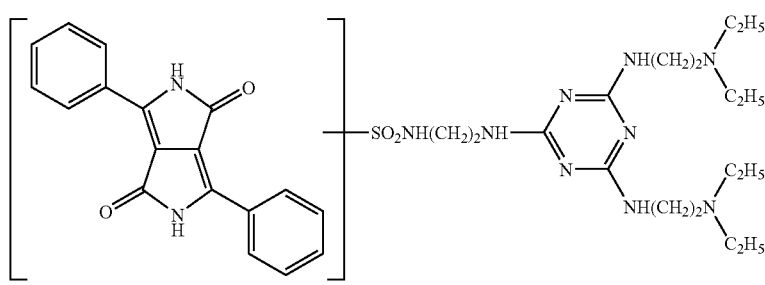

-continued

Y-3
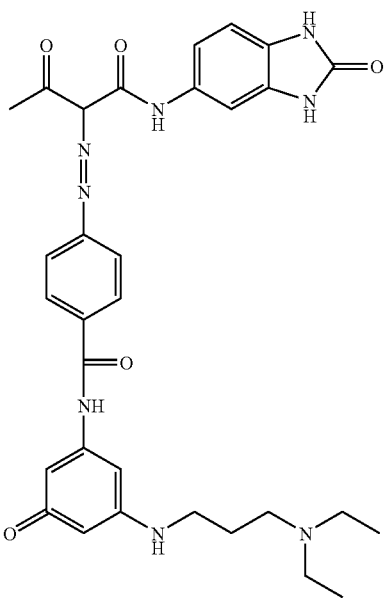

Y-4
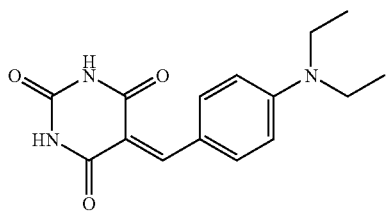

H-1
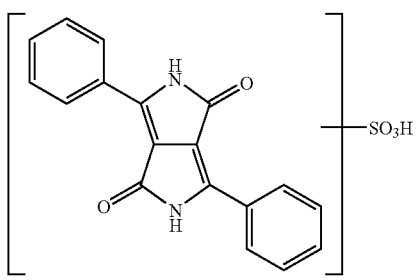

TABLE 1

| | Specific Pigment Derivative (a-2) or Comparative Compound | Viscosity Change (mPa·s) |
|---|---|---|
| Pigment Dispersion A | Y-1 | 1 |
| Pigment Dispersion B | Y-2 | 2 |
| Pigment Dispersion C | Y-3 | 4 |
| Pigment Dispersion D | Y-4 | 3 |
| Pigment Dispersion E | H-1 | 100 or more |

<Evaluation of the Pigment Dispersions>

The resulting pigment dispersions (A to D) according to the invention and the comparative pigment dispersion E were evaluated as follows.

(1) Measurement and Evaluation of Viscosity

With respect to the resulting pigment dispersion, the viscosity $\eta^1$ of the pigment dispersion just after being dispersed, and the viscosity $\eta^2$ of the pigment dispersion one week after being dispersed (at room temperature (25° C. to 28° C.)), were measured with type E viscometer, and the difference therebetween was calculated to evaluate the degree of thickening. When the difference between the viscosity $\eta^2$ of the pigment dispersion after 1 week and the viscosity $\eta^1$ of the pigment dispersion just after being dispersed is 5 (mPa·s) or less, the pigment dispersion is shown to be excellent in dispersion stability. The obtained results are also shown in Table 1 above.

As is evident from Table 1, the pigment dispersions A to D prepared by incorporating the specific pigment derivative (a-2) were excellent in dispersion stability.

Hereinafter, the invention is described by reference to preparation of a coloring-agent-containing colored curable composition for use in formation of a color filter for a solid image pickup element.

[Preparation of Silicon Substrate with Undercoat Layer]

The components in Composition (2) below were mixed and dissolved to prepare a resist liquid for an undercoat layer.

<Composition (2)>

| | |
|---|---|
| Propylene glycol monomethyl ether acetate (PGMEA: solvent) | 19.20 parts |
| Ethyl lactate | 36.67 parts |
| Binder polymer (40% PGMEA solution of a benzyl methacrylate/ methacrylic acid/2-hydroxyethyl methacrylate copolymer (molar ratio = 60/22/18)) | 30.51 parts |

-continued

| | |
|---|---|
| Dipentaerythritol hexaacrylate (photopolymerizable compound) | 12.20 parts |
| Polymerization inhibitor (p-methoxyphenol) | 0.0061 part |
| Fluorocarbon surfactant (trade name: F-475, manufactured by Dainippon Ink And Chemicals, Incorporated) | 0.83 part |
| Photopolymerization initiator | 0.586 part |

A 6-inch silicon wafer was treated by heating in an oven at 200° C. for 30 minutes. Then, the resist liquid was applied onto this silicon wafer to give a thickness of 2 μm after drying, and then dried by heating in an oven at 220° C. for 1 hour to form an undercoat layer to obtain a silicon wafer substrate with an undercoat layer.

1-1. Preparation of Colored Curable Composition (Coating Liquid)

The following components were added to the pigment dispersion obtained by dispersing treatment as described above, and then mixed under stirring to prepare a curable composition solution.

| | |
|---|---|
| Pigment Dispersion (A) (dispersion shown in Table 2) | 100 parts by weight |
| DPHA (manufactured by Nippon Kayaku Co., Ltd.) | 4.0 parts by weight |
| Polymerization Initiator (Oxime-based initiator or comparative initiator shown in Table 2) | 0.5 part by weight |

-continued

| | |
|---|---|
| Allyl methacrylate/methacrylic acid copolymer (molar ratio 75/25, weight-average molecular weight 57,000: Component (D)) | 1.0 part by weight |
| Surfactant (trade name: Tetranic 150R1, manufactured by BASF) | 0.2 part by weight |
| Solvent (PGMEA) | 100 parts by weight |

Structures of (B) oxime-based initiators (I-1) and (I-2) and the comparative polymerization initiator (IH-1) shown in Table 2 are shown below.

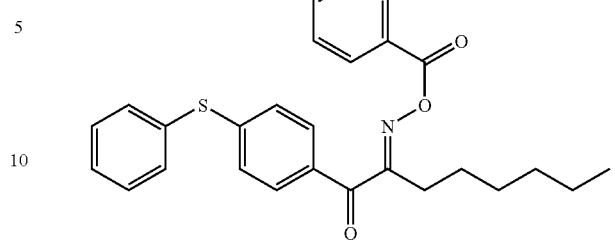

I-1

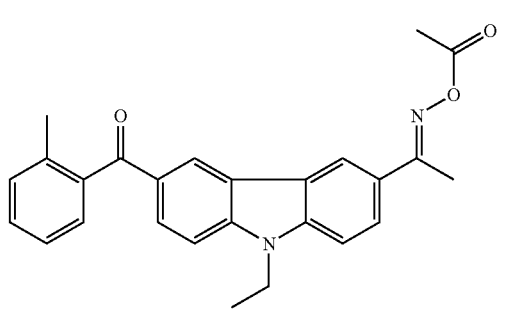

I-2

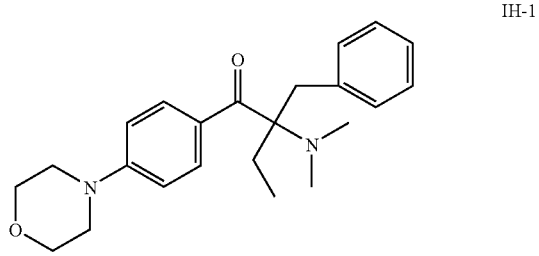

IH-1

TABLE 2

| | (A) Pigment Dispersion | (B) Oxime-based Initiator or Comparative Initiator | Evaluation Results | |
|---|---|---|---|---|
| | | | Developability | Sensitivity |
| Example 1 | Pigment Dispersion A | I-1 | no residue | 100 |
| Example 2 | Pigment Dispersion A | I-2 | no residue | 90 |
| Example 3 | Pigment Dispersion B | I-1 | no residue | 100 |
| Example 4 | Pigment Dispersion C | I-1 | no residue | 100 |
| Example 5 | Pigment Dispersion D | I-2 | no residue | 90 |
| Comparative Example 1 | Pigment Dispersion C | IH-1 | no residue | 800 |
| Comparative Example 2 | Pigment Dispersion E | I-1 | residues remain | 100 |

1-2. Preparation and Evaluation of Color Filter with Colored Curable Composition —Formation of Pattern and Evaluation of Sensitivity—

The coloring agent-containing curable composition prepared in each of Examples 1 to 5 and Comparative Examples 1 and 2 described above was applied onto the silicon substrate with an undercoat layer to form a curable composition layer (coating film) thereon. Then, the curable composition layer was heat-treated (pre-baked) on a hot plate at 100° C. for 120 seconds such that the coating film after drying became 0.9 μm in thickness.

Then, the coating film was exposed, through a 1.4-μm-square Island pattern mask, using light with a wavelength of 365 nm at a varying exposure amount of from 50 mJ/cm² to 1600 mJ/cm² from an i-line stepper exposure device FPA- 3000i5+ (manufactured by Canon Inc.) such that a 1.4-μm-square Island pattern having the same size as that of the mask pattern could be obtained. In this process, the exposure amount of 50 mJ/cm$^2$ was measured with an optical illumination system, and with this exposure amount regarded as standard, the irradiation time was changed and cumulative exposure amount (mJ/cm$^2$) was determined as sensitivity. As this numerical value is decreased, a high-resolution fine pattern can be formed with lower exposure, thus indicating that the composition has higher sensitivity. The obtained results are also shown in Table 2.

Thereafter, the silicon wafer substrate on which the irradiated coating film had been formed was placed on a horizontal rotating table of a spin shower developer (DW-30, manufactured by Chemitronics Co., Ltd.) and subjected to paddle development at 23° C. for 60 seconds with CD-2000 (manufactured by FUJIFILM Electronics Materials Co., Ltd.) to form a colored pattern on the silicon wafer substrate.

The silicon wafer substrate having a colored pattern formed thereon was fixed to the horizontal rotating table by a vacuum chuck system, and the silicon wafer substrate was rotated at 50 rpm with a rotating device and simultaneously rinsed with a shower of pure water supplied via a spraying nozzle (downwards) from above the rotating center of the substrate and then spray-dried. Thereafter, a formed 1.6-μm-square colored pattern and its surrounding part were observed with a magnifying power of 20,000 using a length measuring SEM "S-9260A" (manufactured by Hitachi High-Technologies Corp.). Whether residues on the region not irradiated with light (unexposed region) in the exposure step were present or not was observed to evaluate developability. The obtained results are also shown in Table 2.

As is evident from Table 2, the colored curable composition of the invention can form a fine colored region with high sensitivity with no residues after development and is thus can be seen to be excellent in developability in the unexposed region. On the other hand, it is seen that Comparative Example 1 wherein the comparative polymerization initiator (IH-1: α-aminoacetophenone compound) was used in place of the oxime-based initiator (B) cannot attain sufficient sensitivity, and Comparative Example 2 wherein the pigment dispersion E not containing (a-2) the specific pigment derivative according to the invention was used is inferior in developability.

Examples 6 to 8 and Comparative Example 3

2. Preparation of Pigment Dispersion

The components in Composition (3) below were mixed and subjected to kneading dispersion with a twin roll to prepare pigment-containing mixed solutions (F to I).
[Composition (3)]
First, a pigment mixture of the following components was obtained.

| | |
|---|---|
| C.I. Pigment Green 36 | 50 parts by weight |
| C.I. Pigment Yellow 150 | 50 parts by weight |
| Acrylic Resin Solution 2 (obtained in Synthesis Example 2) | 200 parts by weight |
| Solsperse 32000GR (polyester based dispersant manufactured by The Lubrizol Corporation) | 20 parts by weight |
| Solvent (propylene glycol methyl ether acetate) | 520 parts by weight |
| (a-2) Specific Pigment Derivative or Comparative Compound | 5 parts by weight |

(Compound Shown in Table 3)

The following component was added to the pigment mixtures obtained above and finely dispersed overnight with a sand mill to give pigment dispersions (F to I).

| | |
|---|---|
| Solvent (propylene glycol methyl ether acetate (PGMEA)) | 350 parts by weight |

Structures of (a-2) specific pigment derivatives (Y-5) to (Y-7) according to the invention and the comparative compound (H-2) shown in Table 3 are shown below.

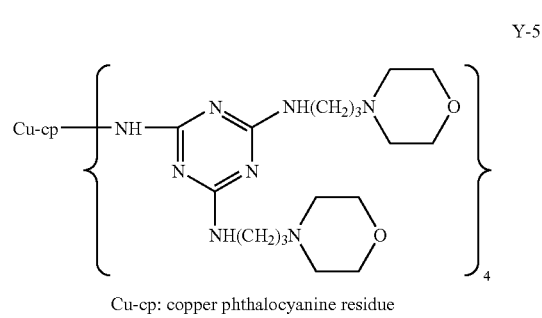

Cu-cp: copper phthalocyanine residue

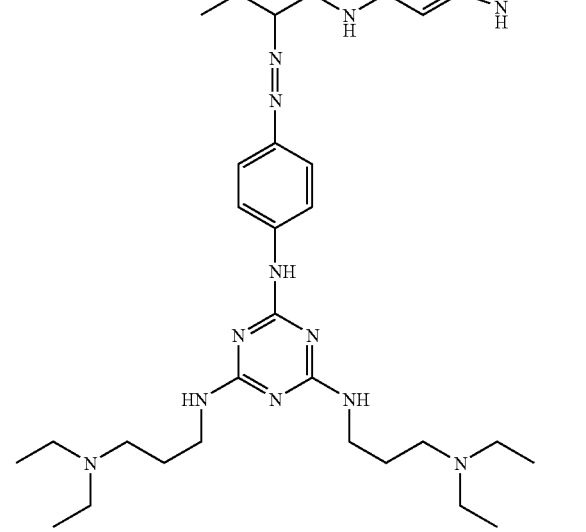

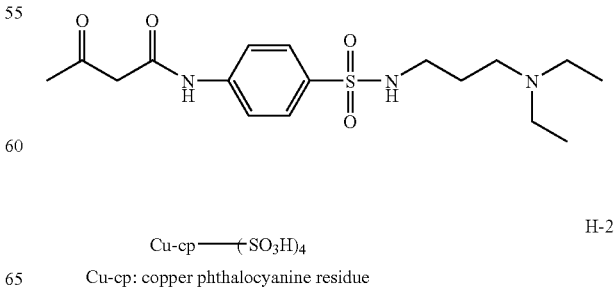

Cu-cp: copper phthalocyanine residue

TABLE 3

| | (a-2) Specific Pigment Derivative or Comparative Compound | Viscosity Change (mPa · s) |
|---|---|---|
| Pigment Dispersion F | Y-5 | 1 |
| Pigment Dispersion G | Y-6 | 1 |
| Pigment Dispersion H | Y-7 | 4 |
| Pigment Dispersion I | H-2 | 25 |

<Evaluation of the Pigment Dispersions>

The resulting pigment dispersions (F to H) according to the invention and comparative pigment dispersion I were evaluated with respect to their dispersion stability similar to the pigment dispersions A to E. The obtained results are also shown in Table 3.

As is evident from Table 3, the pigment dispersions E to H prepared by incorporating (a-2) the specific pigment derivative are excellent in dispersion stability.

Hereinafter, the invention is described by reference to preparation of a coloring-agent-containing curable composition for use in formation of a color filter for a liquid crystal display device.

<Preparation of Silicon Substrate with Undercoat Layer>

The components in Composition (4) below were mixed and dissolved to prepare a resist liquid for an undercoat layer.

<Composition (4)>

| | |
|---|---|
| Propylene glycol monomethyl ether acetate (PGMEA: solvent) | 19.20 parts |

-continued

| | |
|---|---|
| Ethyl lactate | 36.67 parts |
| Binder polymer (40% PGMEAsolution of a benzyl methacrylate/ methacrylic acid copolymer (molar ratio 75/25)) | 30.51 parts |
| Dipentaerythritol hexaacrylate ((C) Polymerizable compound) | 12.20 parts |
| Polymerization inhibitor (p-methoxyphenol) | 0.0065 part |
| Fluorocarbon surfactant (trade name: F-475, manufactured by Dainippon Ink And Chemicals, Incorporated) | 0.80 part |
| Photopolymerization initiator | 0.586 part |

A 6-inch silicon wafer was treated by heating in an oven at 200° C. for 30 minutes. Then, the resist liquid was applied onto this silicon wafer to give a thickness of 2 μm after drying, and then dried by heating in an oven at 220° C. for 1 hour to form an undercoat layer to obtain a silicon wafer substrate with an undercoat layer.

2-1. Preparation of Colored Curable Composition (Coating Liquid)

The following components were added to the pigment dispersion obtained by dispersing treatment as described above, and then mixed under stirring to prepare a curable composition solution.

| | |
|---|---|
| (A) Pigment Dispersion (dispersion shown in Table 4) | 100 parts by weight |
| Pentaerythritol tetraacrylate | 3.8 parts by weight |
| Polymerization Initiator ((B) Oxime-based initiator or comparative initiator shown in Table 4) | 0.5 part by weight |
| Benzyl methacrylate/methacrylic acid copolymer (molar ratio, 70/30, weight-average molecular weight 70,000) | 0.7 part by weight |
| Surfactant (trade name: Tetranic 150R1, manufactured by BASF) | 0.2 part by weight |
| Solvent (PGMEA) | 100 parts by weight |

(B) Oxime-based initiators (I-1) and (I-2) shown in Table 4 are the compounds described above. A structure of comparative polymerization initiator (IH-2) is shown below.

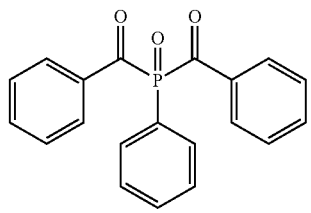

IH-2

TABLE 4

| | (A) Pigment Dispersion | (B) Oxime-based Initiator or Comparative Initiator | Evaluation Results | |
|---|---|---|---|---|
| | | | Developability | Sensitivity |
| Example 6 | Pigment Dispersion F | I-1 | no residue | 100 |
| Example 7 | Pigment Dispersion G | I-2 | no residue | 90 |
| Example 8 | Pigment Dispersion H | I-1 | no residue | 100 |
| Comparative Example 3 | Pigment Dispersion I | IH-2 | residues remain | 1200 |

2-2. Formation of Curable Composition Layer

The pigment-containing curable composition as a resist liquid was slit-coated on a 550 mm×650 mm glass substrate under the following conditions and then left for 10 minutes as it was, followed by vacuum drying and pre-baking (100° C., 80 seconds) to form a curable composition coating film (curable composition layer).

(Slit-Coating Conditions)

Space of an opening at the top of a coating head: 50 μm

Coating speed: 100 mm/sec

Clearance between the substrate and the coating head: 150 μm

Coating thickness (thickness after drying): 2 μm

Coating temperature: 23° C.

2-3. Exposure, and Development

Thereafter, the photocurable coating film was subjected to pattern exposure through a test photomask with a line width of 20 μm with a 2.5-kw superhigh pressure mercury lamp. After exposure, the whole area of the coating film was covered with 1% aqueous solution of alkali developing solution CDK-1 manufactured by FUJIFILM Electronics Materials Co., Ltd., and left for 40 seconds as it was.

2-4. Heat Treatment

Then, the coating film was sprayed with a shower of pure water to wash the developing solution away. The coating film thus subjected to photocuring treatment and developing treatment was then heated in an oven at 220° C. for 1 hour (post-baking). By so doing, a colored region consisting of a resin film was formed on the glass substrate to give a colored pattern for a color filter.

[Evaluation of Performance]

The exposure amount necessary for curing the prepared curable composition coating film (colored layer) formed on the glass substrate by using the above prepared colored curable composition was measured as sensitivity standard in a similar manner to that in Example 1. As this numerical value is decreased, the composition is indicated to have higher sensitivity. The obtained results are also shown in Table 4.

The separately formed colored layer was exposed at an exposure amount of 100 mJ/cm$^2$ light and then developed and post-baked under the same conditions as above. The formed colored region and its surrounding part were observed under similar condition to those in Example 1, to confirm whether residues in the non-image portion were present or not. The obtained results are also shown in Table 4.

As is evident from Table 4, the colored curable composition of the invention forms a fine colored region with high sensitivity with no residues after development and thus is seen to be excellent in developability in the unexposed region. On the other hand, Comparative Example 3 wherein the comparative polymerization initiator (IH-2: acyl phosphine compound) was used in place of (B) the oxime-based initiator and the pigment dispersion I not containing (a-2) the specific pigment derivative according to the invention was used, is seen to be inferior in developability.

Examples 9 to 11 and Comparative Example 4

Preparation of Pigment Dispersion

The components in Composition (5) below were mixed under stirring and then mixed at a revolution number of 3,000 rpm with a homogenizer for 3 hours to prepare pigment-containing mixed solutions (J to M).

[Composition (5)]

| | |
|---|---|
| C.I. Pigment Red 254 | 50 parts |
| C.I. Pigment Red 177 | 50 parts |
| Benzyl methacrylate/methacrylic acid/methacryloyl-terminated polymethyl methacrylate copolymer (=15/10/75 (weight ratio); weight-average molecular weight, 20000; acid value 52; powder; trade name: AA-6, manufactured by manufactured by Toagosei Co., Ltd.) | 40 parts |
| BYK111 (phosphate dispersant manufactured by BYK Chemie Japan) | 10 parts |
| (a-2) specific pigment derivative or comparative compound shown in Table 5 | 4 parts |
| 1-Methoxy-2-propyl acetate | 820 parts |

Subsequently, each of the mixed solutions obtained above was dispersed for 6 hours with a beads-dispersing machine Disper Mat (manufactured by GETZMANN) using 0.3 mm zirconia beads and then further dispersed with a high-pressure dispersing machine NANO-3000-10 with a depressurization mechanism (manufactured by Beryu Co., Ltd.) under a pressure of 2000 kg/cm$^3$ and at a flow rate of 500 g/min. This dispersing treatment was repeated 10 times to obtain red pigment dispersions (J to M).

(a-2) Specific pigment derivative (Y-6) according to the invention, shown in Table 5, is the same as described above. Structures of specific pigment derivatives (Y-8) and (Y-9) and comparative compound (H-3) are shown below.

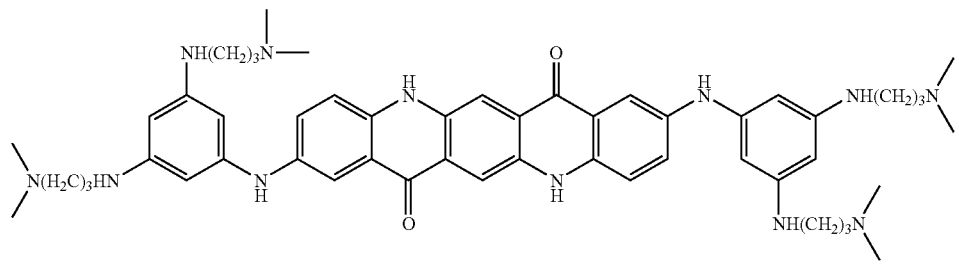

Y-8

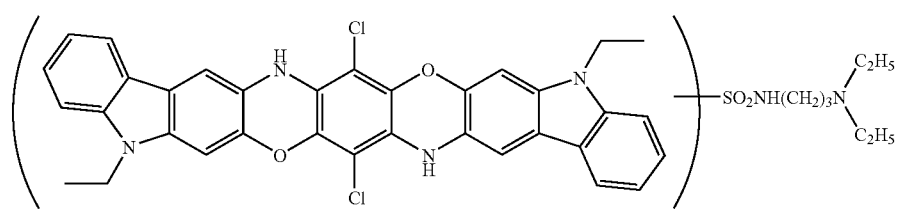

Y-9

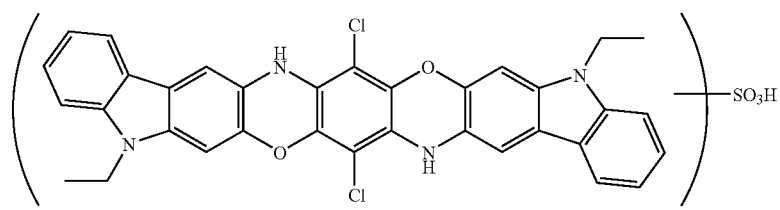

H-3

TABLE 5

| | (a-2) Specific Pigment Derivative or Comparative Compound | Viscosity Change (mPa·s) |
|---|---|---|
| Pigment Dispersion J | Y-6 | 2 |
| Pigment Dispersion K | Y-8 | 1 |
| Pigment Dispersion L | Y-9 | 4 |
| Pigment Dispersion M | H-3 | 90 |

<Evaluation of Pigment Dispersions>

The resulting pigment dispersions (J to L) and comparative pigment dispersion M were evaluated with respect to dispersion stability similar to the pigment dispersions A to E. The obtained results are also shown in Table 5.

As is evident from Table 5, the pigment dispersions J to L prepared by incorporating (a-2) the specific pigment derivative are excellent in dispersion stability.

Hereinafter, the invention is described by reference to preparation of a coloring-agent-containing curable composition for use in formation of a color filter for a liquid crystal display device.

<Preparation of Curable Composition (Coating Liquid)>

The components below were added to each of (A) pigment dispersions (J to M) and mixed under stirring to prepare a curable composition solution.

| | |
|---|---|
| Pigment dispersion shown in Table 6 | 100 parts by weight |
| DPHA (manufactured by Nippon Kayaku Co., Ltd.) | 3.8 parts by weight |
| Polymerization initiator | 1.5 parts by weight |

((B) Oxime-Based Initiator or Comparative Initiator Shown in Table 6)

| | |
|---|---|
| Benzyl methacrylate/methacrylic acid copolymer (molar ratio 70/30, weight-average molecular weight 70,000) | 0.7 part by weight |
| Surfactant (trade name: Tetranic 150R1, manufactured by BASF) | 0.2 part by weight |
| Solvent (PGMEA) | 100 parts by weight |

(B) Oxime-based initiators (I-1) and (I-2) and comparative polymerization initiator (IH-1) shown in Table 6 are the compounds described above.

TABLE 6

| | (A) Pigment Dispersion | (B) Oxime-based Initiator or Comparative Initiator | Evaluation Results | |
|---|---|---|---|---|
| | | | Developability | Sensitivity |
| Example 9 | Pigment Dispersion J | I-1 | no residue | 95 |
| Example 10 | Pigment Dispersion K | I-2 | no residue | 80 |
| Example 11 | Pigment Dispersion L | I-2 | no residue | 80 |
| Comparative Example 4 | Pigment Dispersion M | IH-1 | residues remain | 500 |

<Preparation of Color Filter>

3-2. Formation of Curable Composition Layer

The pigment-containing curable composition as a resist liquid was slit-coated on a 550 mm×650 mm glass substrate under the following conditions and then left for 10 minutes as it was, followed by vacuum drying and pre-baking (100° C., 80 seconds) to form a curable composition coating film (curable composition layer).

(Slit-Coating Conditions)

Space of an opening at the top of a coating head: 50 μm

Coating speed: 100 mm/sec

Clearance between the substrate and the coating head: 150 μm

Coating thickness (thickness after drying): 2 μm

Coating temperature: 23° C.

3-3. Exposure and Development

Thereafter, the photocurable coating film was subjected to pattern exposure through a test photomask with a line width of 20 μm with a 2.5-kw superhigh pressure mercury lamp. After exposure, the whole area of the coating film was covered with 1% aqueous solution of alkali developing solution CDK-1 manufactured by FUJIFILM Electronics Materials Co., Ltd., and left for 40 seconds as it was.

3-4. Heat Treatment

Then, the coating film was sprayed with a shower of pure water to wash the developing solution away. The coating film thus subjected to photocuring treatment and developing treatment was then heated in an oven at 220° C. for 1 hour (post-baking). By so doing, a colored region consisting of a resin film was formed on the glass substrate to give a colored pattern for a color filter.

[Evaluation of Performance]

The exposure amount necessary for curing the prepared curable composition coating film (colored layer) formed on the glass substrate by using the colored curable composition was measured as sensitivity standard in a similar manner to that in Example 1. As this numerical value is decreased, the composition is shown to have higher sensitivity. The obtained results are shown in Table 6.

The separately formed colored layer was exposed at an exposure amount of 100 mJ/cm$^2$ and then developed and post-baked under the same conditions as above. The formed colored region and its surrounding part were observed under similar conditions to those in Example 1, to confirm whether residues in the non-image portion were present or not. The obtained results are also shown in Table 6.

As is evident from Table 6, the colored curable composition of the invention forms a fine colored region with high sensitivity with no residues after development and can thus be seen to be excellent in developability in the unexposed region. On the other hand, Comparative Example 4 wherein IH-1 (α-aminoacetophenone compound) was used in place of (B) the oxime-based initiator and the pigment dispersion M not containing (a-2) the specific pigment derivative according to the invention was used, is seen to be inferior in developability.

According to the invention, there is provided a colored curable composition which, even if the content of a pigment is high, is cured with high sensitivity, is excellent in developability, and forms a highly fine, thin-layer colored region excellent in hue.

According to the invention, there is provided a color filter provided with a highly fine colored region excellent in color property in the form of a thin layer formed from the colored curable composition of the invention, as well as a solid image pickup element provided with the color filter excellent in color property.

The invention includes the following embodiments.

<1> A colored curable composition comprising:

(A) a pigment dispersion containing (a-1) a pigment, (a-2) a compound having a pigment skeletal structure and an amino group in its molecule, and (a-3) a dispersion resin;

(B) an oxime-based initiator; and (C) a polymerizable compound.

<2> The colored curable composition according to item <1>, wherein (a-2) the compound having a pigment skeletal structure and an amino group in its molecule is a compound represented by the following formula (A):

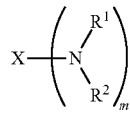

Formula (A)

wherein $R^1$ and $R^2$ each independently represent a hydrogen atom or a monovalent organic group selected from a saturated or unsaturated alkyl group having 1 to 20 carbon atoms, a saturated or unsaturated cycloalkyl group having 3 to 20 carbon atoms, or an aryl group; each of these organic groups may further have a substituent selected from a halogen atom, a hydroxy group, an alkyl group, an alkenyl group, an alkynyl group, a cycloalkyl group, a cycloalkenyl group, a cycloalkynyl group, an aryl group, a heterocyclic group, a cyano group, an alkoxy group, an aryloxy group, a thioalkoxy group, a thioaryloxy group, a carboxyl group, an alkoxycarbonyl group, a sulfo group, a sulfonamide group, a urea group, a thiourea group, an amino group, an amido group, a carbonyl group, a nitro group, and substituents having these groups; $R^1$ and $R^2$ may be bonded to each other to form a ring; X is a group having a valency of m and containing a pigment skeletal structure which is a chromophoric atomic group in an organic pigment, a structure similar thereto or a partial structure thereof and contains one or more partial structure selected from the group consisting of a skeleton having an azo group, a skeleton having a urea structure, a skeleton having an amide structure, a skeleton having a cyclic amide structure, an aromatic ring having a heteroatom-containing 5-membered ring, and an aromatic ring having a heteroatom-containing 6-membered ring; and m is an integer of from 1 to 8.

<3> The colored curable composition according to any one of items <1> and <2>, wherein (a-2) the compound having a pigment skeletal structure and an amino group in its molecule is a compound having, in its molecule, at least one structure selected from an amide structure and a urea structure.

<4> The colored curable composition according to any one of items <1> to <3>, wherein (a-2) the compound having a pigment skeletal structure and an amino group in its molecule is a compound having a heterocyclic structure.

<5> The colored curable composition according to any one of items <1> to <4>, which further comprises (D) a binder polymer.

<6> The colored curable composition according to any one of items <1> to <4>, wherein (B) the oxime-based initiator is represented by the following formula (I) or (II):

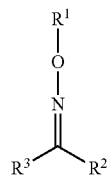

(I)

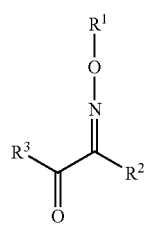

(II)

wherein $R^1$ is a monovalent organic group represented by the following formula (III) or (IV):

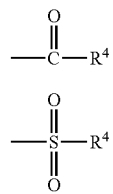

(III)

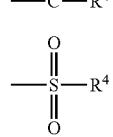

(IV)

wherein $R^4$ represents a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms, and wherein the formulae (I) and (II), $R^2$ represents a hydrogen atom, or a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms; and $R^3$ represents a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms.

<7> A colored region of a colored filter comprising the colored curable composition according to any one of items <1> to <6>.

<8> A color filter having a colored region formed using the colored curable composition according to any one of items <1> to <6>.

<9> A solid image pickup device provided with the color filter according to items <8>.

All publications, patent applications, and technical standards mentioned in this specification are herein incorporated by reference to the same extent as if such individual publication, patent application, or technical standard was specifically and individually indicated to be incorporated by reference.

It will be obvious to those having skill in the art that many changes may be made in the above-described details of the preferred embodiments of the present invention. The scope of the invention, therefore, should be determined by the following claims.

What is claimed is:

1. A colored curable composition comprising:
   (A) a pigment dispersion containing (a-1) a pigment, (a-2) a compound having a pigment skeletal structure and an amino group in its molecule, and (a-3) a dispersion resin;
   (B) an oxime-based initiator; and
   (C) a polymerizable compound, wherein the amount of the pigment contained in the colored curable composition is in a range of from 25 to 65% by weight with respect to the total solid components of the colored curable composition;

wherein (a-2) the compound having a pigment skeletal structure and an amino group in its molecule is selected from the group consisting of compounds represented by the following formulae Y-1 to Y-9:

Y-1

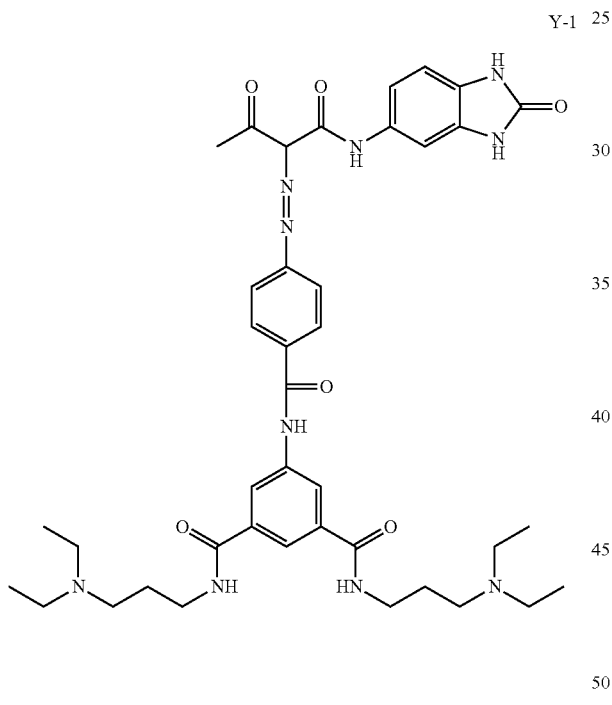

Y-2

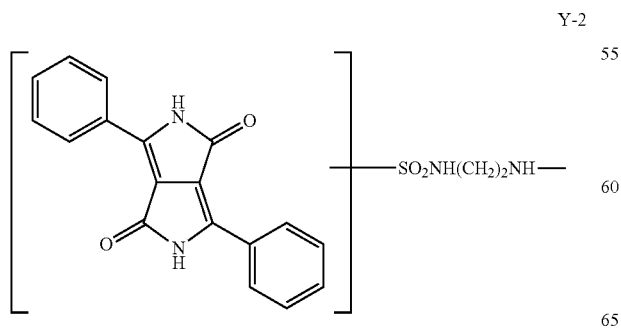

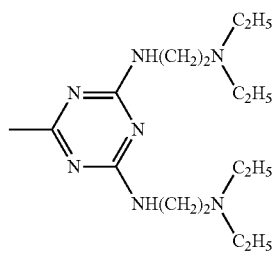

Y-3

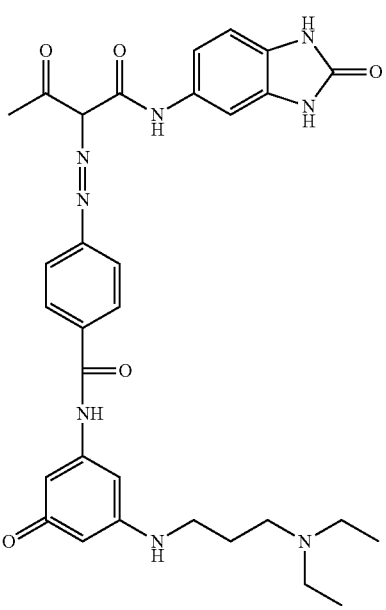

Y-4

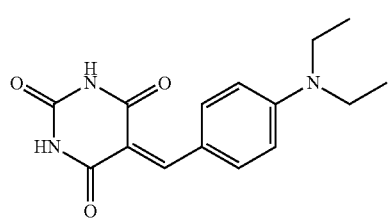

Y-5

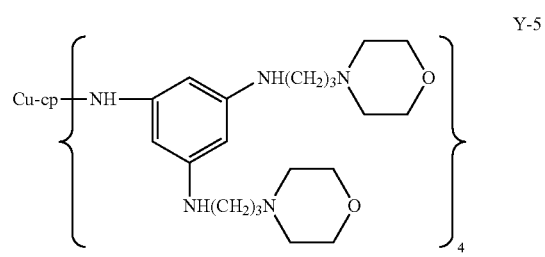

Cu-cp: copper phtalocyanine residue

-continued

Y-6
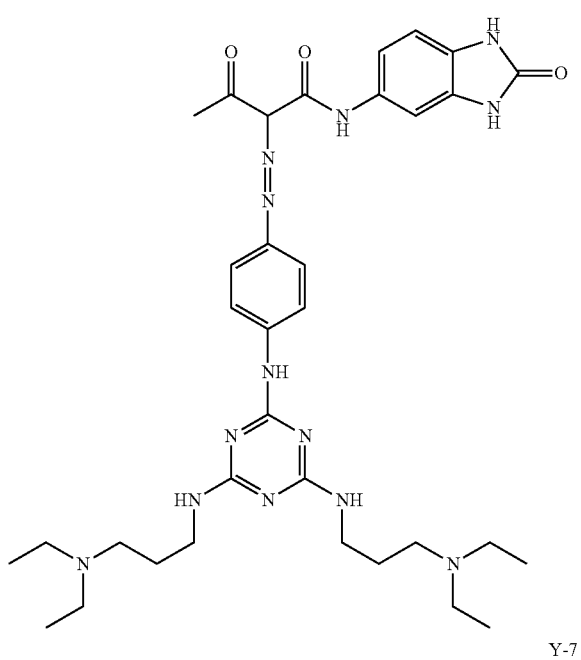

Y-7
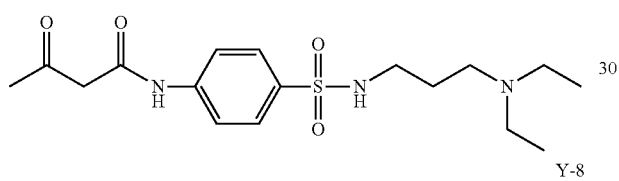

Y-8
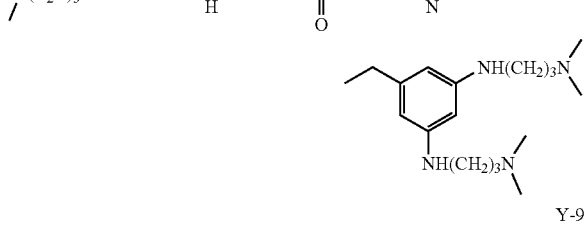

Y-9
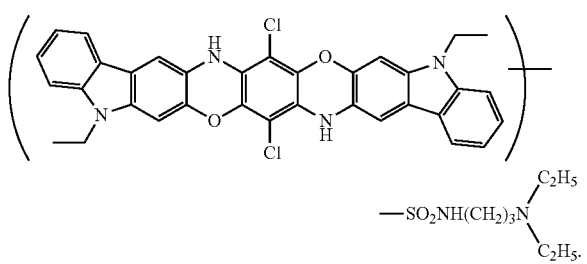

2. The colored curable composition according to claim 1, which further comprises (D) a binder polymer.

3. A colored region of a colored filter comprising the colored curable composition according to claim 2.

4. A color filter having a colored region formed using the colored curable composition according to claim 2.

5. A solid image pickup device provided with the color filter according to claim 4.

6. The colored curable composition according to claim 1, wherein (B) the oxime-based initiator is represented by the following formula (I) or (II):

(I)

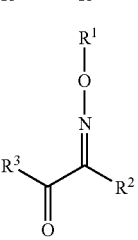
(II)

wherein $R^1$ is a monovalent organic group represented by the following formula (III) or (IV):

(III)

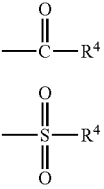
(IV)

wherein $R^4$ represents a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms, and wherein in the formulae (I) and (II), $R^2$ represents a hydrogen atom, or a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms; and $R^3$ represents a monovalent organic group selected from an alkyl group, an alkenyl group, an alkynyl group, a cycloalkyl group, a cycloalkenyl group, a cycloalkynyl group, an aryl group, a heterocyclic group or an alkoxy group, each of which has 1 to 20 carbon atoms.

7. A colored region of a colored filter comprising the colored curable composition according to claim 1.

8. A color filter having a colored region formed using the colored curable composition according to claim 1.

9. A solid image pickup device provided with the color filter according to claim 8.

10. The colored curable composition according to claim 1, wherein the amount of the pigment contained in the colored curable composition is in a range of from 40 to 65% by weight with respect to the total solid component of the colored curable composition.

11. The colored curable composition according to claim 1, wherein the pigment is selected from the group consisting of C.I. Pigment Yellow 11, 24, 108, 109, 110, 138, 139, 150, 151, 154, 167, 180 and 185; C.I. Pigment Orange 36 and 71; C.I. Pigment Red 122, 150, 171, 175, 177, 209, 224, 242, 254, 255, and 264; C.I. Pigment Violet 19, 23, and 32; C.I. Pigment Blue 15:1, 15:3, 15:6, 16, 22, 60 and 66; and C.I. Pigment Green 7, 36, and 37.

12. The colored curable composition according to claim 1, where (B) the oxime-based initiator is represented by the following formula (I-1) or (I-2):

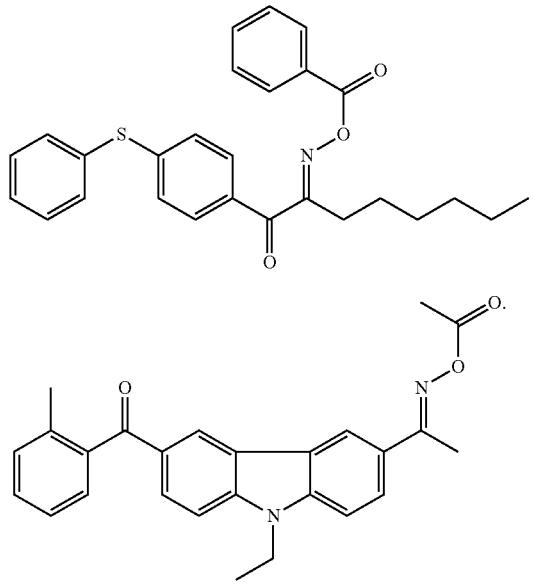

13. The colored curable composition according to claim 1, wherein (a-2) the compound having a pigment skeletal structure and an amino group in its molecule is a compound represented by the following formula Y-1:

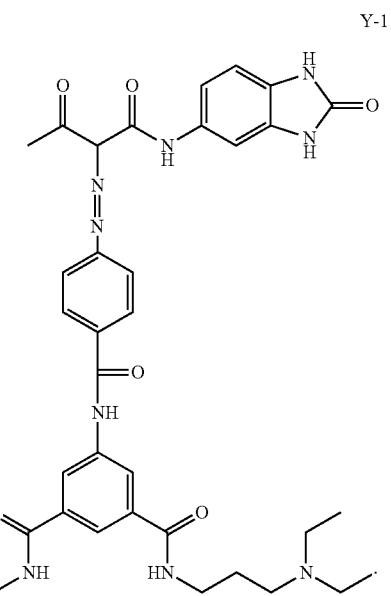

14. The colored curable composition according to claim 1, wherein (a-1) the pigment is selected from the group consisting of C.I. Pigment Yellow 11, 108, 150, 151, 167, 180, and 185; C.I. Pigment Orange 71; C.I. Pigment Red 150, 171, 175, 209, 242, and 264; C.I. Pigment Blue 16 and 66; and C.I. Pigment Green 37.

* * * * *